US009380374B2

(12) United States Patent
Sprague et al.

(10) Patent No.: US 9,380,374 B2
(45) Date of Patent: *Jun. 28, 2016

(54) HEARING ASSISTANCE SYSTEMS CONFIGURED TO DETECT AND PROVIDE PROTECTION TO THE USER FROM HARMFUL CONDITIONS

(71) Applicant: OKAPPI, Inc., Wilmington, DE (US)

(72) Inventors: Peter J. Sprague, Lenox, MA (US); Wayne D. Boyle, Selden, NY (US); Janet M. Baker, West Newton, MA (US)

(73) Assignee: OKAPPI, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,474

(22) Filed: Apr. 14, 2015

(65) Prior Publication Data
US 2015/0326965 A1 Nov. 12, 2015

Related U.S. Application Data

(63) Continuation-in-part of application No. 14/597,045, filed on Jan. 14, 2015.

(60) Provisional application No. 62/023,797, filed on Jul. 11, 2014, provisional application No. 61/928,958, filed on Jan. 17, 2014.

(51) Int. Cl.
*H04R 25/00* (2006.01)
*H04R 1/10* (2006.01)
(Continued)

(52) U.S. Cl.
CPC .............. *H04R 1/1083* (2013.01); *G02C 11/06* (2013.01); *G10L 13/043* (2013.01);
(Continued)

(58) Field of Classification Search
CPC ...... H04R 3/02; H04R 25/00; H04R 2225/03; H04R 2225/025; H04R 1/105; H04R 2225/021; H04R 2225/63; H04R 1/10; H04R 2205/022; H04R 5/0335; H04R 2201/10; H04R 2460/13; H04R 1/1016; A61F 11/06

USPC .......... 381/72, 73.1, 327–328, 330, 370–376, 381/380–381
See application file for complete search history.

(56) References Cited

U.S. PATENT DOCUMENTS

| 2,613,282 | A | 10/1952 | Scaife |
| 2,803,308 | A | 8/1957 | Di Mattia |

(Continued)

FOREIGN PATENT DOCUMENTS

| CN | 202794712 | 3/2013 |
| EP | 2 469 323 | 6/2012 |
| WO | WO2015/109002 | 7/2015 |

OTHER PUBLICATIONS

International Search Report and Written Opinion of PCT/US2015/011440 dated Jul. 15, 2015 entitled "Hearing Assistance System".

(Continued)

*Primary Examiner* — Suhan Ni
(74) *Attorney, Agent, or Firm* — Hamilton, Brook, Smith & Reynolds, P.C.

(57) ABSTRACT

The present universal wearable computing device relates to a hearing assistance system, device, method, and apparatus that provide a discreet approach to user hearing assistance, without relying on a conventional hearing aid. The hearing assistance system and the requisite electronics may be incorporated into frames that also function as eyeglasses with earphone(s) that may be connected to the frame to assist user hearing. An earphone may be configured with minimal electronics, such that a power source enable sound transmissions to the ear, is provided by a connection to the frame of the eyeglasses. In another example, the earphone is configured without any electronics and sound is transmitted to the user/listener's ear(s) via a psychoacoustic system. The sound quality of the transmissions to the earphones may be optimized using a tuning/equalizer application operating from a computing device, such as an app on a mobile device. The tuning/equalizer application can be used by the user/listener to optimize volume input levels to the earphone(s). The hearing assistance system may also protect from damaging environmental noise, provide heightened hearing capabilities, collect and process physiological and physical measurements, and provide communication capabilities for interacting with other computing devices.

24 Claims, 50 Drawing Sheets

(51) Int. Cl.
*G10L 13/04* (2013.01)
*G02C 11/06* (2006.01)
*G10L 21/0208* (2013.01)
*G02C 5/02* (2006.01)
*G02C 5/14* (2006.01)

(52) U.S. Cl.
CPC ......... *G10L 21/0208* (2013.01); *H04R 1/1066* (2013.01); *H04R 25/405* (2013.01); *H04R 25/407* (2013.01); *H04R 25/558* (2013.01); *H04R 25/604* (2013.01); *H04R 25/65* (2013.01); *H04R 25/652* (2013.01); *G02C 5/02* (2013.01); *G02C 5/14* (2013.01); *H04R 2225/41* (2013.01); *H04R 2225/43* (2013.01); *H04R 2225/61* (2013.01); *H04R 2225/63* (2013.01); *H04R 2430/21* (2013.01); *H04R 2460/01* (2013.01)

(56) References Cited

U.S. PATENT DOCUMENTS

| | | | |
|---|---|---|---|
| 2,930,858 | A | 3/1960 | Eleanor |
| 2,946,862 | A * | 7/1960 | Wadsworth ............. H04M 1/05 381/72 |
| 3,104,290 | A | 9/1963 | Rescmoud et al. |
| 3,368,644 | A | 2/1968 | Henderson |
| 3,394,226 | A * | 7/1968 | Andrews, Jr. ........ H04R 25/502 381/72 |
| 3,604,861 | A | 9/1971 | Lewis |
| 3,789,163 | A | 1/1974 | Dunlavy |
| 4,712,244 | A | 12/1987 | Zwicker et al. |
| 4,773,095 | A | 9/1988 | Zwicker |
| 4,852,684 | A | 8/1989 | Packard |
| 5,815,196 | A | 9/1998 | Alshawi |
| 6,091,832 | A | 7/2000 | Shurman |
| 6,629,076 | B1 | 9/2003 | Haken |
| 6,690,807 | B1 | 2/2004 | Meyer |
| 6,741,713 | B1 | 5/2004 | Boone |
| 7,182,459 | B1 | 2/2007 | Chen |
| 7,226,162 | B2 | 6/2007 | Mah |
| 7,376,238 | B1 | 5/2008 | Rivas |
| 7,512,414 | B2 | 3/2009 | Jannard |
| 7,792,552 | B2 | 9/2010 | Thomas |
| 9,031,273 | B2 | 5/2015 | Dong |
| D746,817 | S | 1/2016 | Olsson |
| 9,301,057 | B2 | 3/2016 | Sprague et al. |
| 2002/0158816 | A1 | 10/2002 | Snider |
| 2012/0078628 | A1 | 3/2012 | Ghulman |
| 2013/0147686 | A1 | 6/2013 | Clavin |
| 2014/0081634 | A1 | 3/2014 | Forutanpour |
| 2014/0337023 | A1 | 11/2014 | McCulloch |
| 2015/0230033 | A1 | 8/2015 | Sprague et al. |
| 2015/0319546 | A1 | 11/2015 | Sprague |
| 2015/0373474 | A1 | 12/2015 | Kraft et al. |
| 2015/0382106 | A1 | 12/2015 | Kraft et al. |

OTHER PUBLICATIONS

Invitation to Pay Additional Fees, and Where Applicable Protest Fee for PCT/US2015/011440 dated Apr. 20, 2015 entitled "Hearing Assistance System".
Office Action dated Nov. 3, 2015 for U.S. Appl. No. 14/710,269.
Notice of Allowance dated Dec. 21, 2015 for U.S. Appl. No. 14/597,045.
HearGlass Presentation. May 2014.
Example Eyeglass Designs, including Algor Korea, Museu do Aparelho Auditivo, Babel, Beltone, Bosch, DIDIK, Varibel, and AN evo 1.
Google Glass 2013.
Wasserman, T., "How Google Glass Could Change Advertising," retrieved from Internet on Jan. 8, 2016. http://mashable.com/2013/01/23/google-glass-advertising/#WUgP_9rMcEq3.
Notice of Allowance for U.S. Appl. No. 14/597,045 dated Feb. 1, 2016 "Hearing Assistance System."
Final Office Action for U.S. Appl. No. 14/710,269, Dated: Mar. 15, 2016.
International Search Report and Written Opinion for PCT/US2016/018729 dated May 2, 2016 entitled "Hearing Assistance Systems Configured To Enhance Wearer's Ability To Communicate With Other Individuals".

* cited by examiner

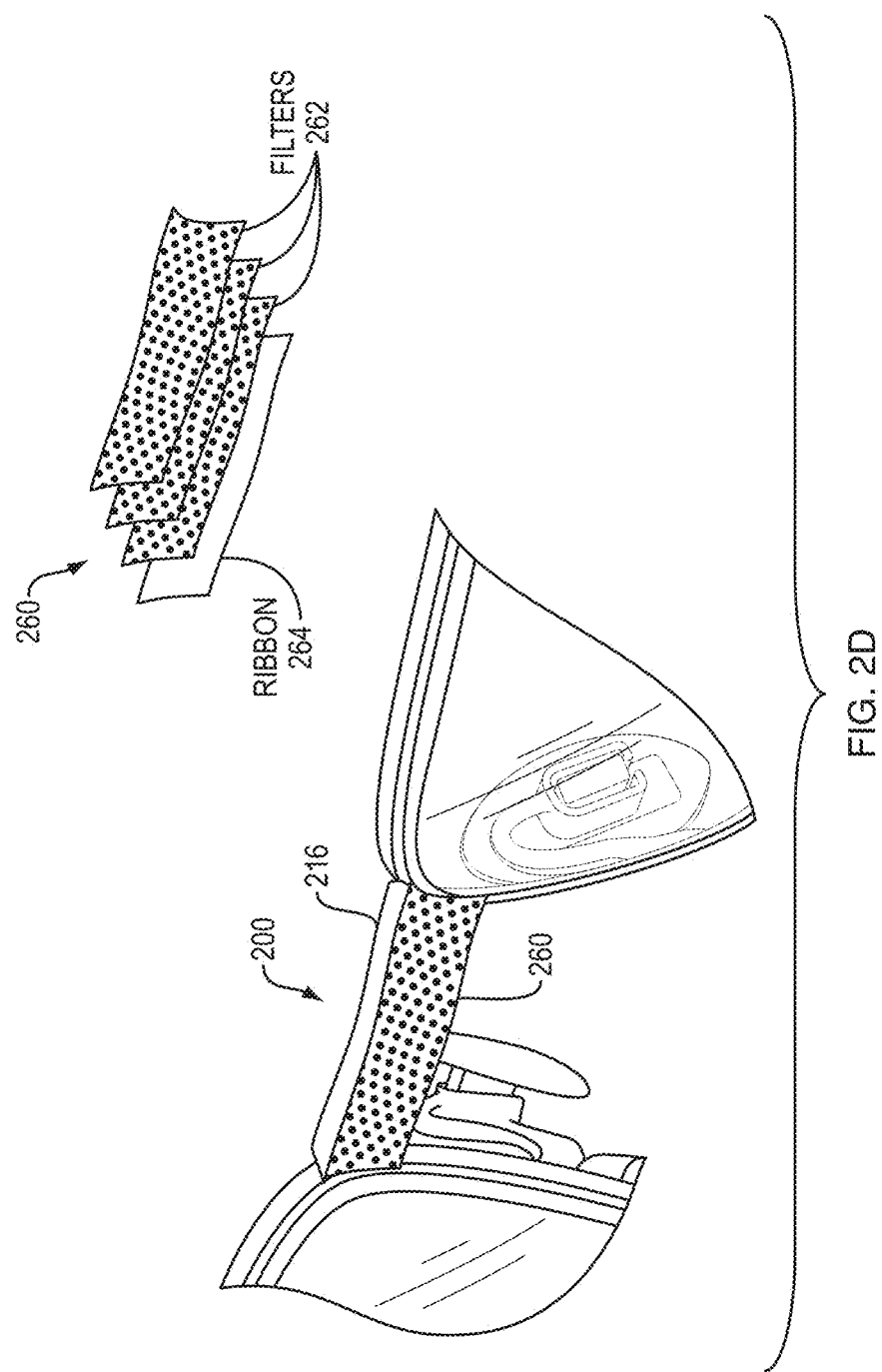

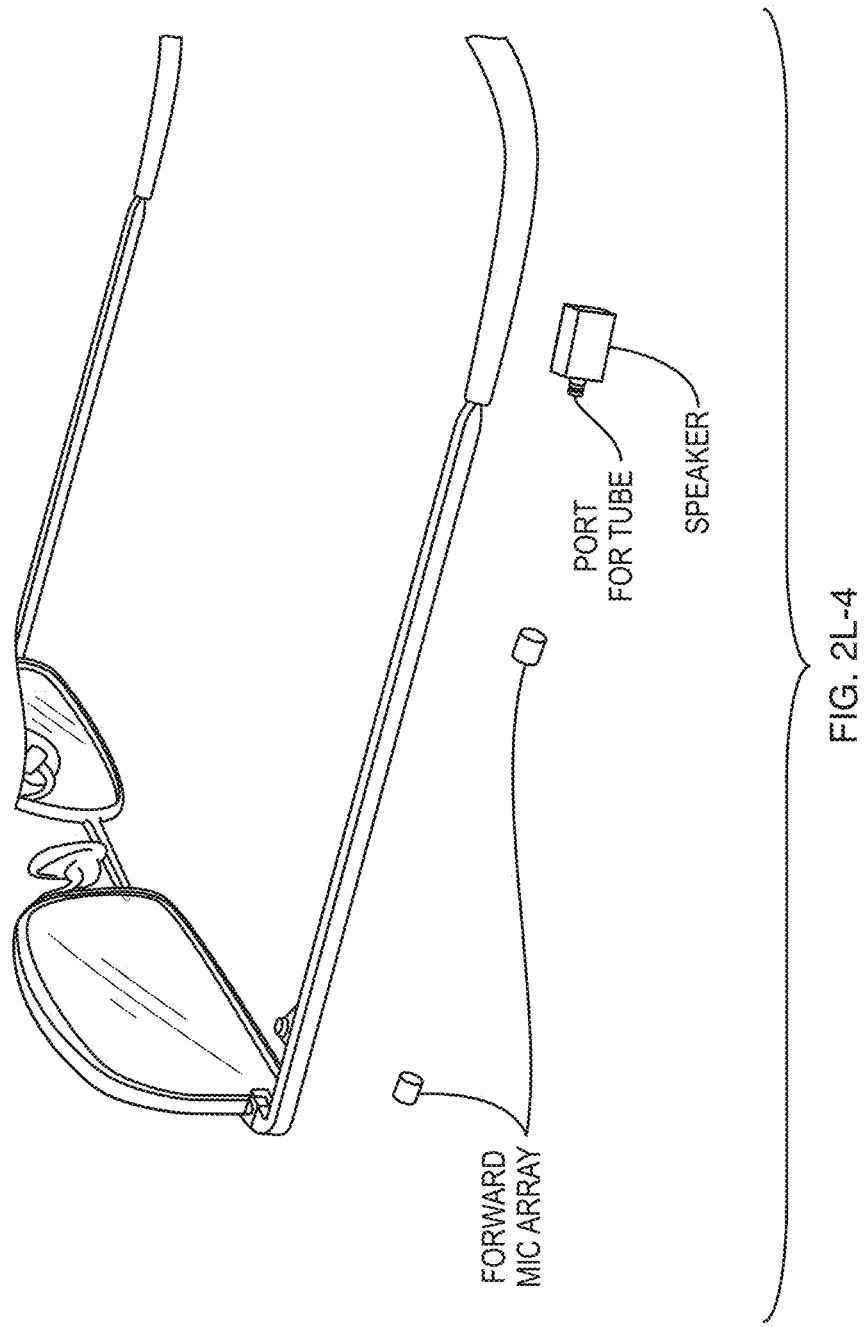

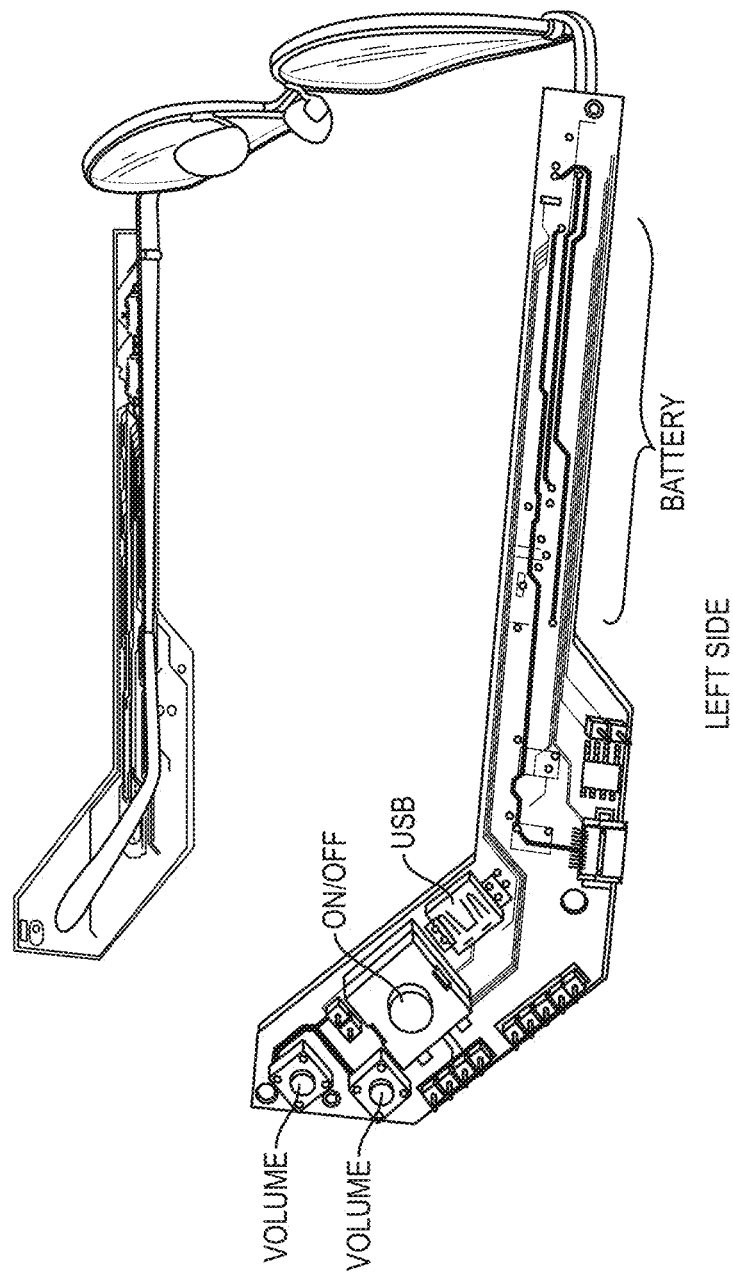

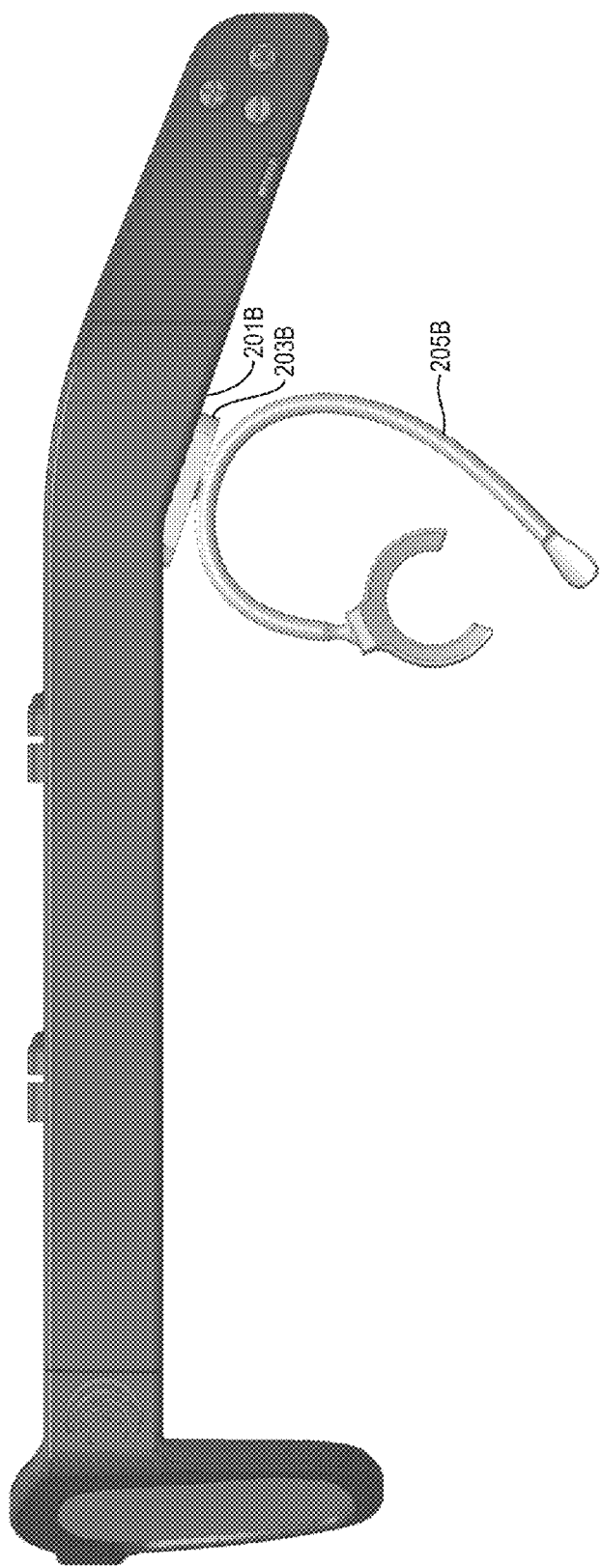

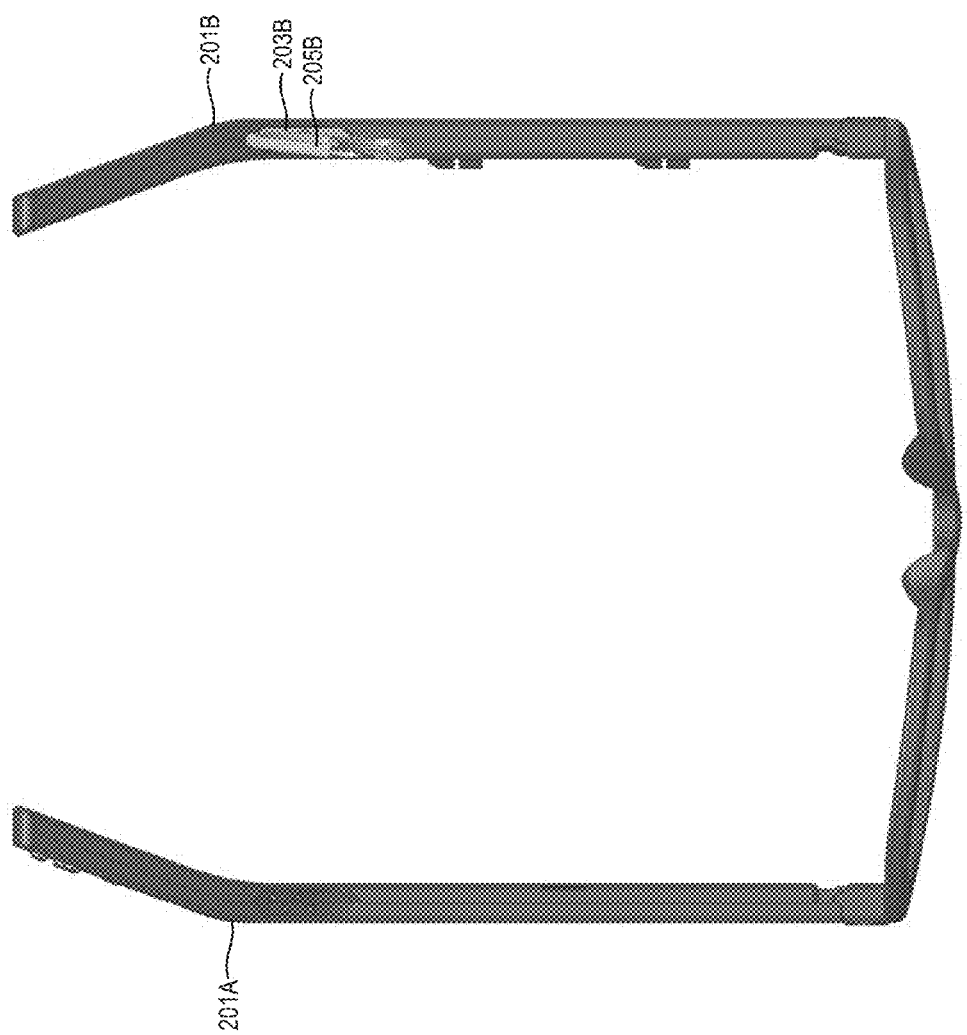

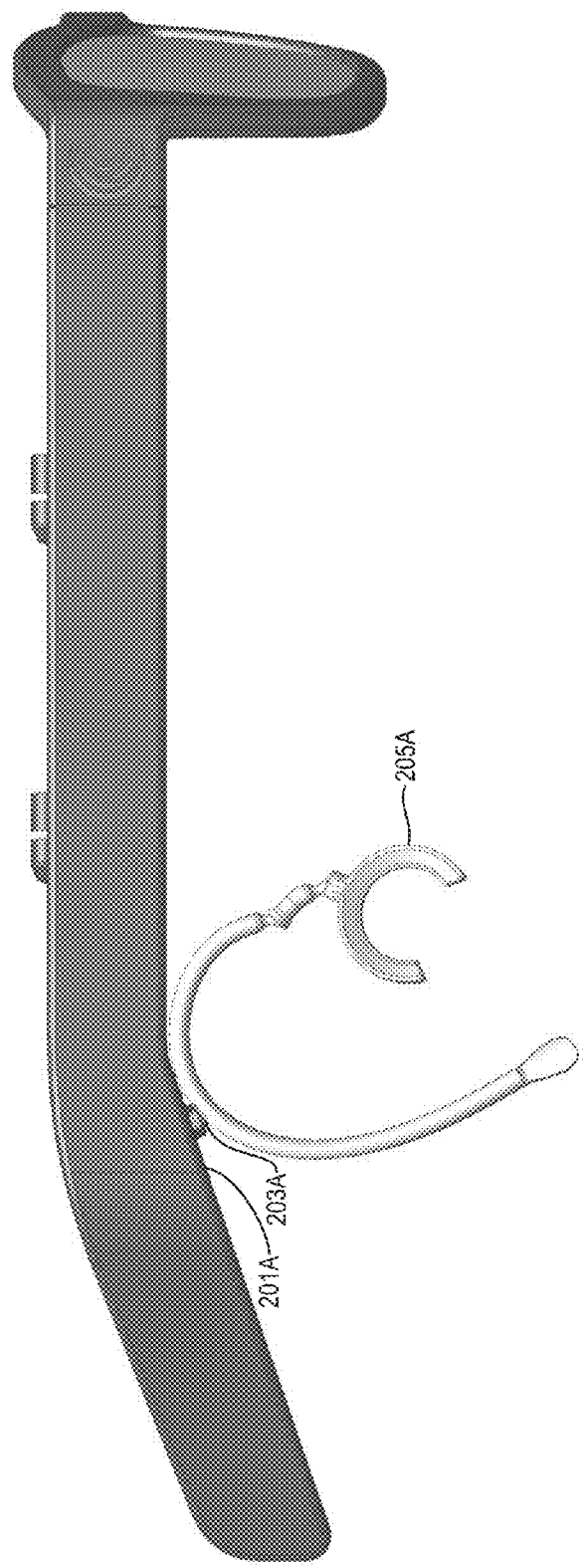

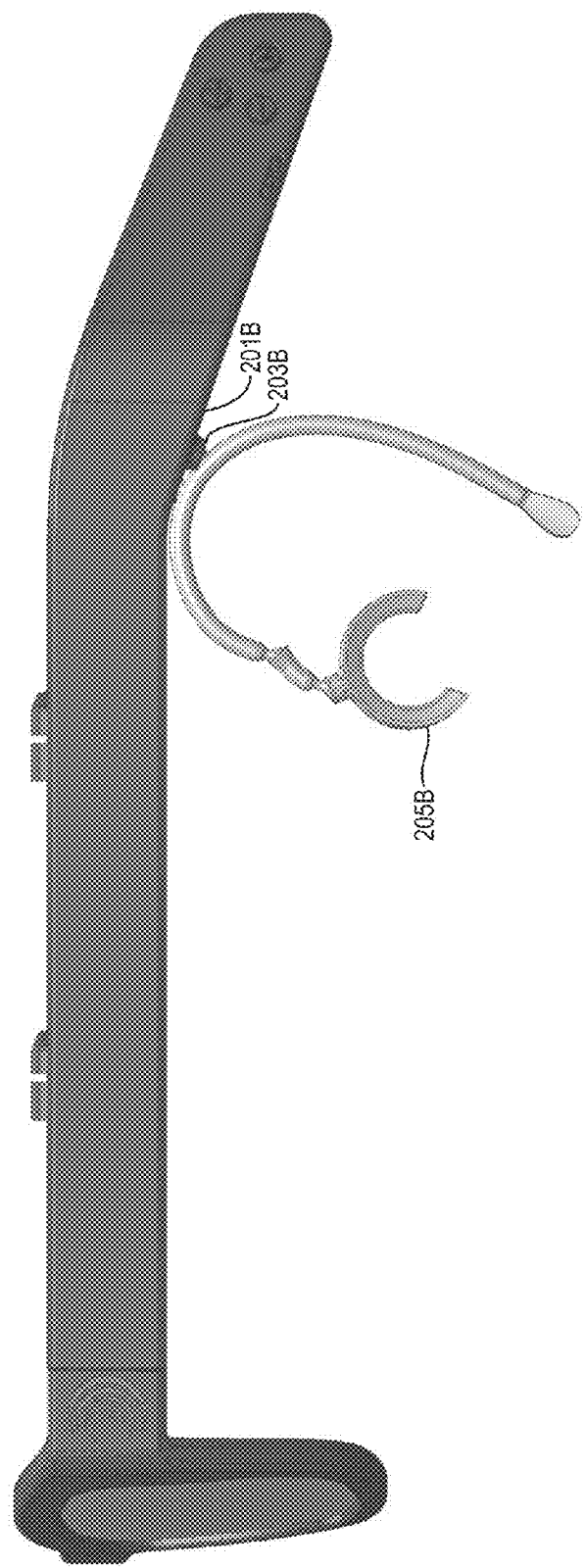

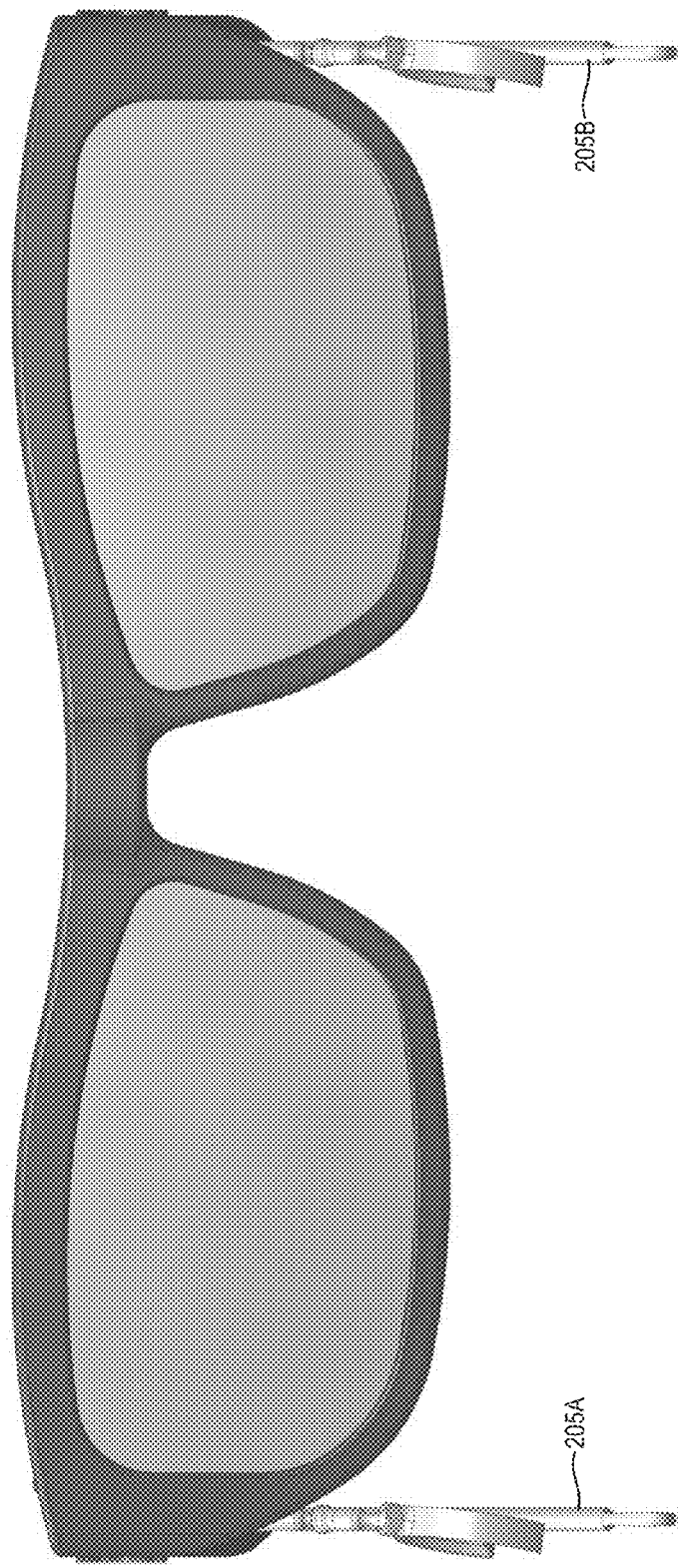

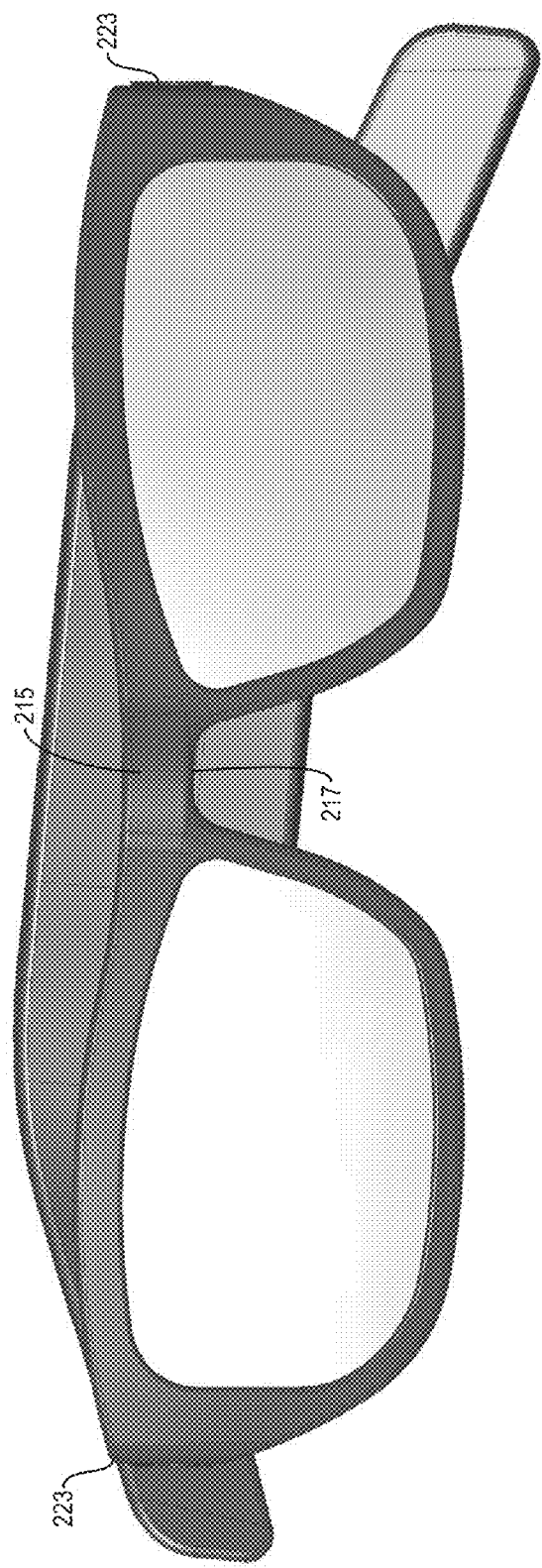

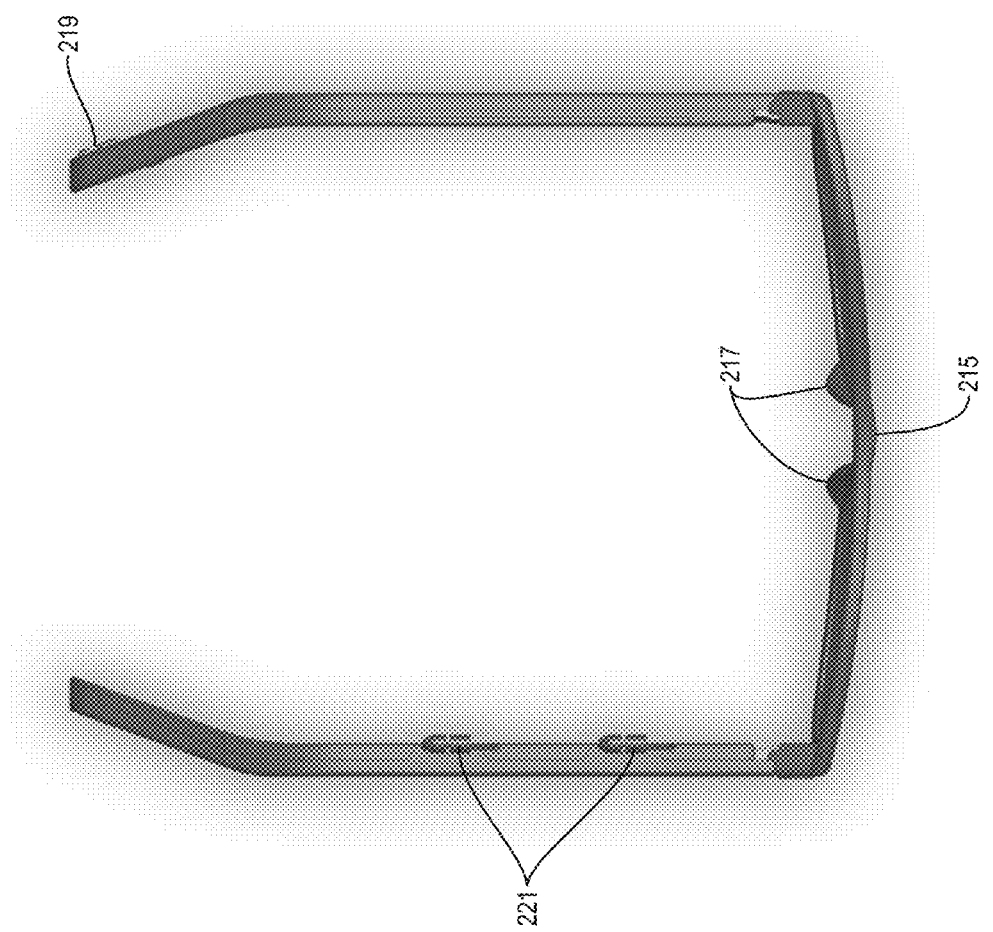

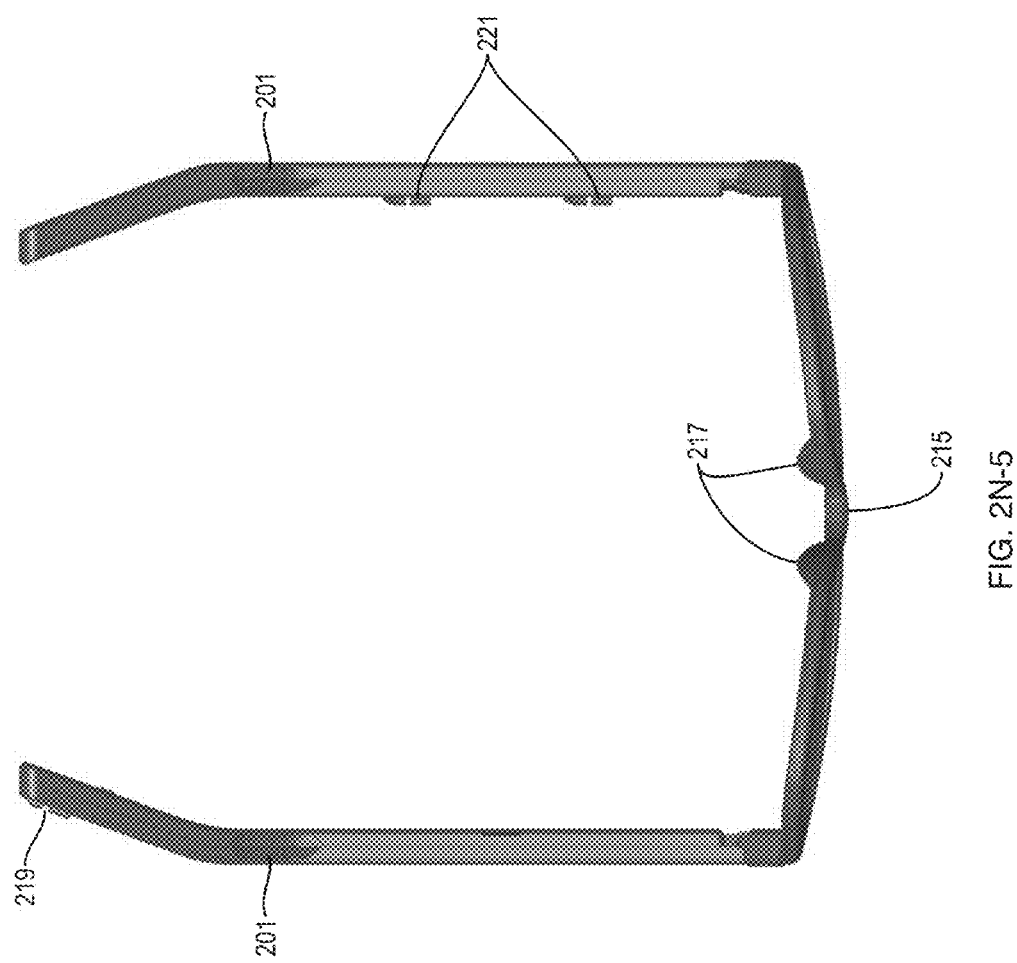

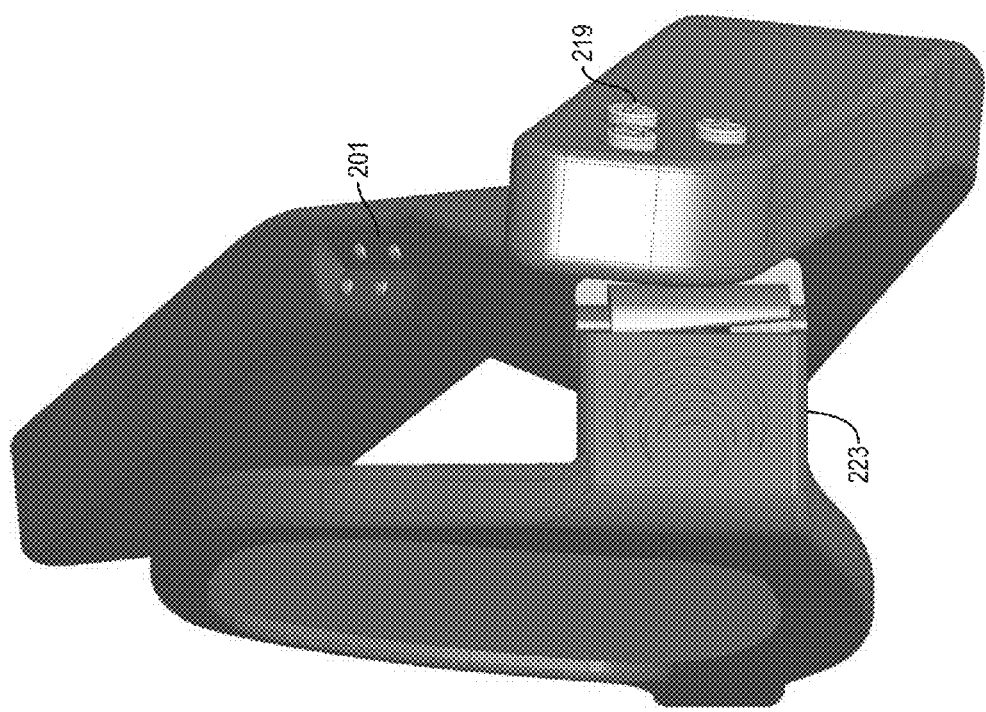

HEARING ASSISTANCE SYSTEMS CONFIGURED TO DETECT AND PROVIDE PROTECTION TO THE USER FROM HARMFUL CONDITIONS

RELATED APPLICATIONS

This application is a continuation-in-part of U.S. patent application Ser. No. 14/597,045, filed Jan. 14, 2015, which claims the benefit of U.S. Provisional Application No. 62/023,797, filed on Jul. 11, 2014 and U.S. Provisional Application No. 61/928,958, filed on Jan. 17, 2014. The entire teachings of the above applications are incorporated herein by reference.

BACKGROUND

Standard hearing aids include behind-the-ear (BTE), mini-BTE, and receiver-in-the-canal (RIC) devices. Such hearing assistance devices typically include sophisticated electronics to ensure the sound quality. Often, the designs of in-ear or behind-the-ear hearing assistance devices are limited by the space available at human ears.

Hearing aids, for example, may include sophisticated electronics for suppressing environmental noise and amplifying the speech signal. Moreover, hearing aids may have different styles such as in-canal and inside the outer ear. The limited physical spaces inside the canals or the outer ear of human subject limit the size of circuits that may be deployed in hearing aids. Furthermore, hearing aids do not have the ability to place the microphone or microphone array any appreciable distance from the ear. In addition, the shapes of outer ears of human subjects vary significantly. Therefore, the shape of the hearing aid device may require custom design and fit in accordance with the shape of the ear of the human subject. All of these factors may significantly increase the purchase cost and replacement cost of in-ear or behind-the-ear hearing assistance devices, such as hearing aids.

SUMMARY

Although hearing assistive instruments exist, they are often costly and unsightly, while the sound quality is mediocre at best. The conventional hearing aids typically have a conspicuous appearance and provide poor sound quality. The currently available hearing aids tend to be expensive and fail to achieve a design that is capable of striking a balance between providing a discrete appearance and high technology. While users/listeners want the most advanced hearing technology, they also want discrete hearing aids that are inexpensive and technologically sophisticated.

Embodiments of the present invention include a universal wearable computing device (UWD) that can provide hearing assistance. The universal wearable computing device may be configured as a hearing assistance system and apparatus that is implemented with a discreet appearance, while providing advanced sound quality. For example, the present hearing assistance invention and its requisite electronics may be incorporated into frames that also function as eyeglasses or have the appearance of eyeglasses along with an earphone or ear bud to assist user hearing.

In some embodiments, a hearing assistance device may include a frame configured to be worn on the head of a user. The frame may include a bridge configured to be supported on the nose of the user. A first transducer may be coupled to the frame. The first transducer may include at least two microphones configured to receive an audio signal including speech. The at least two microphones are positioned such that:

a first lag microphone is situated at or near a rear portion of a first side of the frame; and a second microphone is situated at or near a front portion of the frame;

a converter configured to convert and to amplify the audio signal to an amplified representation of the audio signal; and a second transducer for emitting the amplified representation of the audio signal to a first earphone coupled to a first ear of the user, where at least a portion of the first earphone is removably coupled to at least a portion of the frame, such that when the first earphone is in contact with the portion of the frame, the first earphone is configured to emit the amplified representation of the audio signal.

In some embodiments, the system further includes a third transducer for emitting the amplified representation of the audio signal to a second earphone coupled to a second ear of the user, where at least a portion of the second earphone is removably coupled to at least a portion of the frame, such that when the second earphone is in contact with the portion of the frame, the second earphone is configured to emit the amplified representation of the audio signal.

In further embodiments, the first earphone is replaced by a first earbud attached to a first earclip coupled to the first ear of the user, where at least a portion of the first earclip is removably coupled to at least a portion of the frame, such that when the first earclip is in contact with the portion of the frame, the first earclip is configured to emit the amplified representation of the audio signal. The first earclip may be attached to the frame by a cone-shaped or v-shaped connector, in which a male cone-shaped or v-shaped component on the top of the first earclip may attach to a corresponding female cone-shaped or v-shaped hole component on the frames. In other embodiments, the first earbud may be directly coupled to the frame, without use of the earclip.

In further embodiments, the second earphone is replaced by a second earbud attached to a second earclip coupled to the second ear of the user, where at least a portion of the second earclip is removably coupled to at least a portion of the frame, such that when the second earclip is in contact with the portion of the frame, the second earclip is configured to emit the amplified representation of the audio signal. The second earclip may also be attached to the frame by a cone-shaped or v-shaped connector, in which a male cone-shaped or v-shaped component on the top of the second earclip may attach to a corresponding female cone-shaped or v-shaped hole component on the frames. In other embodiments, the second earbud may be directly coupled to the frame, without use of the earclip.

In some embodiments, the first and second microphones of the hearing assistance system are configured as directional microphones.

In some embodiments of the hearing assistance system, the amplified representation of the audio signal is an electronic amplified representation of the audio signal that is transmitted to the earphone. In other embodiments, the amplified representation of the audio signal is an acoustic amplified representation of the audio signal that is transmitted to the earphone.

In some embodiments, the hearing assistance system includes an accelerometer that detects vibration, such as the user's own voice or banging of the frames, and squelches the noise from the vibration from the amplified representation of the audio signal. The amplified representation of the audio signal is then transmitted to the earphone with the noise from the vibration at a lower volume.

In some embodiments, the frame of the system is coupled to a first hollow tube, such that that the acoustic amplified representation of the audio signal reverberates off of the inside walls of the first hollow tube. In embodiments, the first hollow tube is made from rubber. In example embodiments of the system, the first earphone is configured with a rubber hollow tube, such that the amplified representation of the audio signal reverberates off of the inside walls of the rubber hollow tube. In other embodiments of the system, the first hollow tube is connected to a set of metal tubes, wherein the acoustic amplified representation of the audio signal is transmitted to first and to second earphones, which are respectively coupled to the first and to the second ear of the user. In embodiments comprising earbuds that may be attached to earclips, instead of earphones, the earclips (or earbuds if not attached to earclips) are similarly configured with the rubber hollow tube.

In some embodiments of the hearing assistance system, the first and second earphones (or earbuds that may be attached to earclips) are made of soft rubber to create a seal that facilitates blocking out environmental noise.

In some embodiments of the hearing assistance system with two earphones (or the earbud that may be attached to an earclip), the amplified representation of the audio signal is transmitted to the first earphone connected to the first ear, and a second earphone connected to the second ear, respectively through respective channels enabling the user to hear the amplified representation of the audio signal in stereo in the first and second ears.

In some embodiments of the hearing assistance system with two earphones, the first earphone is configured with a stiff flexible plastic membrane in a speaker that vibrates in response to the amplified representation of the audio signal transmitted via an electrical connection to the frame. In some embodiments, the system of the speaker underneath the flexible plastic membrane is a metal coil that is configured to be coupled to a magnet portion of the frame, such that when the metal coil portion of the first earphone makes electromagnetic contact with the portion of the frame, the metal coil is magnetized causing the flexible plastic membrane of the first earphone to vibrate and thereby transmit the amplified representation of the audio signal to the first earphone coupled to the user's first ear.

In one example preferred embodiment, the earphone (or the earbud that may be attached to an earclip) connects to the frames via sealed tube, which provides a constant amount of air, and facilitates a pressure wave going through the tube to the earphone. At the end of the tube, is a stiff, flexible, thin plastic membrane in the earphone that creates an air seal at the end. A sound sound/pressure wave transmitted from the glasses frame through the tube. The change in air pressure in the tube moves the membrane. In this way, an active speaker transducer embedded in the glasses transmits the wave through the tube to the earphone.

In embodiments of the hearing assistance system with two earphones (or the earbud that may be attached to an earclip), the first earphone is configured with a stiff flexible plastic membrane of a thin material. Air sealed tubes facilitate transmission from the glasses frame to the earphone. There is no magnetic action on the membrane. The method of connecting the other end of the tube to the glasses is magnetic.

The hearing assistance system may contain a first earphone (or the earbud that may be attached to an earclip) that includes passive noise-canceling padding and high-density foam to prevent ambient sound waves from reaching the user's first ear. The system may contain a first earphone that includes active noise-canceling to mask low-frequency sound waves of ambient noise to cancel unwanted sound.

In some embodiments of the hearing assistance system, the frame provides an electrical power source to the first and second earphones (or the earbud that may be attached to an earclip), which are batteryless. In some embodiments, the earphones are batteryless. In embodiments, the frame provides the power source to the first earphone. In some embodiments, the frame further comprises a fastener that facilitates an interlock and an electrical connection with a portion of the first earphone, such that when the first earphone is fastened to the frame via the fastener, the first earphone is electrically powered to receive an electrical transmission of the amplified representation of the audio signal. In some different embodiments, the fasteners may be cone-shaped, v-shaped, or barrel shaped. If electrical connection with the frame is lost, the earphone may be without electrical power. In embodiments, the earphone is substantially free of electrical components.

In related embodiments, the second microphone of the device is situated at a front portion of one side of the frame or at a ribbon microphone at the bridge of the frame.

In some embodiments of the device, the first lag microphone and a second microphone both are situated on the first side of the frame.

In some embodiments, the first transducer of the hearing assistance device further comprises a third microphone configured to receive an audio signal of the speech of the user. In example embodiments, the third microphone receives auditory instructions from the user that are translated into computer readable instructions, which direct one or more computer processors embedded in the frame to perform electronic tasks.

In example embodiments, the hearing assistance device further comprises a first capacitive touch sensitive area to control a function of the device. When the user touches the first capacitive touch sensitive area, the device translates the touch into computer readable instructions, which direct one or more computer processors embedded in the frame to perform electronic tasks. In particular embodiments, the first capacitive touch sensitive area is a "what" button, which allows a user to retrieve and play the audio signal stored in storage. In embodiments, the "what" button is configured to retrieve previously stored versions of the amplified or unamplified representation of the audio signal.

In further example embodiments, the hearing assistance device may communicate with an electronic interface on another device, such as a mobile phone, to control or monitor functions of the hearing assistance device. When the user controls the device through the electronic interface, the electronic interface may translate the user input into computer readable instructions or electronic signals to be transmitted to processors in the frames to perform corresponding electronic tasks. For example, the user may configure the lag microphone sensitivity using an option on the electronic interface, which in turn may be transmitted to the frames as an electronic signal to amplify the variable gain of the audio signals from the lag microphone. In some embodiments, an application programming interface (API) may be provided with instructions and signals supported by the frames, so third-parties may design additional electronic interfaces to be used to control or monitor the hearing assistance device.

In some embodiments, the electronic interface may allow the user to tune the parameters of the audio signals processed by the hearing assistance device. The electronic interface may allow the user to tune the amplitude of volume, frequency, pitch, or other such equalization levels for the microphones, headsets/earbuds, Bluetooth modules, or other components by sending corresponding instruments or signals to the frames. In some embodiments, the user may individually tune the device according to different activities or environments and store the settings to switch back to in the future. In related embodiments, preset, default settings for different activities and environments may be provided for selection of the user on the electronic interface, and the user may use the default preset for an activity or fine tune and save the preset according to his/her own preference. In some embodiments, the device may automatically switch to certain presets for certain environments or activities based on the user's actions, such as answering a phone call, or location, such as entering a restaurant.

In some embodiments, the hearing assistance device may provide language translation. The device may include a converter configured to convert the audio signal to a first digital representation of the audio signal which includes language translation of the speech into a first language. The device may also include a controller configured to perform speech recognition of the first digital representation of the audio signal and then compare the digital representation of the audio signal to a lookup table stored in the memory. In other embodiments, the controller may use mathematical algorithms or spectral representation instead or in conjunction with the lookup table. The controller also configured to convert the first digital representation of the audio signal to a second digital representation of the audio signal, wherein the second digital representation of the audio signal is a translation of the speech of the first language into a second language. The controller also configured to convert the second digital representation of the audio signal to a voice modulated audio signal including speech in the second language, which is output to the user through the ear bud speaker, or to an external speaker, or to computer readable text for visual display, transmissions, or such.

In some embodiments, the device may use speech recognition to enhance the speech. In such embodiments, a converter may be configured to convert a first audio signal to a first digital representation of the first audio signal. Then a controller may be configured to perform speech recognition of the first digital representation of the audio signal, in which the first digital representation is translated to text and all noise not recognized as speech removed during the translation. In some embodiments, the controller may compare the text to a lookup table in memory and generate corresponding new text in a different language. In other embodiments, the controller may use mathematical algorithms or spectral representation instead or in conjunction with the lookup table to generate corresponding new text in a different language. Then the controller may be configured to convert the text or new text to a second digital representation of a second audio signal and convert the second digital representation to an audio signal in a different pitch or frequency than the first audio signal, which is output to the user through the headset or earbud speaker.

The controller may be configured to provide various other functions by converting speech to text, and then optionally converting the text to a new audio signal of that speech. For example, in some embodiments, the controller may remove non-speech noise from the speech heard by the user. In the same or different embodiments, the controller may be configured to amplify the audio signal at a low volume, and then increase the amplification when certain words or phrases are detected, which may aid in the user's ability to filter speech in various situations (e.g. noisy or chaotic situations). In other embodiments, when the audio is converted to textual representation, the text may also be visually displayed to the user or others on other devices communicated with the hearing assistance device, such as a mobile phone or laptop, or on the lens of the glasses. In embodiments involving language translation, the controller may not only translate speech to another specified language for the user, but the translation may be presented to the user as text or new generated speech (using a different human voice or modulated voice) that is easier for the user to hear than the original speech. In some such embodiments, the controller may be configured to allow two or more users, conversing in two or more different languages, to each see text or hear the speech from the other users in that respective user's own native or chosen language, and may communicate back to the other users in that respective user's own native or chosen language.

In example embodiments, a pitch shift method is applied to the audio signal received by a microphone of the hearing assistant device to allow the user to hear the emitted amplified audio signal.

In example embodiments, the device further comprises a skull connection, wherein the audio signal received by the first transducer is converted to bone conduction of sound through the skull connection. In some of the example embodiments, the skull connection may be a cheek bone area connection.

In example embodiments, the device may further include an intercom mode in which different users of the assistant hearing devices may communicate between the devices similar to walkie-talkies, using Bluetooth source and sync modes.

In example embodiments, the hearing assistant device further comprises a temple area connection to monitor vital signs.

In another example embodiment, the hearing assistant device may also comprise a visual assistant device by using ultrasound for echolocation to measure distances to surrounding objects, and then using the measurements to generate tones, or other signals, based on the position and/or distance to the objects. As a user moves or scans his or her head in different directions (e.g. left to right or up and down), the changes in tones generated by the visual assistant device may allow the user to hear an audio representation of the surrounding objects, or to receive and/or communicate other signals (e.g., touch, visual stimuli, or text) representing surrounding objects.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2D shows a composition of a directional velocity ribbon microphone according to an embodiment of the disclosure.

FIGS. 2L, and 2L1 through 2L-6 show composite sketches according to embodiments of the disclosure.

FIGS. 2M-1 through 2M-11 show embodiments for connecting an earbud to the frames of the hearing assistance device.

FIGS. 2N-1 through 2N-9 show views of the hearing assistance device according to embodiments of the disclosure.

FIG. 3 shows a system diagram of the hearing assistance device according to an embodiment of the disclosure.

DETAILED DESCRIPTION

A description of example embodiments of the invention follows.

The teachings of all patents, published applications and references cited herein are incorporated by reference in their entirety.

Hearing assistance devices such as hearing aids include sophisticated electronic components built in small compartments that are customized to fit the shapes of outer ear of users. The components of these hearing assistance devices are expensive to replace. For example, the speaker of a hearing aid may be connected to the main body through an electric wire. The surface of the speaker may be clogged with foreign substances (such as ear waxes), and the speaker is easy to lose. Unfortunately, the replacement cost for a hearing aid speaker is quite high. Further, since the electronic circuit of the hearing aid is cramped into a small compartment, the batteries for the hearing aid may be small and may need to be replaced more often due to the small size of the batteries. Additionally, hearing assistance or hearing assistant devices often have tubes coming out of the ear and can draw sometimes unwanted and embarrassing attention to the user's handicap because the tubes are of noticeable size. Therefore, there is a need for hearing assistance devices that may cost less to build with long lasting batteries that are easily replaced.

Hearing assistance or hearing assistant devices focus on processing sound, but these devices do little to assure that the best possible sound comes in and out, for example, clarity of sound and natural sound. Many traditional hearing assistance or hearing assistant devices use only digital signal processing and most can only process sounds up to 6 kHz or 8 kHz, which is a major flaw that impacts the ability of traditional devices to reproduce music or harmonics. Additionally, traditional devices do not have the ability to place the microphone or microphone array any appreciable distance from the ear. For example, many hearing assistance devices have the disadvantage of having the microphone in your ear instead of in the best location for picking up sounds you want. Also, in traditional devices, the speaker is generally located close to the microphone. This limits the amount of signal gain they can achieve because as gain increases, more of the sound from the speaker will feed back into the microphone and cause feedback squeal. Therefore, there is also a need for hearing assistance devices with microphones placed to enhance clarity of audio signal and to decrease distortion of audio signal.

Figure 1:
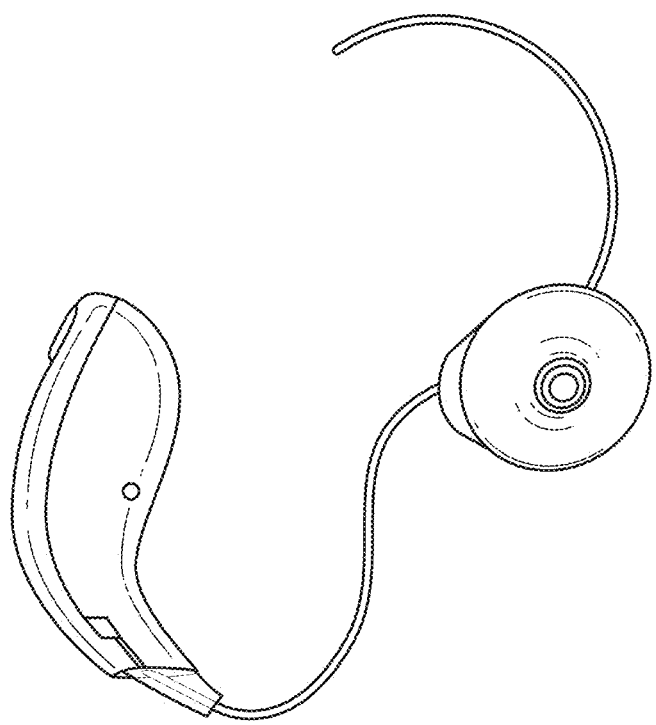
FIG. 1 shows an example of a prior art over the ear hearing aid configuration.

Generally, there are two types of prior art hearing aids. There is an over the ear or behind the ear configuration, which is shown in FIG. 1, and there are in the ear configurations (not shown). Both configurations are relatively expensive since these types of hearing aids include expensive and complex electronic components, which typically have been optimized for the user by an audiologist. Many over the ear and in the ear hearing aids are customized for each user, thus making replacement expensive. The over the ear hearing aid configuration shown in FIG. 1 (commercially available from Oticon as the AgilePro) provides Bluetooth® connectivity via a transmitter that hangs over a person's neck. Such Bluetooth® hearing aids tend to be even more expensive, and suffer from rapid battery drain. For instance, the typical battery life in a Bluetooth® enabled hearing aid may last approximately two days. The in the ear configurations may include the complex electronics inside the user's ear. Both prior art hearing aid configurations, and especially the in the ear configurations, are non-discrete and can be unsightly as they can alert others to the fact that the user of the device may be hearing impaired.

System Overview

A hearing assistance system is provided that assists the transmission of sound signals from microphones to ears of human subjects.

In some embodiments, the inventive device does not have any tubes protruding or coming out of the ears rather the hearing assistance system is built into a device shaped like eyeglasses or glasses. In some embodiments, all electronics are stored in the glasses. The configuration of the electronics for the hearing assistance system in the glasses may help reduce costs because many hearing assistance devices are expensive. Replacement of lost or broken hearing assistance devices can be costly for the user because the entire device must be replaced. In some embodiments, an earphone or ear bud is used in the hearing assistance system and is discretely connected to the glasses or built into the glasses. A lost or broken part of the hearing assistance device of the invention, for example, an ear bud, can be replaced at little cost to the user because the cost of an ear bud is nominal.

The ear bud or earphone may have various shapes or styles and be made of various materials. For example, a solid foam ear bud assists with noise isolation, a thin mushroom shaped silicone earphone creates a light fit, a spherical soft foam provides comfort. In embodiments, the earphones are made of soft rubber to create a seal that facilitates blocking out environmental noise. In example embodiments, the earphone includes passive noise-canceling padding. In some embodiments, the earphone includes high-density foam. The earphone may contain combinations of materials. For example, the earphone may contain passive noise-canceling padding and high-density foam to prevent ambient sound waves from reaching the user or interfering with the hearing assistance system. In certain embodiments, the earphone is substantially free of electrical components.

In some embodiments, the inventive device has a directional microphone to help select useful sound signals for amplification and optionally further processing. In embodiments, the directional microphone enhances clarity of audio signals. In some embodiments, a third microphone, for example, a mouth microphone is positioned to pick up the user's voice more clearly. Capturing the user's voice as audio background may be used to reduce the muffled sound a user hears of the user's voice, which is referred to as the occlusion effect. This muffling effect can be mimicked by talking with a person's ears plugged, for example by earplugs. In some embodiments, an accelerometer may be used to detect noise vibrations, such as the user's voice, and adjust the audio signals to reduce the volume of the noise vibrations. In some embodiments, a mouth microphone may provide a better audio transmission of the user's voice for connection to your phone.

In some embodiments, the audio signal is processed as an electronic analog signal. Analog processing preserves the directionality of an audio signal by preserving the time delay of audio signal received at two or more microphones. Analog processing may occur at the speed of light allowing for contemporaneous signal processing. Digital signal processing (DSP) leads to processing delay with conversion of audio signals dependent on the computing system performing the mathematical operations. Processing an electronic analog signal allows more, fine-tuned control and clarity compared to the blunter control of DSP where initial processing starts with a more distorted signal.

Electrically Powered Earphone or Earbuds

In some embodiments, the earphone (or the earbud that may be attached to an earclip) may be electrically powered by an interface with the glasses frame. In embodiments, the earphone includes active noise-canceling to mask low-frequency sound waves of ambient noise and to cancel unwanted sound. In some embodiments, the earphones have batteries. In some embodiments, the earphones are batteryless. In some embodiments, the frame provides a power source to an earphone. In some embodiments, the earphones are configured to be electrically powered by respective connections made to portions of the frame. For example, the earphone may be electrically powered by the frame. A fastener or connector may be provided that facilitates an interlock and electrical connection between a portion of the earphone and a portion of the frame. If the electrical connection between the earphone and the frame is lost, the earphone may be without electrical power. In embodiments, the earphone contains a combination of materials and electrical components.

Embodiments of the disclosure may include a device that includes at least one first transducer for receiving sound signals, at least one second transducer for emitting sound signals, and at least one extension tube coupled to the at least one second transducer, in which the at least one extension tube may include a hollowed core from a first end to a second end of the at least one tube. In one embodiment, the first end of the at least one extension tube is sealed with a first membrane, and the second end of the at least one extension tube is sealed with a second membrane. In one embodiment, the hollowed core of the at least one extension tube contains inert gases including air, noble gases, and nitrogen.

Psychoacoustic Earphone

In one embodiment, the earphone (or the earbud that may be attached to an earclip) may be configured to transmit sound using technology similar to a conventional stethoscope. In an example embodiment, the hearing assistance system is a device with a frame coupled to a hollow tube. In some embodiments, the hearing assistance system is a device with a speaker in a frame coupled to the hollow tube. In some embodiments, the frame also includes an amplifier chip. The hollow tube may harness properties of the amplified representation of the audio signal, for example, an acoustic amplified representation of the audio signal, such that the acoustic amplified representation of the audio signal bounces or reflects off of the inside walls of the hollow tube. The mechanism of amplification of the audio signal may involve multiple reflections. The hollow tube may be made of various materials including rubber or metal.

In some embodiments, the hollow tube may be made of a lightweight material. In some embodiments, the hollow tube may be flexible. In embodiments, the hollow tube may allow absorption of sound or audio signal from outside of the hollow tube. In embodiments, the hollow tube may reflect audio signal from inside of the hollow tube to the outside of the tube. The tube may be inserted into a user's ear. In embodiments, the tube may be coated to optimize various properties of the hollow tube. For example, a fuzzy material or coating may be used to block external noise similar to a microphone windsock.

In some embodiments, the hollow tube may have a varying thickness. The different hollow tube diameters may be used to optimize various properties of the hollow tube. The inner diameter of the tube compared to the outer diameter may be such that the hollow tube has a given thickness. For example, the hollow tube may have an outer diameter of $3/32"$ and an inner diameter of $1/32"$ for a hollow tube wall thickness of $1/32"$. For example, the hollow tube may be medical grade tubing. In some embodiments, the hollow tube may be Flexelene™ Tubing FX.

In embodiments, the hollow tube has a flexible, thin membrane like a passive radiator membrane. In some embodiments, the audio signal vibrates the membrane allowing for more efficient sound transmission, especially at lower frequencies. The membrane may remove echo effects.

In embodiments, an earphone is configured with a hollow, rubber tube. For example, the amplified representation of the audio signal is reverberated inside the walls of the rubber tube and emitted to the earphone. The earphone may be used to hold the hollow tube in place and may be used to block external sound.

In some embodiments, the hollow tube is connected to a set of metal tubes. The set of metal tubes may carry the amplified audio signal in stereo to the user. In some embodiments, the metal tubes may be connected to earphones of the hearing assistance device.

Wearable Computing System Architecture

In one embodiment, the device may be wearable by a human subject. In some embodiments, a device may be mounted on a frame configured to be worn on the head of a user, the frame including a bridge configured to be supported on the nose of the user. In one specific embodiment, the device may be mounted on human head in the form of a glass frame. The glass frame may include two rims to hold glasses, two temples each coupled to one rims, and a bridge that connects the two rims. In some embodiments, the first temple (the first side) is configured to be positioned over a first temple of the user with the free end disposed near a first ear of the user while the second temple (the second side) is configured to be positioned over a second temple of the user with the free end disposed near a second ear of the user. In some embodiments, the sides or arms of the frames may be less than 5 mm high. In preferred embodiments, the sides or arms of the frames may be about 3 mm high.

In one embodiment, the at least one first transducer may include at least two microphones configured to receive an audio signal including speech. In some embodiments, the at least two microphones are positioned such that a first lag microphone is situated at a rear portion of a first side of the frame and a second microphone is situated at a front portion of the frame, for example, at a front portion of one side of the frame or a ribbon microphone at the bridge of the frame. In one embodiment, the at least one first transducer may include a lead microphone and a lag microphone where the lead microphone is arranged to be situated at a front portion of one temple of the glass frame and the lag microphone is arranged to be situated at a rear portion of one side of the glass frame. In example embodiments, the lag microphone is situated at a location on the rear portion of one side of the frame such that the lag microphone is not placed behind the ear canal entrance. Additionally, the lag microphone is situated at a location wherein the distance between the speaker and the lag microphone on the frame allows increased signal gains without causing the user to hear feedback noise, such as squealing. In example embodiments, the second microphone, for example, a lead microphone is situated at the front portion of one side of the frame such that the user's head blocks sound. For example, a lead microphone on the right side of the frame is positioned so that the user's head blocks sound coming from the left side. The lead microphone and the lag microphone may be directional microphones that are oriented to receive sound input from a particular direction. In some embodiments, the first and second microphones may be directional microphones that are oriented toward the front of the frames.

In one embodiment, the at least one first transducer may include a third microphone that may be arranged to be situated on one rim of the glass frame below the bridge. The third microphone may be oriented toward below for capturing sound from the mouth of the human subject. In some embodiments, the first transducer further comprises at least one microphone (a third microphone) configured to receive an audio signal including speech from the user. In example embodiments, the third microphone is situated as close to the user's mouth as possible to receive audio signal consisting essentially of the user's speech. In some embodiments, the user's speech is input as audio background to reduce effects such as muffling or distortion of sound and the occlusion effect. In embodiments, the third microphone receives the user's speech as auditory instructions. In some embodiments, the auditory instructions from the user are translated into computer readable instructions, which direct one or more computer processors. The computer processors may be embedded in the frame to perform electronic tasks. The computer processors may be external to the hearing assistance device and accessed either through a wireless connection or a direct connection to an external device such as a mobile phone.

In some embodiments, user instructions may be communicated to the hearing assistant device using an electronic interface on another device, such as a mobile phone, to control or monitor functions of the hearing assistance device. When the user controls the device through the electronic interface, the electronic interface may translate the user input into computer readable instructions or electronic signals to be transmitted to one or more processors on the frames to perform corresponding electronic tasks. For example, the user may configure the lag microphone sensitivity using an option on the electronic interface, which in turn may be transmitted to a processor on the frames as an electronic signal to amplify the variable gain of the audio signals from the lag microphone. The user may use the electronic interface to control or monitor various functions regarding the various microphones, including volume, pitch, frequency, and other components of the audio. In some embodiments, an application programming interface (API) may be provided with instructions and signals supported by the frames, so third-parties may design additional electronic interfaces to be used to control or monitor the hearing assistance device.

In embodiments, a second transducer may emit the amplified representation of the audio signal to, for example, a speaker. In example embodiments, the speaker is an earphone coupled to an ear of the user. At least a portion of the earphone may be removably coupled to at least a portion of the frame. For example, when the earphone is in contact with the portion of the frame, the earphone is configured to emit the amplified representation of the audio signal to an ear of the user.

In some embodiments, the hearing assistance device may further comprise a third transducer. In embodiments, the third transducer may emit the amplified representation of the audio signal to, for example, a speaker. In example embodiments, the speaker is a second earphone coupled to a second ear of the user. At least a portion of the earphone may be removably coupled to at least a portion of the frame. For example, when the second earphone is in contact with the portion of the frame, the second earphone is configured to emit the amplified representation of the audio signal to a second ear of the user. Therefore, in some embodiments, the hearing assistance device may comprise a frame configured to be worn on the head of the user, three transducers, at least two microphones, and two earphones configured to emit an amplified representation of the audio signal to the ears of the user.

The audio signal may, for example, be speech, real-time audio input, recorded audio input, or auxiliary audio input. A converter may be configured to convert and to amplify the audio signal to an amplified representation of the audio signal. The amplified representation of the audio signal may be, for example, an electronic amplified representation of the audio signal or an acoustic amplified representation of the audio signal.

The at least one second transducer may include a speaker that may be arranged to be situated toward the tip of the side of the glass frame. The speaker may include a tongue on which the first end of the extension tube is coupled to. When coupled to the tongue, the first membrane at the first end of the extension tube may be pressed against the tongue. The extension tube or hollow tube may also be attached to the glass frame using a connector (e.g. v-shaped, cone-shaped, or barrow shaped connector). For example, the attachment may be formed magnetically such as through the use of a ring magnet. The second end of the extension tube may be inserted into the inner ear of the human subject to receive sound from the speaker. The hollow tube may be made of various materials with an optional coating. In embodiments, the first membrane is a flexible plastic membrane that vibrates in response to the amplified representation of the audio signal. In some embodiments, a flexible hollow tube is configured with a flexible plastic membrane. In example embodiments, the flexible plastic membrane vibrates in response to sound waves transmitted from the speaker in the frame and through the hollow tube. In some embodiments, the hollow tube optionally configured with a flexible plastic membrane is connected to an earphone. In embodiments, the tube or passive radiator is connected to the speaker through a magnetic connection. In some embodiments, the speaker connection to the hearing assistance device is wireless.

In some embodiments, the speaker is connected to the hearing assistance device with a wire. The wired speaker may include a ring magnet that is optionally a ring magnet connection. In example embodiments, the hearing assistance system includes underneath the flexible plastic membrane of a speaker is a metal coil that is configured to be coupled to a magnet portion of the frame. In embodiments, the metal coil portion of the earphone makes electromagnetic contact with a portion of the frame. The electromagnetic contact may magnetize the metal coil of the speaker causing the flexible plastic membrane of the speaker to vibrate and thereby transmit the amplified representation of the audio signal into the user's ear. In some embodiments, the speaker is coupled to the earphone. In some embodiments, the wired speaker is adjacent to the earphone.

The device may further include an electronic circuit coupled to the microphones and to the speaker. The electronic circuit may convert sound signals received at the microphones into electronic signals, suppress noise, selectively amplify useful sound signals, and output the cleaned and amplified sound to the speaker. The electronic circuit may include an accelerometer which may detect noise vibrations, such as the user's voice or banging the glasses, and adjust the volume of the noise vibration in the sound signals. The electronic circuit may be embedded in one side of the glass frame.

Directional Microphones

In some embodiments, the microphones are directional. In some embodiments, an analog signal is received by the microphones. In embodiments, the difference in time between the lead microphone and the lag microphone receiving sound signals may assist the system in selectively amplifying useful sound signals. For example, the lead microphone may amplify positive audio signal while the lag microphone may amplify negative audio signal so that audio signal or sound arriving from the side of or behind the glasses frame subtracts out. As an illustration if the lead microphone receives an audio signal of 1.0, and the lag microphone receives an audio signal of −0.6, then the system is left with an audio signal of 0.4, which makes the audio signal directional.

In some embodiments, the cleaned and amplified sound signals may undergo further processing using, for example, digital signal processing. Examples of further processing include applying equalizers, frequency shifting, dynamic range compression, and frequency compression. The user may adjust the levels of such using an electronic interface which may transmit the adjustments as signals to a processor on the hearing assistant device. The processor may apply these signals as variable gains to amplify the sound signals at the microphones.

Directional microphones, for example, the lead microphone, lag microphone, mouth microphone, and ribbon microphone, of the hearing assistance device are in better locations to pick up or capture useful audio signals. In embodiments, the directional microphone enhances clarity of audio signals. In some embodiments, a third microphone, for example, a mouth microphone is positioned to pick up the user's voice more clearly. Capturing the user's voice as audio background may enhance clarity and may mimic natural sound environments better while reducing effects such as the occlusion effect. In some embodiments, a mouth microphone may provide a better audio transmission of the user's voice for connection to your phone.

In some embodiments, the analog audio signal is like the negative of a photograph while a digital audio signal is like an old photograph. The old photograph can be restored by digital processing, but there is a limit on the clarity and improvements that can be made to the old photograph by processing. However, by using a negative to make a new photograph, the result is as good as one can make it. The analog audio signal can also be compared to higher resolution photographs. For example, the evaluation of the photographs taken by spy planes is only as good as the resolution of the cameras. The evaluation can continue to zoom in on a low resolution photograph, but it's harder and harder to make sense of the picture because of distortion and pixilation. Evaluation by sharpening the image to try to make sense of the photograph can be tried, but sharpening the image introduces artificial elements to the photograph based on how the digital processing identifies the edges and other features. The better solution is to take a higher resolution picture in the first place and to print that image in high resolution.

Furthermore, typical hearing aids may only process sounds up to 6 kHz or 8 kHz, which impacts the user's ability to reproduce certain sounds, such as music. Using the analog audio signal, the device may extend to 20+ kHz allowing the full range of audio to reach the user, including harmonics which may be critical in the case of certain hearing deficiencies. For example, if a user has a deficiency hearing 6 kHz, the device may reproduce a first harmonic of 12 kHz to attempt to allow the user to better hear the 6 kHz frequency. The human brain uses a phenomenon called "missing fundamental" in which the brain may detect a frequency that is not actually present by detecting the first harmonic of 12 kHz. That is, by the device producing a strong 12 kHz signal, the harmonic of the 6 kHz sound in this example, the user will detect the 6 kHz frequency. This phenomenon is most commonly known in common telephone systems, which typically filter out sounds lower than 300 Hz, although a male voice has a fundamental frequency approximately 150 Hz. Because of the "missing fundamental" effect, the fundamental frequencies of male voices are still perceived as their pitches over the telephone.

Power Supply

In one embodiment, the device may further include a rechargeable battery to supply powers to the electronic circuit. In one embodiment, the shape of the rechargeable battery is a tube that may constitute part of the side of the glass frame. In one embodiment, the electronic circuit and the rechargeable battery is on a first side of the glass frame, and the front microphone, lag microphone, and the speaker is on a second side of the glass frame. In embodiments, a rechargeable battery is located on each side of the frame in order to balance weight. In some embodiments, the size and weight of a rechargeable battery located on a first side of the frame is different from the size and weight of a rechargeable battery located on a second side of the frame. In some embodiments, the power supply is provided by a custom battery similar to a "lipstick" battery for phone charging or the battery used in electronic cigarettes. The battery may contain a metallic flat side so that the battery may be attached to the side of the frame through magnetic attraction. In example embodiments, the battery may also be magnetic (contain magnets). In some embodiments, the rechargeable battery is a lithium-ion battery. In some embodiments, the rechargeable battery is a lithium-polymer battery. The lithium battery may include a battery regulation/charging circuit board inside the battery or inside the battery case. The battery case or main casing may be designed in various styles, shapes and colors so that the battery may form part of the frame design. A regulation/charging circuit board may increase stability and prevent fire or combustion. In embodiments, the circuit board contains regulation/charging circuitry including the mini-USB charge input connector.

The rechargeable batteries may have varying storage capacities that may affect battery lifetime. In some embodiments, the mAH capacity rating (measured in milli-ampere hours) refers to how much current a battery will discharge or deliver over a period of time (typically a one hour period). For example, the battery may supply about 850 mAH at 5 volts.

Cone Shape Interlock/Connector

The earphone may include a cone shaped interlock (connector) to interface with the glasses' frame to facilitate sound transmission. The interlock/connector portion at the earphone may be configured in a male cone shape. The interlock/connector portion in the glasses frame is a female funnel shaped hole. In embodiments, the female funnel shape hole bottom half electrically connects speaker (plus), then a gap of 1 mm, then the top half will electrically connects speaker minus.

The earphone may be configured with a matching cone male funnel shape interlock/connector, while the frame of the glasses is configured using a female funnel (hole), which includes a ring magnet around its outside, and the male funnel is steel. In this way, the male and female interlock/connectors attract and make the connection. In embodiments, the funnel shapes are relatively small, e.g. about 3 mm round, 4 mm deep. The female funnel includes 2 or 3 spring-action copper tabs on the inner walls to provide sufficient contact (similar to a house phone charging docking station).

V-Shaped Interlock/Connector

In a similar embodiment to the cone shape interlock/connector, an alternate V-shaped connector may be used to connect an earbud to the frames. In this embodiment, an earbud may attach to an arching shaped earclip that may be positioned over the user's ear. At the top of the earclip is a ball joint with an attached male "V" shaped interlock/connector made of plastic with copper or steel sheeting beneath. A strip with a female "V" shaped hole also made of plastic with copper or steel sheeting may be mounted on the glasses where the ear meets the skull. Preferably, the strip is aligned with thin magnets, and the thin magnets have to be strong enough to have a secure electrical contact, yet not so strong that as to pulls the earbud out when removing the glasses or interfere with the microphones. The male "V" shaped connector on the earclip fits into the female "V" shaped hole on the mounted strip, and the thin magnets pull the connection tight, in the same manner as the coned shaped connector.

The "What" Button

The device may further include a number of touch sensors on the sides of the glass frame to receive instructions from the user. The touch sensors may be coupled to the electronic circuit which is to perform the functions of the instruction. In one embodiment, the device may include a touch button which, when activated by pushing the button, sometimes referred to herein as a "what" button, is to cause an audio clip (or other captured data) to be replayed. A "what" button may be configured to retrieve previously stored versions of the amplified or unamplified representation of the audio signal.

Tuning Software

Tuning software may be provided to enable volume, frequency, harmonic, and other equalization adjustments to the audio transmitted from the glasses frame to the earphone. The tuning software may be controlled through an electronic interface on, for example, a mobile phone to optimize the sound quality of the audio transmission to the user/listener so that it is customized to address the listener/user's hearing deficits. The tuning software may be configured to allow the user/listener to customize sound quality for specific environments or activities engaged by the user/listener. The user/listener may be provided with default setting for particular environments and activities, such as watching television at home, and may use the default setting or further fine tune and save the setting for that preset.

In some embodiments, a user/listener may be provided default volume, frequency, harmonic, and other equalization levels for an environment (e.g. at a restaurant), and may want to fine tune those levels to his/her own preference based on his/her hearing deficits. From the electronic interface, the user may select the "Restaurant" preset option to set the default restaurant setting, and then may use options on the electronic interface to further tune the default restaurant settings. The electronic interface may allow the user to tune lead and lag microphone components, such as tuning the lead microphone sensitivity and lag microphone sensitivity to adjust the amplitude of the audio signals from the lead and lag microphones. The device may also include an accelerometer which may be used to reduce vibration noise, and the electronic interface may allow the user to tune the sensitivity of the accelerometer and the reduction in volume due to a detected vibration. Similarly, the electronic interface may allow the user to tune the earbud/headset or Bluetooth microphone, such as tuning the earbud noisegate to filter noise from the signal or earbud sensitivity to adjust the amplitude of the signal at the earbud microphone. The electronic interface may further allow the user to tune the volume of the left and right speakers. Then, the electronic interface may also allow the user to save the results of these adjustments under the same "Restaurant" option to use again the next time the user is at a restaurant. The user may switch between the presets as their environment or activities change by selecting the corresponding preset on the electronic interface. For example, the user/listener may be watching television at home using the "Home TV" preset, then receives a phone call and switches to the "Phone Call" preset, and when the phone call ends, switch back to the "Home TV" preset.

In some embodiments, the device may automatically switch to certain presets for certain environments or activities based on the user's actions, location, or selected audio type (e.g. ambient sound, streaming music, phone call, or sound in/out to an offboard computing device such as a smartphone). In some embodiments, a mobile phone or other device may send a signal using an electronic interface to the hearing assistance device with the user's location, for example detecting the user entered a theater or a restaurant, or the user's actions, for example answering a phone call and the device may automatically switch to an appropriate preset mode. In other embodiments, the hearing assistance device may detect the location or action directly, without the use of another device and may automatically switch to an appropriate preset mode. For example, the user may have the device set to normal listening mode, but then a phone call may be received, and the hearing assistance device may detect the phone call and automatically switch to the "Phone Call" preset. When the call has ended, the device may then automatically switch back to the previous mode, in this example normal listening mode. The automatically switching is a preferred embodiment of the device because modes have different settings that are sometimes incompatible with certain environments or activities, and manually switching may cause an inconvenience to the user. For example, the user may want to talk on the phone using the device, without the automatic switching function, the user would have to manually switch to the "Phone Call" preset or adjust the settings to be able to speak/hear on the phone. Then when the call was ending, the user would have to manually adjust the settings (e.g. volume, frequency) prior to the end of the call, or else the "Phone Call" settings may cause various hearing issues for the user (e.g. feedback) now that the user is no longer on a phone call.

In one embodiment, the tuning software provides pitch shift tuning, so that the user/listener is able to shift the frequency of the audio received at the earphone so that it is the range that the user/listener can her. Some listeners that are hearing impaired may be able to hear certain frequencies well, while they are unable to hear other frequencies. Conventional hearing aids tend to address this typically by amplifying the sound, which could potentially further degrade the user's hearing. However, with the inventive shift tuning, the user/listener can shift the frequency of the audio so that all audio transmitted to the earphone is within the range that the user/listener can hear. In this way, further hearing degradation may be avoided since frequencies that the user/listener is unable to hear are not amplified, which can be potentially deafening (further hearing loss) over time.

The tuning software may be configured with psychoacoustic harmonic amplification. With missing fundamental phenomena, for example, a listener/user may only be able to hear at 200 hertz; since all frequencies have harmonics, if the listener/user cannot hear at 200 hertz, the invention may amplify the harmonics of the signal at 800 hertz, or 1600 harmonics. By hearing the harmonics, the brain of the user/listener assumes the fundamental is there and hearing may be improved without increasing the overall volume of the audio.

The tuning software may be configured with a basilar membrane equalizer. The basilar membrane in the ear has critical bands, such that each area along the membrane can hear a series of sound. The tuning software may optimize the audio so that it matches the basilar membrane.

Hearing Protection

Embodiments of the disclosure may include hearing protection that blocks or suppresses damaging environmental noise. These embodiments may protect the wearer by blocking sound waves of damaging environmental noise from reaching the wearer's ears, including masking damaging sound waves of high-frequency and low-frequency noise. Some of these embodiments include earbuds made of soft rubber that fit directly in the ears and creates a seal with the ears that facilitates blocking damaging environmental noise. These embodiments may further block the damaging environmental noise by the use of earbud material, such as passive noise-canceling padding and solid high-density foam, which increases the amount of dB in isolation for the earbuds. Some of these embodiments may also block the damaging environmental noise by the use of active noise-canceling to mask specific frequency sound waves of damaging environmental noise, and to cancel or reduce the unwanted sound.

Thus, in these embodiments, the wearer may be protected from ambient sound waves reaching his/her ears, and instead only hear sound output through the device at the audio levels configured at the device. For example, the earbuds in these embodiments may provide a minimum of 25 dB of sound isolation, but the wearer may set the audio level on the device to +25 dB so that the device may output sound to the wearer nearly as if the earbuds are not in the wearer's ears.

Embodiments of the disclosure may protect the wearer from damaging environmental noise by automatically adjusting the amplitude of the sound output to the wearer. In some of these embodiments, when the amplitude of volume, frequency, pitch, or other such audio parameters detected by the device are determined to be at damaging levels, the device may automatically adjust the amplitude of each parameter to a level safe for the wearer. Further, the wearer may also configure a preset to tune the amplitude of volume, frequency, pitch, or other such audio parameters to preferred safe levels according to different environments. As such, if the wearer knows that in certain circumstances he/she may be exposed to damaging environmental noise, the wearer may proactively configure a preset with preferred safe levels for switching to when in that environment.

The hearing protection embodiments of the device may be useful for any individual exposed to damaging noise, such as working at a construction site, attending a concert, or in various military environments. For example, in the context of the military, the troops may be supplied with an embodiment of the device that utilizes earbuds with noise-canceling padding and solid high-density foam. As such, the troops may only hear sound output through the device at the audio levels configured at the device. The device may then automatically adjust audio levels when troops are exposed to damaging noise. Further, a preset may also be configured for each soldier to switch to a preferred safe level for a particular environment when exposed to damaging noise, such as near battle, near a helicopter, other such military environment.

Heightening Hearing Capabilities

Embodiments of the disclosure may allow the wearer to hear sounds outside of normal hearing capabilities, acting as "binoculars for the ears." In some embodiments, a pitch shift method is applied to the audio signal received by a microphone of the hearing assistant device to allow the user to hear emitted amplified audio signal. In some embodiments, by raising or lowering the original pitch of the received signal, the pitch shifting method allows a user to hear sounds (emitted and optionally amplified audio signals) normally outside of the detectable frequency range of the inner ear, or outside the detectable frequency range of human hearing, by shifting the input audio spectrum or signal. For example, a wearer may detect an audio signal in the 50 kHz frequency range, but the pitch shifting method may shift the audio signal by one-tenth to an audio signal of 5 kHz. At this heightened hearing level, the wearer may detect sounds normally inaudible to a human, such as, detecting bearing problems in a jet engine. In some embodiments, the shifted audio signal may undergo further processing include applying equalizers, frequency shifting, dynamic range compression, and frequency compression, which may be applied by the device processor as variable gains to amplify the sound signals at the microphones. This may be used for notch filtering the sound to detect certain sounds while removing other sounds. The levels of these parameters may be configured using an electronic interface, such as an app on a mobile device, to a preferred setting, and then transmitted to the hearing assistant device processor for application.

Embodiments of the disclosure may include other features that aid in enhancing the receiving and adjusting of audio signals to allow the wearer to hear sounds outside of normal hearing capabilities. In some embodiments, the inventive device has a directional microphone to help select useful sound signals for amplification and optionally further processing. In some of these embodiments, the directional microphone enhances clarity of audio signals. Furthermore, in some embodiments, a third microphone, for example, a mouth microphone is positioned to pick up the user's voice more clearly. Capturing the user's voice as audio background may be used to reduce the muffled sound a user hears of the user's voice, which is referred to as the occlusion effect. See FIG. 3. Moreover, in some embodiments, an accelerometer may be used to detect noise vibrations, such as the user's voice, and adjust the audio signals to reduce the volume of the noise vibrations. See FIG. 4B.

In some embodiments, the device may use speech recognition to enhance the received speech to allow the wearer to hear sounds outside of normal hearing capabilities. In such embodiments, a microphone receives an audio signal of speech by individuals in proximity to the user or source. The microphone is connected to a converter or a transducer that converts the first audio signal to a first digital representation of the first audio signal. The digital representation may be enhanced by converting in a manner to remove or reduce noise besides the individuals' speech. Then a controller may be configured to perform speech recognition of the first digital representation of the audio signal, in which the first digital representation is translated to text and all remaining noise not recognized as speech of the one or more individuals is removed during the translation. The text format may be further enhanced to adjust the speech of a subset of the one or more individuals located outside of the detectable frequency range of human hearing.

The controller may be further configured to also convert the text to a second digital representation and convert the second digital representation to a second audio signal in a different pitch and frequency than the first audio signal (i.e. new speech), and may further adjust the digital representation to allow the wearer to hear sounds outside of the detectable frequency range of human hearing, which is output to the user through the headset or ear bud. The new generated speech may be output to the user as a different human voice or modulated voice that is easier for the user to hear than the original speech. In some embodiments, the controller may completely remove or reduce non-speech noise from the speech heard by the user. In the same or different embodiments, the controller may be configured to amplify the audio signal at a low volume, and then increase the amplification when certain words or phrases are detected, which may aid in the user's ability to filter speech in various situations (e.g. noisy or chaotic situations). As such, the adjusted audio signal may now allow the wearer to hear speech that may be outside of normal hearing capabilities.

The heightened hearing capabilities embodiments of the device may be useful for various applications apart from addressing hearing deficiencies, including military intelligence, journalism, and automotive repair.

Physiological and Physical Measurements

Embodiments of the disclosure may include sensors for physiological and physical measurements. In these embodiments, the sensors may be placed in varying location on the frame of the hearing device to take measurements of the wearer's vital signs and other such functions, or may be used to take such measurements of another individual. In some of these embodiments, a sensor may be place on both arms of the frames near the front in order to provide connection to the temple area of the wearer. In some embodiments, a sensor may be placed in other areas on the arms of the frame as a capacitive touch sensitive area that the wearer my touch with his/her finger, wrist, or other body part. In these foregoing embodiments, the sensors may measure vital signs, such as pulse/heartbeat, temperature, blood pressure, respiratory rate, and blood oxygen saturation; skin resistance; brain functions; or other such functions. In some embodiments, a sensor may be place on the lens of the frames to measure eye functions, and in some embodiments a sensor may be placed on the front bridge of the frames to measure nasal functions. In some embodiments, a sensor may be placed on the arm of the frames to take additional physical measurements, such as measuring odor, air quality or airborne contaminants, vibrations, visual movements, temperature, or any other related measurement. The device may include various other sensors or components without limitation for taking various physiological and physical measurements, and the device processor provides interfaces to allow flexibility for incorporating any additional sensors or components into the device. The sensors may capture measurements in these embodiments and other embodiments by both transmitting and receiving electronic signals, sound waves or pulses (e.g., ultrasound), light pulses, x-rays, odor detectors, accelerometers, or radiation, or by any other means of capturing physiological or physical measurements.

Embodiments of the disclosure may further process the physiological and physical measurements as part of medical applications. In some embodiments, circuits positioned in the frames may process the measurements as collected by the device sensors to perform medical tests or procedures, such as an Electrocardiogram (EKG), Electroencephalography (EEG), Galvanic Skin Response (GSR), a Stress Test, a hearing test (e.g., audio hearing range test), or any other such medical test or procedure. In some embodiments, the medical tests or procedures may be performed directly by the circuits positioned in the frames or other components incorporated into the frames or otherwise communicatively connected to the frames. In some embodiments, the collected measurements may be communicated to another device using wired connections, Bluetooth, WiFi, or other such communication connections for performing the medical tests or procedures. In some of these embodiments, the collected measurements may be communicated to a medical device, such as an EKG machine or vision testing equipment, for performing the medical tests or procedures. In other embodiments, the collected measurements or results of the performed tests or procedures may be communication to a computing device, such as a smartphone or tablet, for processing by means of a medical program or app, or for downloading for viewing by an individual, such as the wearer for self-quantization or a medical professional.

In some embodiments, the results of the physiological or physical measurements may be used to adjust or tune the hearing assistance device. For example, if the device performs an audio hearing range testing using the device, the device may then use the results of the testing to adjust the setting of the device (e.g. volume, frequency, pitch, or other such audio parameters). In some embodiments, the audio hearing range testing with optional adjustment is provided by a tuning board or an application on a device such as a mobile phone, tablet, or computer. In some embodiments, the hearing assistance device further comprises an external tuning board with buttons. In example embodiments, the tuning board is small, for example a 1.5 inch by 3 inch board with buttons. For example, see FIGS. 5B, 5C, and 5D.

Embodiments of the disclosure may further process physical measurements of the surrounding atmosphere. In some embodiments, chemical sensors positioned on the frames of the device may be configured to take samples of the surrounding atmosphere to test for contaminates in the air or any other properties of the air that would affect air quality (e.g. humidity). In some embodiments, circuits positioned in the frames or otherwise connected to the frame may process the samples to detect dangerous conditions, such as a toxic chemical present in the air, smoke in the air indicating a fire, or elevated humidity levels. The device may directly indicate a warning to the wearer (e.g., a warning alarm) or to some other party or device. In some embodiments, the collected samples are transmitted to another device using Bluetooth, WiFi, or other such communication connections, such as a mobile phone, tablet, or a system for testing air quality. That other device may perform additional testing regarding the samples, may present the samples for review by the wearer or air quality expert, or may warn the wearer in various manners.

Embodiments of the disclosure may further process physical measurements regarding vibration. In some embodiments, accelerometers are present in the circuits positioned in the frames of the device and may be used in some embodiments to collect vibration measurements. For example, the vibration measurements may be used as part of an exercise application, such as to determine steps walked or miles run by the wearer. The collected measurements may be further transmitted to a mobile phone app to analyze or report statistics or other information related to the collected data. For another example, the vibration measurements may be used to detect safety conditions regarding the wearer, such as the wearer falling down, suffering a seizure, or falling asleep during a dangerous activity (e.g., while driving). The circuits positioned in the frames or other components connected to the frames may take actions in response to the vibrations measurements, such as trigger an alarm in the example case of falling asleep while driving.

In some embodiments, if the collected measurements or performed tests or procedures indicate a medical or health emergency, the device may automatically initiate communication with an emergency response service (e.g., an ambulance service), a configured contact (e.g., family member), or a medical or health service, or automatically initiate any other emergency related response. The emergency response may be communicated using Bluetooth, WiFi, or any other communication connections. In some embodiments, the device may attempt to prompt the wearer for confirmation prior to initiating an emergency related response.

Embodiments of the disclosure may allow different options for collecting the physiological measurements. In some embodiments, the wearer may prompt the device to start and stop taking measurements, or the device may stop taking measurements when measurements are complete. In some embodiments, the wearer may set a timer to start and stop taking measurements. In some embodiments, the device may automatically start taking measurements based on monitoring for events, such as sensing a vibration, elevated temperature, or elevated pulse. For example, when a user starts exercising (e.g., running), the system may automatically start measuring the wearer's heart rate and temperature based on detecting vibration, elevated pulse, or elevated temperature cause by engaging in the exercise. In another example, the measuring of vital signs may be based on sudden vibration detection by the device, such as the wearer falling, or suffering a medical situation such as a seizure.

Further Example Implementations

Embodiments of the disclosure may include a device including a first member and a second member coupled to a first end of the first member. The device may include a third member coupled to a second end of the first member. The second and third members may be coupled to the first member through a respective hinge. The first member may further include a conduit inside the first member and a number of through holes that extend from a surface of the first member to the conduit. In an embodiment, the through holes may face substantially the same direction. Further, a first subset of the through holes may be placed in a middle portion of the first member, and a second subset of the through holes may be placed toward the first end of the first member, and a third subset of the through holes may be placed toward the second end of the first member.

In an embodiment, the second and third members may each include a respective conduit inside the members. Further, the second and third members may each include a number of through holes that extend from a respective surface of the second and third members to the conduit therein.

In an embodiment, a number of microphones may each be placed in a respective through hole of the first member. In one embodiment, a first subset of bidirectional microphones such as ribbon microphones may be placed in the first subset of through holes of the first member; a second subset of microphones may be placed in a second subset of through holes of the first member.

Example Wearable Computing System Architectures

Figure 2A:
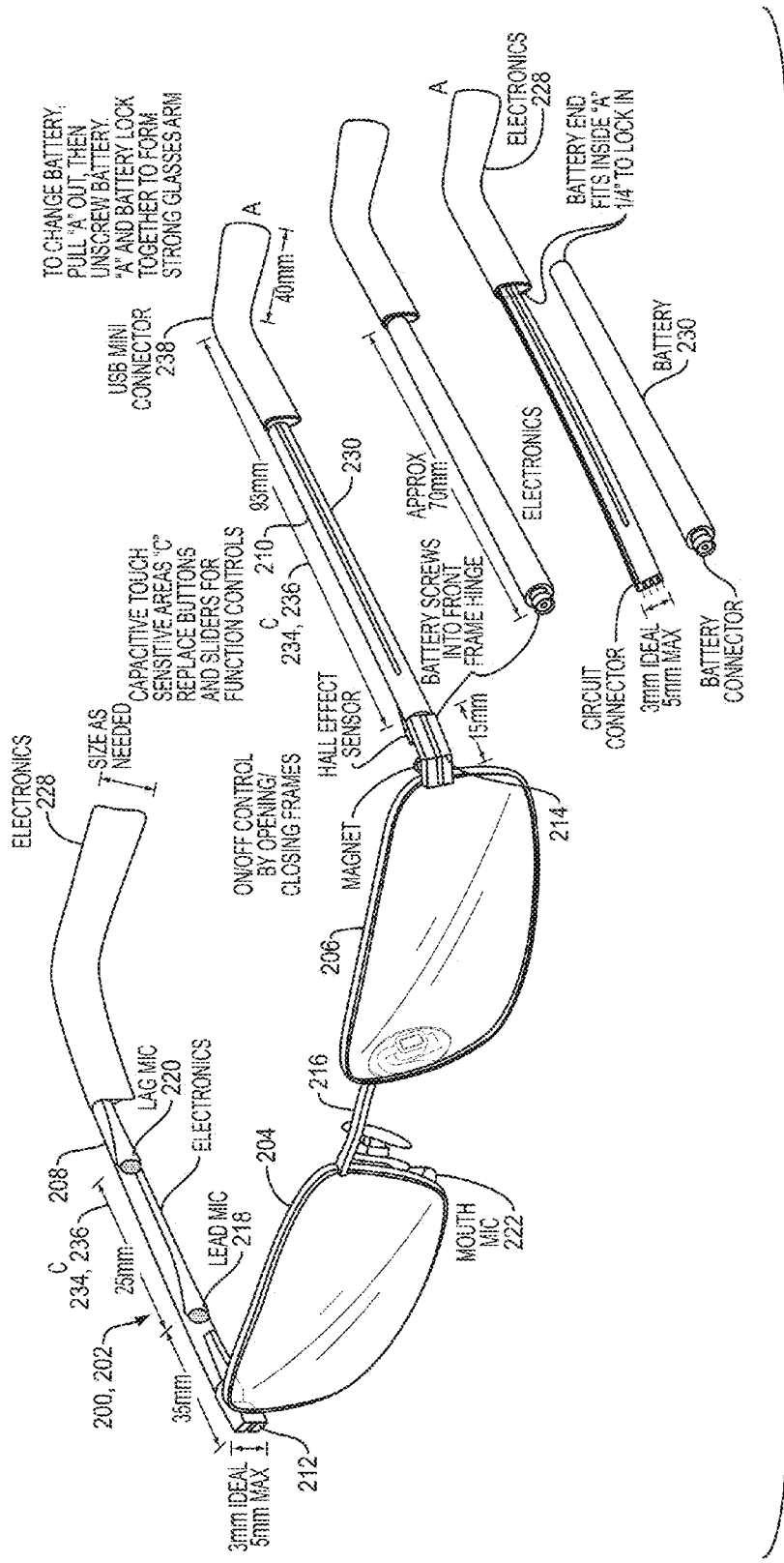
FIG. 2A shows a hearing assistance device according to an embodiment and embodiments of the side of the frame of the disclosure.

FIG. 2A illustrates a hearing assistance device 200 according to an embodiment of the disclosure. In one embodiment, the hearing assistance device 200 may be built around a pair of glasses 202 which may include parts of the glass frame. In one embodiment, the glass frame may include rims 204, 206, sides 208, 210, hinges 212, 214 for connecting sides 208, 210 to rims 204, 206, and a bridge 216 for connecting rims 204, 206. Rims 204, 206 may hold lenses so that the glasses 202 may function as a visual correction apparatus.

Additionally, hearing assistance device 200 may be built around glass frame 202. In one embodiment with details shown in FIGS. 2A and 2B, the hearing assistance device 200 may include a lead microphone 218, a lag microphone 220, a mouth microphone 222, a speaker 224, a tube extension 226, an electronic circuit block 228, and a battery 230. The hearing assistance device 200 may further optionally include an ear bud or earphone 232. Lead microphone 218 and lag microphone 220 may be situated on an inside surface of side 208. In one embodiment, lead microphone 218 may be situated toward the front portion of side 208 near hinge 212, and lag microphone 220 may be situated toward the rear portion of side 208. Both lead microphone 218 and lag microphone 220 may be directional microphones that are oriented toward front (i.e., in the direction of eyesight). As lead microphone 218 and lag microphone 220 are situated on the side of the user's head, they may receive sound such as speech from the direction of eyesight because the user's head may block sound from side. Mouth microphone 222 may be situated on a lower portion of rim 204 so that when the glasses are worn, the mouth microphone 222 would have been near the user mouth to capture sound from the user's mouth.

Microphones 218, 220, 222 may convert sound signals into electronic signals and transmit the electronic signals to electronic circuit block 228. In one embodiment, electronic circuit block 228 may be situated on side 210 toward the tip. Battery 230 may at a first end fit into electronic circuit block 228 and at a second end screw into hinge 214. Thus, the battery 230 may form part of side 210. In some embodiments, two batteries may be incorporated into the hearing assistance device 200 and may form part of sides 208 and 210. In some embodiments, the two batteries may be of different sizes to incorporate all of the components of the hearing assistance device.

In one embodiment, lead microphone 218, lag microphone 220, and mouth microphone 222 may be electrically connected to electronic circuit block 228. In one embodiment, hinges 212, 214 may include circuit connectors that couple the microphones to the electronic circuit block 228 when sides are unfolded (or the glasses are in use). In one embodiment, the connection is cut off when the sides are folded (or the glasses are not in use). Thus, the hinges 212, 214 may function as a switch of the hearing assistance device 200.

In one embodiment, speaker 224 may be coupled to electronic circuit block 228 through a wire so that the user may have an option to place speaker 224 adjacent to the earphone 232.

In one embodiment, for example as shown in FIG. 2A, hearing assistance device 200 may optionally include a universal serial bus (USB) port 238 coupled to electronic circuit block 228. USB port 238 may be situated at the tip of side 210. USB port 238 may function as an interface to other devices such as smart phones or portable electronic devices.

Example Earphones

Figure 2B:
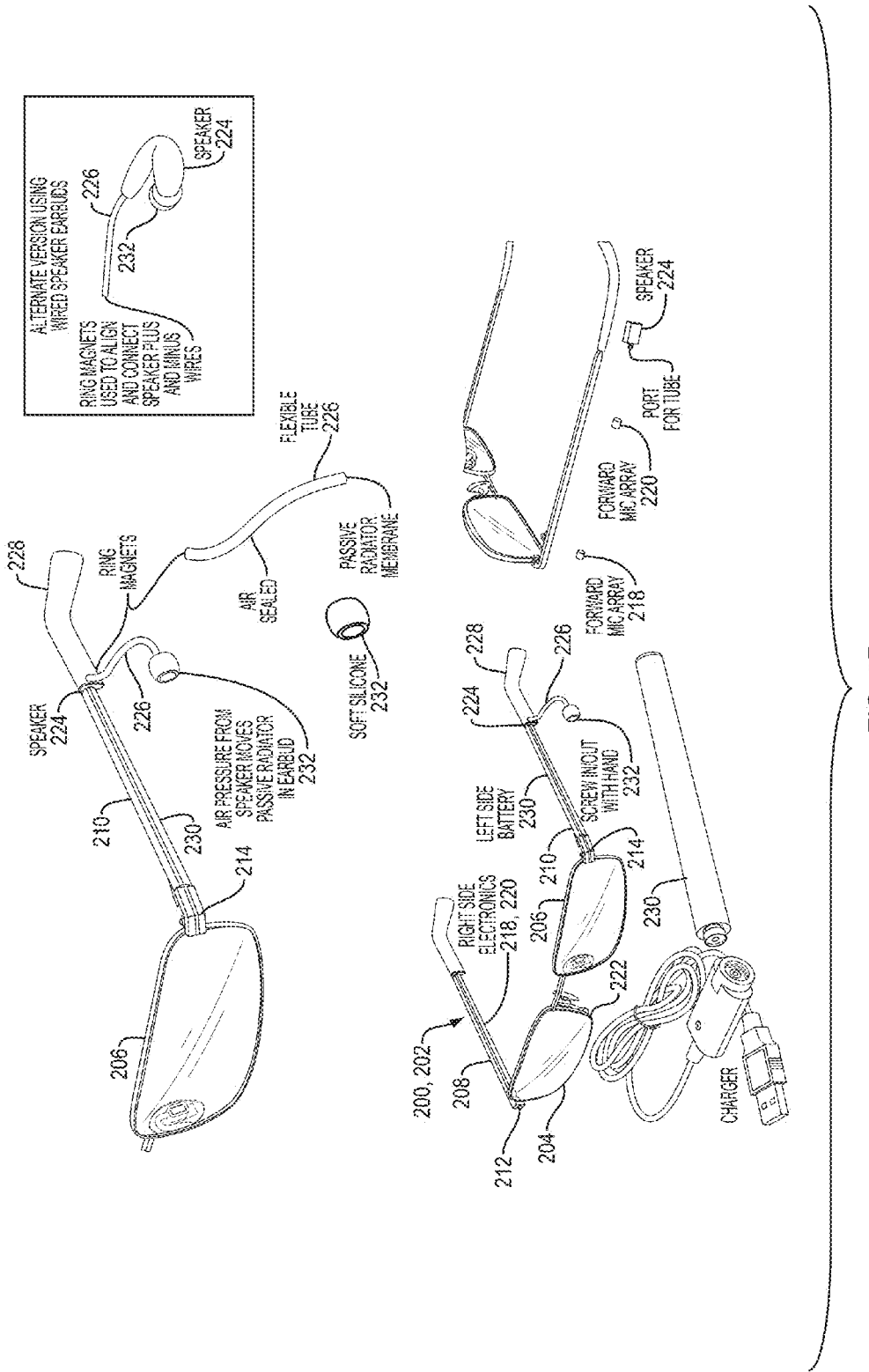
FIG. 2B shows a hearing assistance device according to an embodiment of the disclosure highlighting embodiments of parts or pieces of the device including embodiments of the speaker.

In one embodiment, for example as shown in FIG. 2B, speaker 224 may be situated on side 210. Speaker 224 may include a metallic package and may be coupled to a driver circuit in the electronic circuit block. Thus, sound signals (such as speech) received at microphones 218, 220, 222 may be processed and transmitted by electronic circuit block 228 to the drive circuit to drive speaker 224. In one embodiment, speaker 224 may include a tongue on which a first end of extension tube 226 may fit on.

In one embodiment, for example as shown in FIG. 2B, extension tube 226 may be flexible and composed of rubber or plastic. Extension tube 226 may include a hollowed core. A first end of extension tube 226 may be sealed by a first membrane, and a second end of extension tube 226 may be sealed by a second membrane. The first and second membranes may be passive radiator membrane that does not contain a voice coil or magnet assembly. The first end of extension tube 226 may include a ring magnet so that the first end may easily fit onto the tongue of the speaker 224. In one embodiment, the tongue of the speaker 224 may include an active driver of the speaker. When the extension tube is plugged on to the tongue, the first membrane may be pressed against the active driver so that the sound emitted from the speaker may be propagated through the tube to the second membrane. In one embodiment, the second end of extension tube 226 may be detachably coupled to an ear bud 232 made from soft silicon. In a related embodiment, the second end of extension tube 226 may be detachably coupled to an earclip with the ear bud 232 attached to the earclip. Ear bud 232 may function as a passive noise suppressor that may block environmental noise for the user of the hearing assistance device.

Since the extension tube 226 including the membrane and ear bud 232 are much cheaper than the speaker 224, extension tube 226 and ear bud 232 may be replaced easily and with a significantly reduced cost. Further, since the microphones 218, 220, 222 are situated away from electronic circuit block 228, the thermal noise generated by electronic circuit block 228 does not mix into the microphone inputs. Moreover, the size of battery 230 is much larger and easier to replace than those built inside a hearing aid.

Example Capacitive Touch Sensitive Areas Including the "What" Button

Hearing assistance device 200 may further include sensors for receiving control instructions from the user as shown in FIG. 2A. In one embodiment, hearing assistance device 200 may include a first capacitive touch sensitive area (also referred to as a "what" button) 234 situated on side 208. The capacitive touch sensitive areas may be incorporated into the glasses frame, for example, on the outside of the side or arm of the frame. First capacitive touch sensitive area 234 may be electrically connected to electronic circuit block 228 include a recording logic which may continuously record the latest portion of sound signals received at lead microphone 218 and lag microphone 220. For example, the recording logic may include a buffer that stores a fixed period of sound signals just received at lead microphone 218 and lag microphone 220. The fixed time period may be five seconds, ten seconds, or any suitable period of time. Alternatively, the recording logic may detect breaks in received speeches and store in the buffer the last speech. In the event that the user of hearing assistance device 200 wants a repeat of whatever he just heard, the user may touch the button 234 to activate a replay of the audio clip stored in the buffer. The replay may be transmitted to the ear of the user through speaker 224 and extension tube 226.

In one embodiment, hearing assistance device 200 may include other touch sensors for receiving instructions from the user. For example, hearing assistance device 200 may further include a second capacitive touch sensitive area 236 in the form of a slider so that user may slide-touch the slider 236 to issue instructions. In one embodiment, the user may change volume of the speaker 224 by sliding a finger that touches the slider 236. In some embodiments the capacitive touch sensitive areas C of FIG. 2A may include more than one capacitive touch sensitive areas such as a "what" button 234 and a slide-touch slider 236. The capacitive touch sensitive areas may be incorporated into the design of the frame such that the capacitive touch sensitive areas may not be immediately apparent to non-users. In embodiments, the capacitive touch sensitive areas may be used to change functions or modes, for example, to switch between microphones or to activate Bluetooth® functionalities. In embodiments, the capacitive touch sensitive areas may be used to access computer readable instructions directing one or more computer processors to perform electronic tasks. The computer processors may be embedded in the frame or may be external to the hearing assistance device.

Example Cone Shape Interlocks/Connectors for Earphone Attachment

Figure 2C:
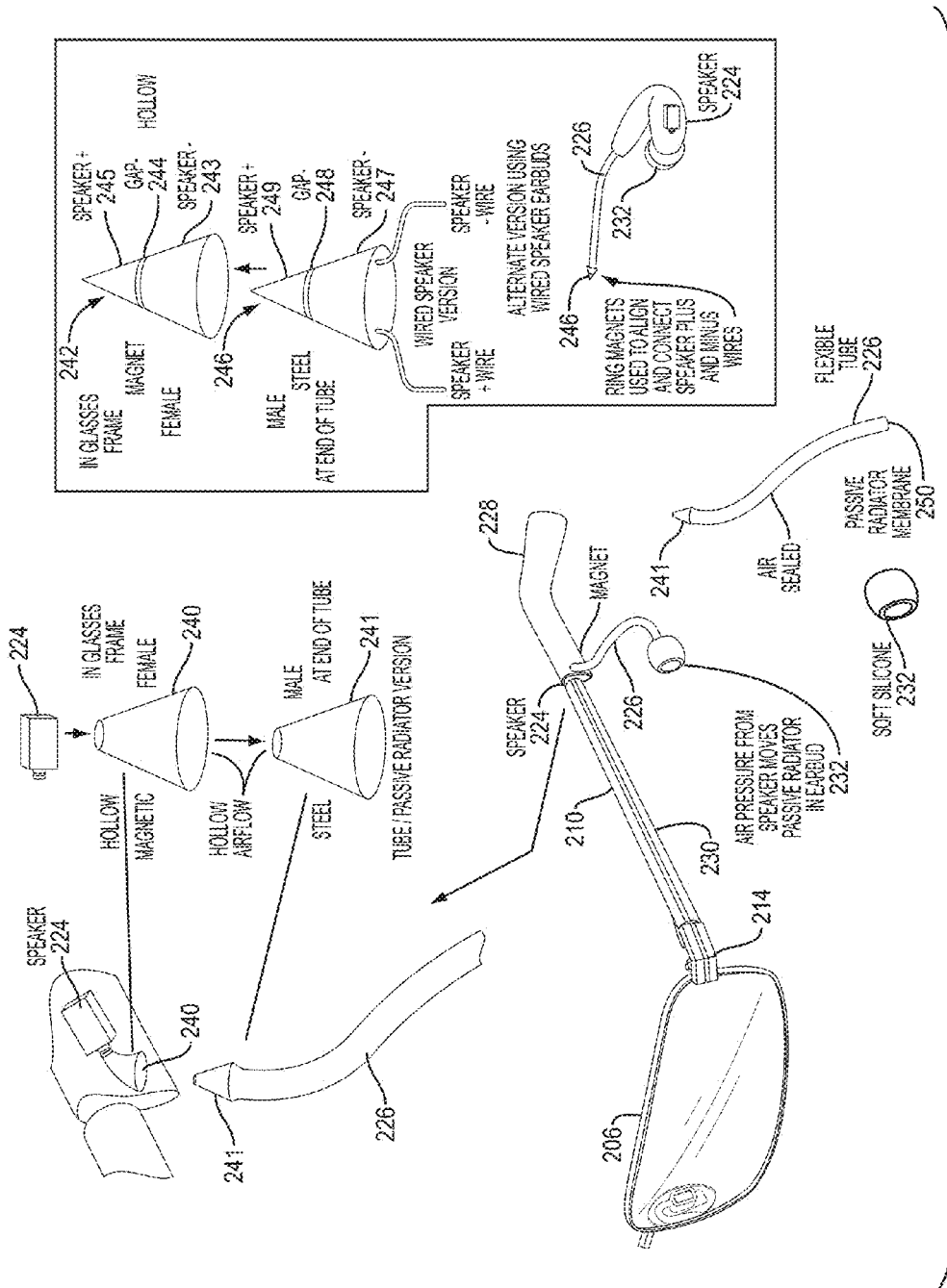
FIG. 2C shows a hearing assistance device according to another embodiment of the disclosure highlighting embodiments of the speaker.

In some embodiments, the hearing assistance device may use an acoustic, wireless connection. In some embodiments, the speaker 224 is connected to a flexible hollow tube 226 as depicted in FIG. 2C. In embodiments, the hollow tube may be an open-ended tube inserted into the inner ear of the human subject (user) to receive sound from the speaker. The amount of air in the hollow tube may fluctuate and may cause an echo effect. In some embodiments, the passive radiator membrane 250, which is a flexible, thin membrane, may be used to remove the echo and to create an air seal at the end. In some embodiments, the hollow tube 226 with a passive radiator membrane 250 creates an air seal at the end may be connected to an earphone. The earphone may act to hold the hollow tube in place and may block external sound. A sound/pressure wave may be transmitted from the speaker 224 in the glasses frame through the tube to the user's ear. The change in air pressure in the flexible hollow tube 226 may move the passive radiator membrane 250. A female funnel shaped connection 240 in the glasses frame may be hollow and magnetic and may be connected to the speaker 224. A male funnel shaped connection 241 may be hollow and made of steel and may be attached to the end of the hollow tube 226. The male funnel shaped connector 241 attached to the hollow tube may be magnetically attracted to the female funnel shaped connector 240 attached to the speaker 224 and may create a seal.

In some embodiments, the speaker is connected to an earphone 232 with one or more wires in a hollow tube 226. The earphone connection may be a female funnel shaped connector 242 in the glasses as depicted in FIG. 2C. The bottom half 243 of the female funnel shaped connector shown in orange may form an electrical connection to the speaker positive terminal with a gap 244, for example, of 1 mm shown in purple, and the top half 245 of the female funnel shaped connector shown in blue may form an electrical connection to the speaker negative terminal. The female funnel shaped connector 242 may contain a ring magnet, for example, around the lip of the funnel. The female funnel shaped connector 242 also may have spring-action copper tabs on the inner walls of the connector for better electrical contact. For example, the female funnel 242 may have two or three spring-action copper tabs per connector, and the spring-action copper tabs may have a configuration similar to a house phone charging and docking station. In embodiments, the earphone has a complementary male funnel shaped connector 246 and is made of steel. The bottom half 247 of the male funnel shaped connector shown in orange may form an electrical connection to the speaker positive terminal with a gap 248, for example, of 1 mm shown in purple, and the top half 249 of the male funnel shaped connector shown in blue may form an electrical connection to the speaker negative terminal. In embodiments, the magnetic female funnel shaped connector 242 and the metal male funnel shaped connector 246 attract to form the necessary electrical connections. In some embodiments, the shapes of the connectors are cone shaped. In embodiments, the funnel shapes have dimensions appropriate to fit the frame side 210, for example, 3 mm diameter and 4 mm height (base to apex). In some embodiments, the speaker wires may connect to a speaker 224. The speaker may be adjacent to an earphone 232.

Example V-Channel Interlocks/Connectors for Earbud Attachment

The V-channel interlocks/connectors for earbud attachment is a similar embodiment to the cone shaped interlocks/connectors for earphone attachment. The V-channel connectors embodiment, the speaker is connected to the same flexible hollow tube 226 as described for the cone shaped connector. As shown in FIG. 2M-1 through 2M-3, in the V-channel embodiment, an earbud 207 may be attached to an arching shaped earclip 205, such as shown in 213, which may be positioned over the user's ear. The hollow tube 226 may be positioned inside the earclip 205 and attaches to the earbud 207 when the earbud 207 is secured at the bottom of the earclip. At the top of the earclip 205, a connector 203 may be position on the earclip 205 by means of a ball joint, and attached to the connector may be a male "V" shaped channel 211. An interlock strip 201 with female "V" shaped hole 209 may be mounted on the glasses at 201 where the ear meets the skull. The describe connector components may be made of plastic with the copper or steel sheeting plates beneath. The female "V" shaped hole 209 is lined with thin magnets which are strong enough to have a secure electrical contact, yet not so strong as to disconnect the earclip from the glasses or interfere with the microphones. The male "V" shaped channel 211 fits into the female "V" shaped hole 209 and the thin magnets pull the connection tight and may create a seal to form the necessary electrical connections. These components have dimensions appropriate to be comfortably worn by the user and to fit the frame side, for example, a 9 mm earbud, 29 mm earclip, 12 mm earclip connector, 25 mm frame interlock strip, and 3.5 mm male channel and female hole.

In some embodiments, an interlock strip with a female "V" shaped hole may be mounted on each arm of the glasses 201A, 201B. This embodiment may allow earclips 205A and 205B to be positioned on both arms of the glasses. FIG. 2M-5 shows a right view of the glasses in some embodiments of the invention. This view of the glasses shows interlock strip 201A positioned on the right arm of the glasses with attached earclip 205A. The earclip 205A may be attached to the glasses by means of connector 203A positioned on the earclip 205A. FIG. 2M-6 shows a left view of the glasses in some embodiments of the invention. This view of the glasses shows interlock strip 201B positioned on the left arm of the glasses with attached earclip 205B. The earclip 205B may be attached to the glasses by means of connector 203B positioned on the earclip 205B. FIG. 2M-7 shows a bottom view of the glasses in some embodiments of the invention. This view of the glasses shows interlock strips 201A, 201B positioned on both arms of the glasses. In this figure, only earclip 205B is shown attached by means of connector 203B to interlock strip 201B on the left arm of the glasses. Earclip 205A may be similarly attached by means of connector 203A to interlock strip 201A on the right arm of the glasses.

FIG. 2M-4 shows an example earclip used in some embodiments of the invention. On the earclip, both the V-channel connector positioned at the top of the earclip and the earbud connector positioned at the bottom of the earclip may have tapered edges. This tapered edge design prevents sharp edges on the earclip that may cause discomfort to the wearer. The earclip may also include a ball joint that attaches the earbud connector to the earclip to allow the earbud to better articulate and align with the ear. The V-channel connector positioned at the top of the earclip may also connect to the earclip by means of a ball joint. The V-channel connector may be lined on the top with 0.15 mm copper sheeting surrounding the "V" shaped channel and two holes to aid in securing the V-channel connector to the glasses. FIG. 2M-8 shows a right view of the glasses with attached earclip 205A in accordance with the earclip embodiment shown in FIG. 2M-4. This view shows an embodiment of interlock 201A positioned on the right arm of the glasses and earclip 205A attached to interlock 201A by means of a streamlined embodiment of connector 203A positioned on the earclip 205A. This view shows a close display of this earclip embodiment, including the tapered edge design and the ball joint attaching the earbud connector to the earclip. Similarly, FIG. 2M-9 shows a left view of the glasses with attached earclip 205B in accordance with the earclip embodiment shown in FIG. 2M-4. This view shows an embodiment of interlock 201B positioned on the left arm of the glasses and earclip 205B attached to interlock 201B by means of a streamlined embodiment of connector 203B positioned on the earclip 205B. FIG. 2M-10 shows an isometric view of the glasses with attached earclips 205A, 205B in accordance with the earclip embodiment shown in FIG. 2M-4. FIG. 2M-11 shows a front view of the glasses with attached earclips 205A, 205B in accordance with the earclip embodiment shown in FIG. 2M-4. These views of the glasses show the positioning of earclips 205A, 205B on both arms of the glasses from different angles.

Example Directional Velocity Ribbon Microphone

In one embodiment, hearing assistance device 200 may further include a directional velocity ribbon microphone for capturing high-frequency details. In one embodiment, the directional velocity ribbon microphone may be built into bridge 216 facing forward. FIG. 2D illustrates composition of a directional velocity ribbon microphone 260 according to an embodiment of the disclosure. As shown in FIG. 2D, ribbon microphone 260 may include a stack of filters 262 and a ribbon foil 264. Filters may be thin identical plates each including an array of holes that cut through the plates. Filters 262 may be places at equal spacing so that air waves that are off axis (i.e., not in directions that directly face the user) may be blocked by the stack of filters. However, air waves aligned with axes of holes on these filters 262 may pass through without degradation. A ribbon foil 264 may be attached to the stack of filters for sensing pressures from air waves. Ribbon foil 264 may include dimple punch pattern and may be made from any type of materials suitable for converting pressure into electronic signals. In one embodiment, Ribbon foil 264 may be made from neodymium magnet foils. Ribbon foil 264 may be electrically coupled to the electronic circuit block 228 for further processing the sound signals received at the ribbon microphone 260.

Example Side Frame Batteries

Figure 2E:
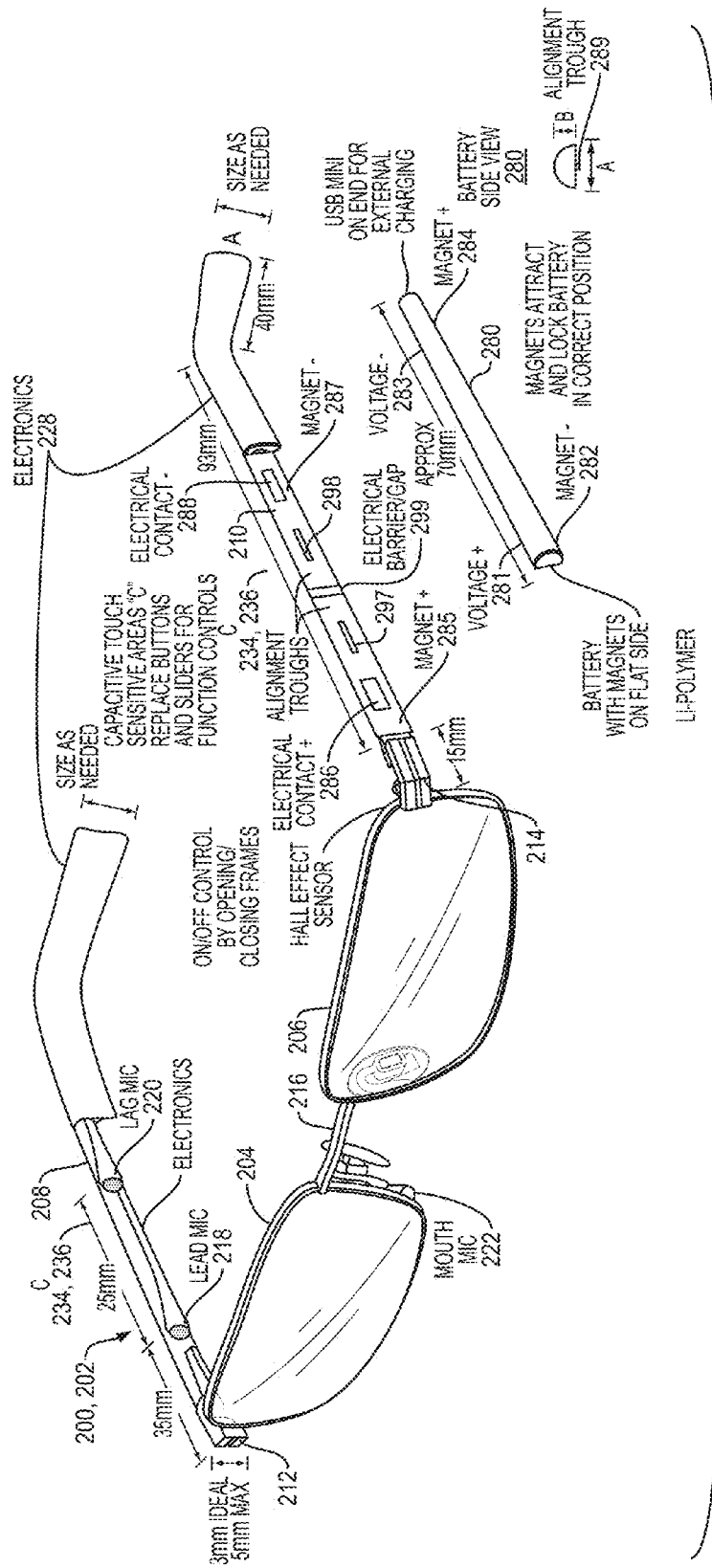
FIG. 2E shows a hearing assistance device according to another embodiment of the side of the frame of the disclosure.
Figure 2F:
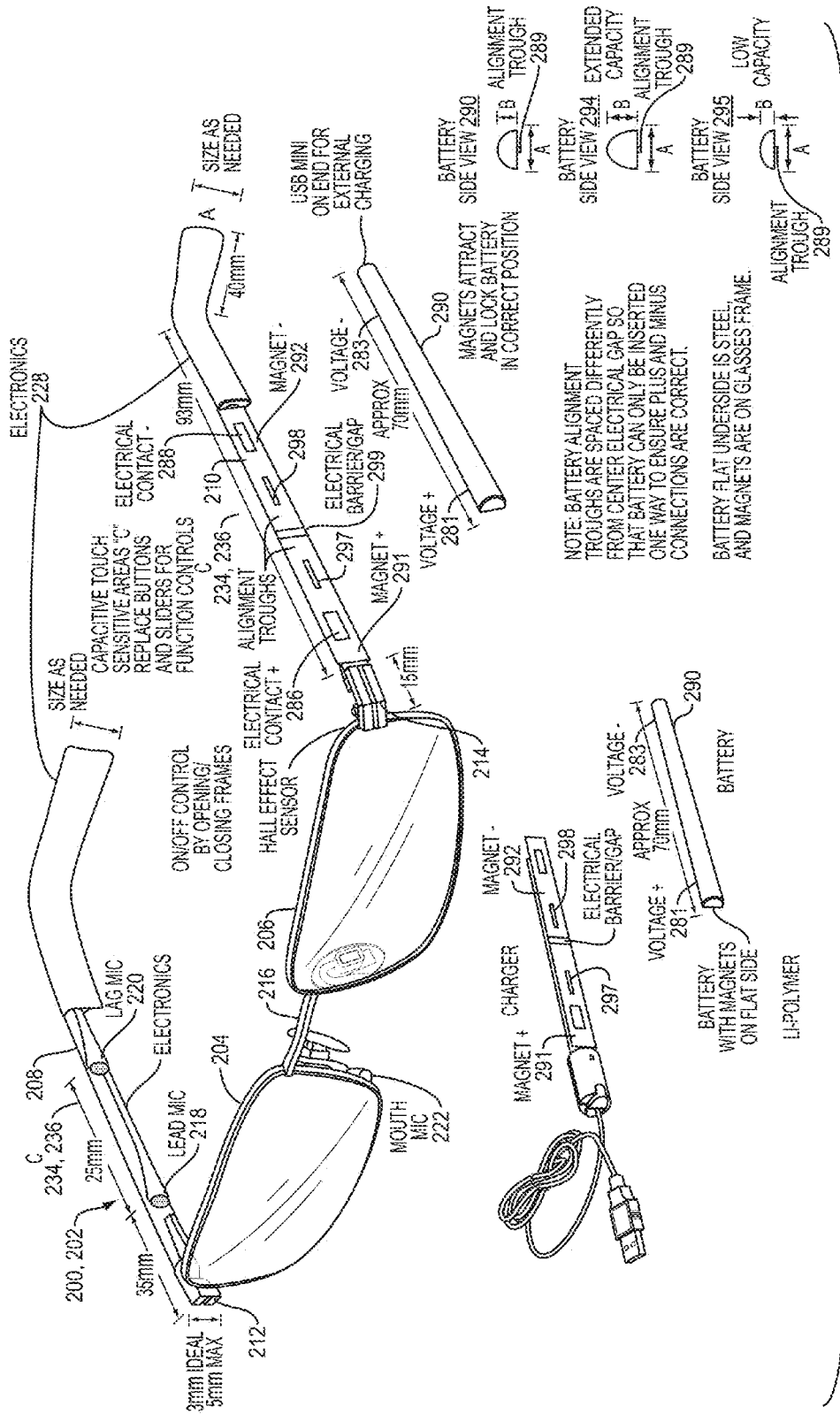
FIG. 2F shows a hearing assistance device according to a different embodiment of the side frame of the disclosure.

FIGS. 2E and 2F illustrate a hearing assistance device 200 according to other embodiments of the disclosure. In some embodiments, the hearing assistance device 200 may be built around a pair of glasses 202 including rims 204, 206, sides 208, 210, hinges 212, 214 for connecting sides 208, 210 to rims 204, 206, and a bridge 216 for connecting rims 204, 206. Rims 204, 206 may hold lenses so that the glasses 202 may function as a visual correction apparatus.

In example embodiments with details shown in FIGS. 2E and 2F, the hearing assistance device 200 may include a lead microphone 218, a lag microphone 220, a mouth microphone 222, and an electronic circuit block 228. In some embodiments, the hearing assistance device may include capacitive touch sensitive areas 234 and 236. The hearing assistance device 200 may further optionally include an ear bud or earphone. A battery may be magnetically attached to the frame, and the battery may form part of side 210. In some embodiments, two batteries may be incorporated into the hearing assistance device 200 and may form part of sides 208 and 210.

In some embodiments shown in FIG. 2E, the battery has a flat side with electrical positive 281 and negative 283 contact points. In some embodiments, the electrical contact points on the battery may also correspond to positive 284 and negative 282 magnets with the ability to attach to frame side 210 through magnetic attraction shown in FIG. 2E. The frame side 210 may have an electrical positive 286 and negative 288 contact points that correspond to positive 285 and negative 287 magnets. The frame side 210 also may include an electrical barrier or gap 299. That is, in embodiments with a magnetically attached battery, the glasses frame has electrical positive 286 and negative 288 contact points that magnetically attract (through magnets on the battery at 282 and 284 and magnets on the frame side at 285 and 287) battery electrical positive 281 and negative 283 contact points, respectively, for correct electrical connection.

In embodiments shown in FIG. 2E, the battery 280 is shaped like a bar cut in half so that it corresponds to a half moon shape in a side view. The battery may also include two alignment features, for example, alignment protrusions 289 that will fit into corresponding alignment troughs 297 and 298 on the frame side 210. The alignment features may provide auto-alignment of the battery with the glasses frame.

In other embodiments shown in FIG. 2F, the battery 290 may have a steel flat underside with electrical positive 281 and negative 283 contact points. The frame side 210 may have an electrical positive 286 and negative 288 contact points that correspond to magnets 291 and 292. The frame side 210 also may include an electrical barrier or gap 299. In embodiments, the magnets in the frame side may be used by the hall effect sensor near hinge 214 so that the glasses may be turned on by opening the glasses frames and may be turned off by closing or folding the glasses. In embodiments, the magnets 291 and 292 on the frame side 210 may attract the steel battery 290. In embodiments with a magnetically attached battery, the glasses frame has electrical positive 286 and negative 288 contact points that magnetically attract battery electrical positive 281 and negative 283 contact points, respectively, for correct electrical connection. In other embodiments, the battery may have a metallic underside that may be attracted to the frame side 210 magnets 291 and 292. The battery may also include two alignment features, for example, alignment protrusions 289 that will fit into corresponding alignment troughs 297 and 298 on the frame side 210. In some embodiments, the frame side 210 is removable, and the battery 290 may be magnetically attached to the frame side with magnets 291 and 292 for charging, for example using a USB cable. In some embodiments, the charging is assisted using alignment protrusions 289 on battery 290 that fit into corresponding alignment troughs 297 and 298 on the frame side 210.

In embodiments, the battery may come in various sizes such that the glasses frame containing other components does not change. For example, the battery 290 may be shaped like a bar cut in half so that it corresponds to a half moon shape in a side view. For example, the standard capacity and standard size battery 290 may be a 4 mm diameter cylinder cut down the middle lengthwise to form a half circle. An extended capacity battery 294 with a longer battery lifetime may be more of the oblong shape when viewed from the side. A low capacity battery 295 with a shorter battery lifetime may be shaped more like an oval when viewed from the side. In some embodiments, the shape and size of the battery may vary without changes to the glasses or glasses frame. In example embodiments, the user may choose a battery based on features including preference of weight and battery lifetime.

Embodiments of the hearing assistance device with the magnetic battery may allow the user to change batteries very quickly and easily. Embodiments of the hearing assistance device with the magnetic battery may allow the user to change the battery without removing the glasses or frame from the user's head. The battery 290 may have a mini USB connector for recharging the battery when the battery is removed from the hearing assistance device. In some embodiments, the batteries may be made in different styles or different colors and form part of the frame design. The batteries may correspond to the length of the glasses frame sides, for example, approximately 70 mm. The battery length combined with different styles or different colors of the battery may form part of the frame design.

FURTHER EMBODIMENTS

Figure 2G:
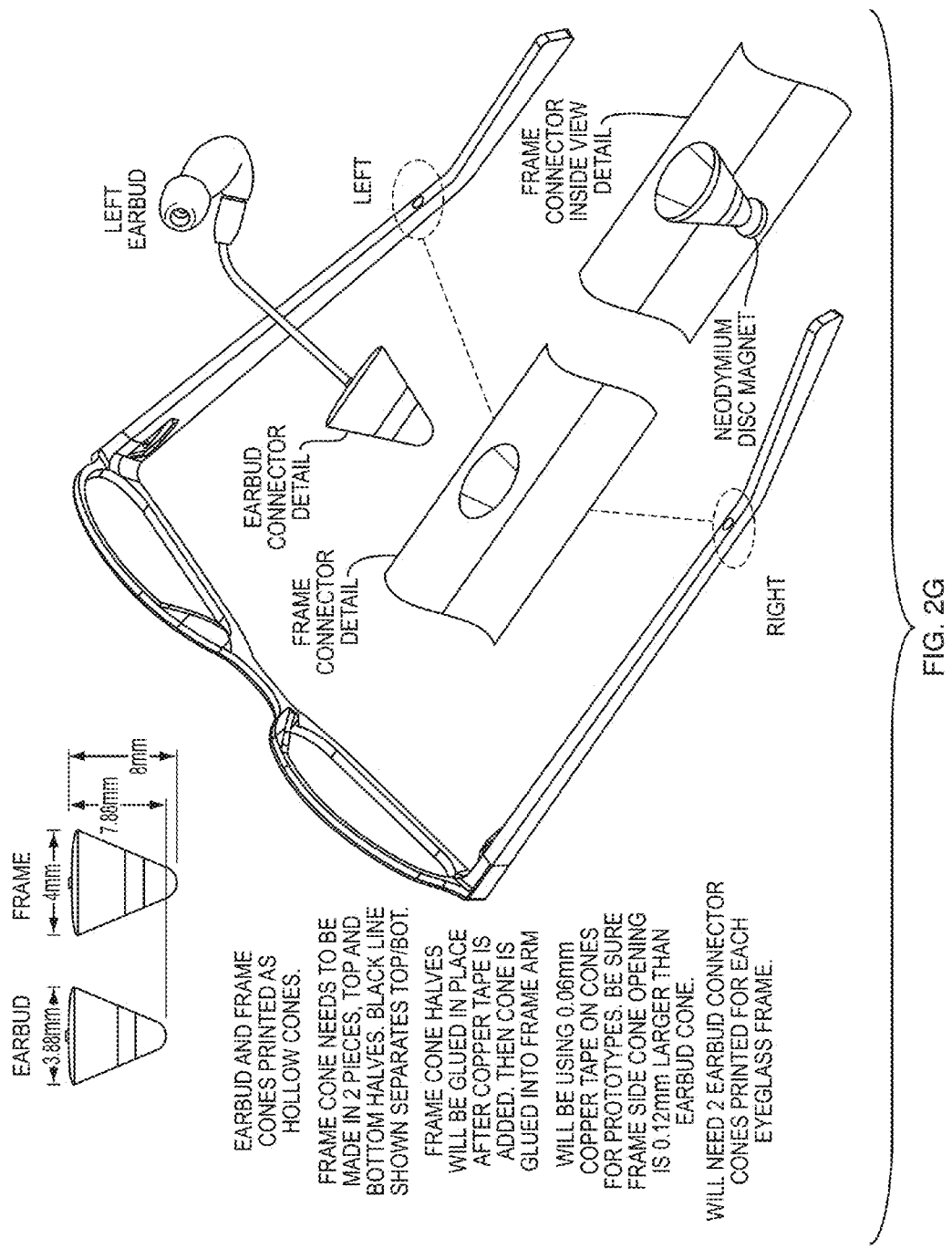
FIG. 2G shows a barrel-shaped connector according to an embodiment of the disclosure.

In another speaker connect embodiment shown in FIG. 2G, the electric microphone capsule is the shape of a barrel, with an acoustic port slit located at the middle of the height of the barrel. The distance between the slit and the top of the barrel creates a feedback point. Increasing or decreasing this distance increases or decreases the bass response. In this way, 2 tubes are provided that are the height of half the barrel. They can then slide to produce a tube that is from a half-barrel length to 1.5 barrel lengths. This provides tone control of the mic element by mechanically increasing or decreasing the tube length. The result is that the mic preamp only receives the signal range in which it is tuned to, i.e. the electronics don't have to deal with an overloaded mic signal. This method is preferably used to process lower frequency sounds, but those are also the sounds that are most problematic for mic overloading.

Figure 2H:
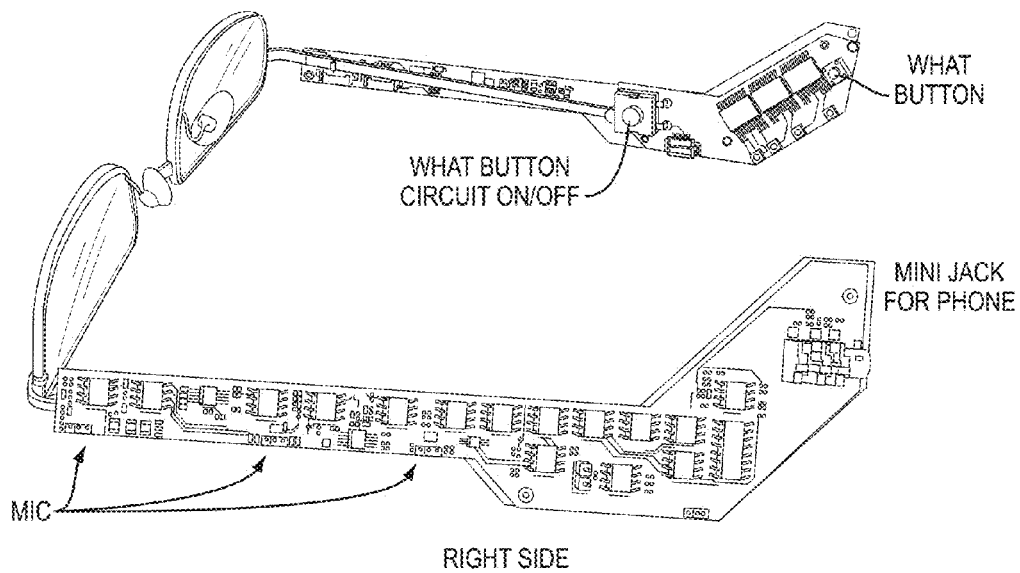
FIG. 2H shows example mockup images of how prototype boards may be mounted on the frames of the hearing assistance device according to an embodiment of the disclosure.
Figure 2I:
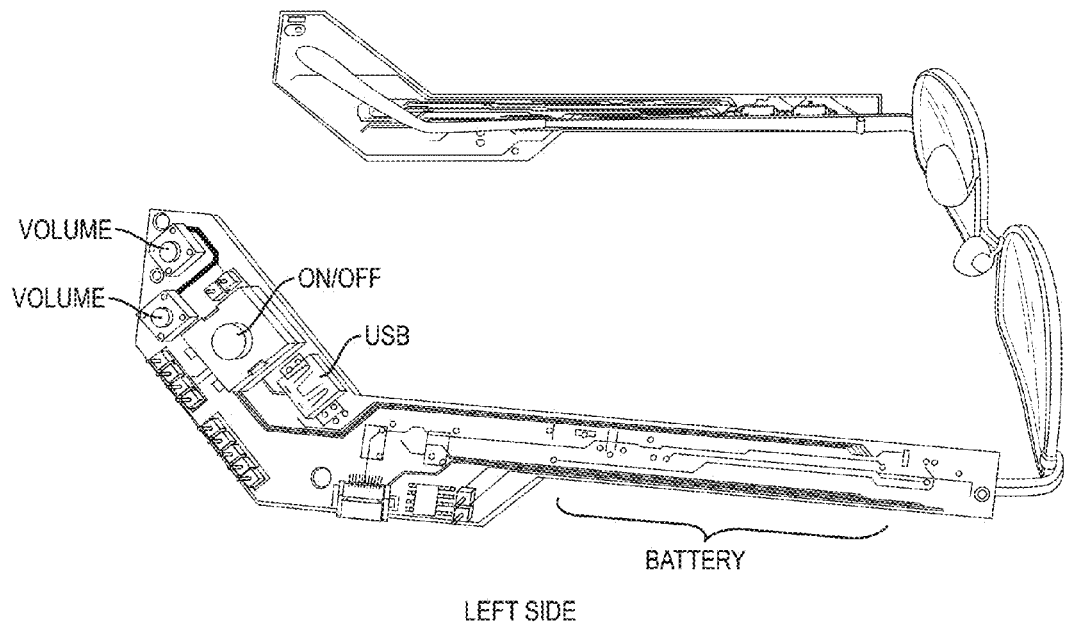
FIG. 2I shows additional example mockup images of how prototype boards may be mounted on the frames of the hearing assistance device according to an embodiment of the disclosure.
Figure 2J:
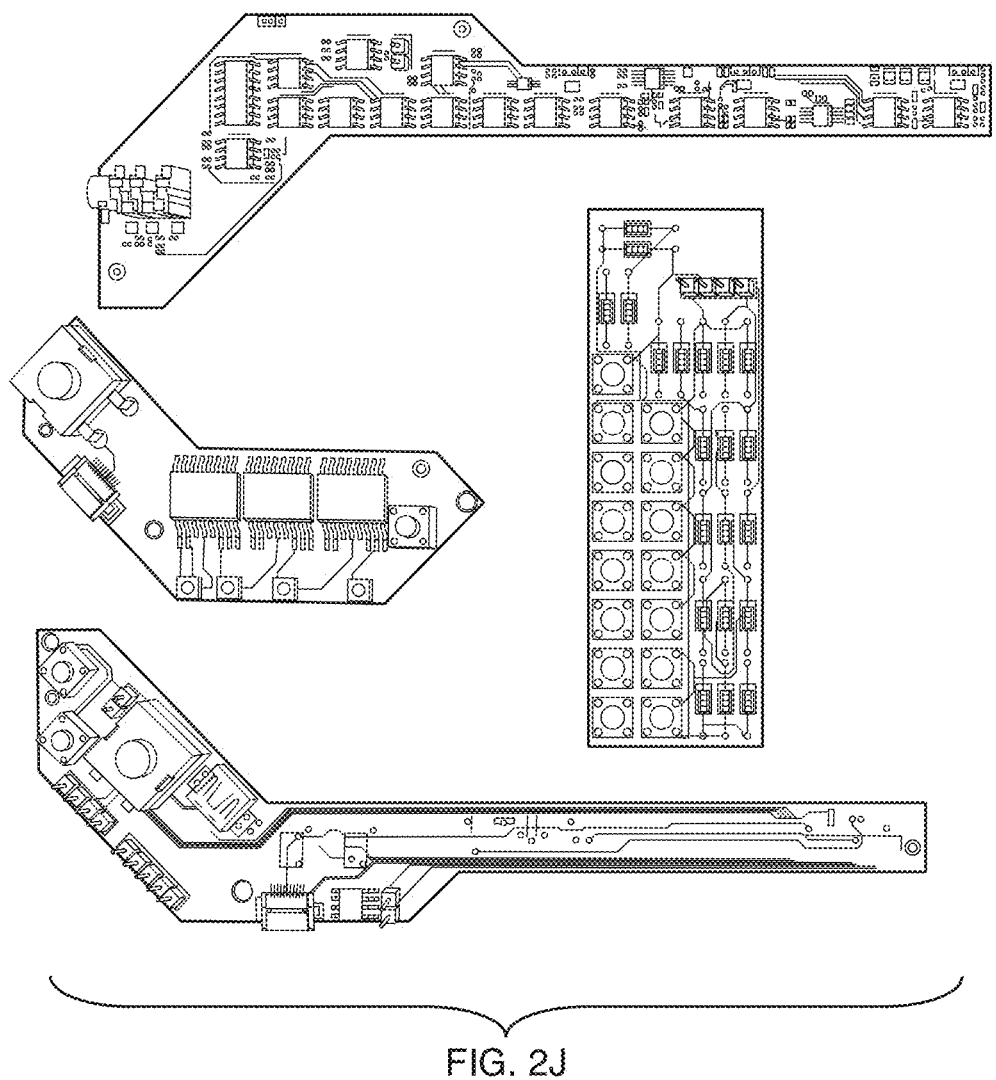
FIG. 2J shows example prototype boards according to an embodiment of the disclosure.
Figure 2K:
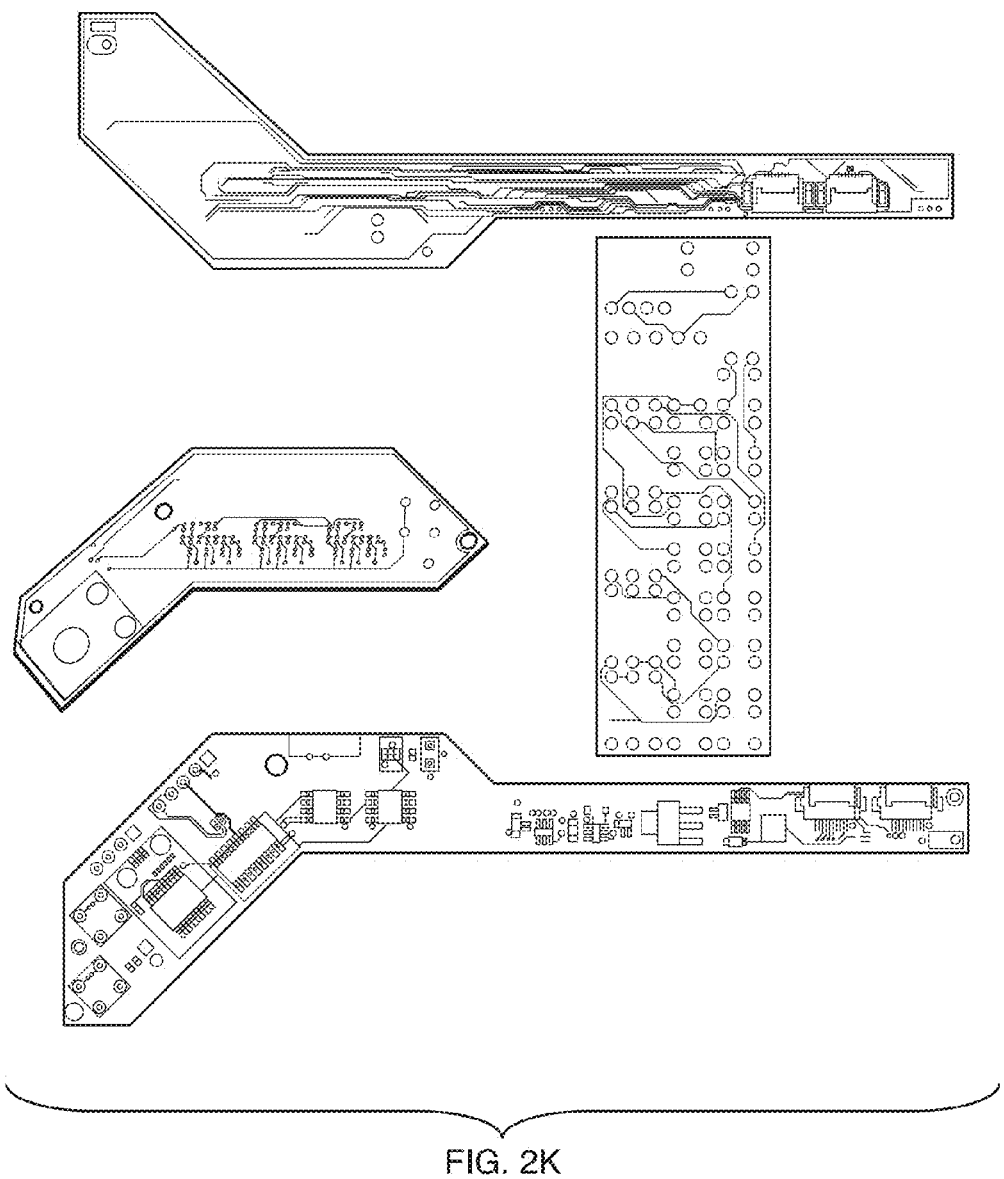
FIG. 2K shows additional example prototype boards according to an embodiment of the disclosure.
Figure 2L:
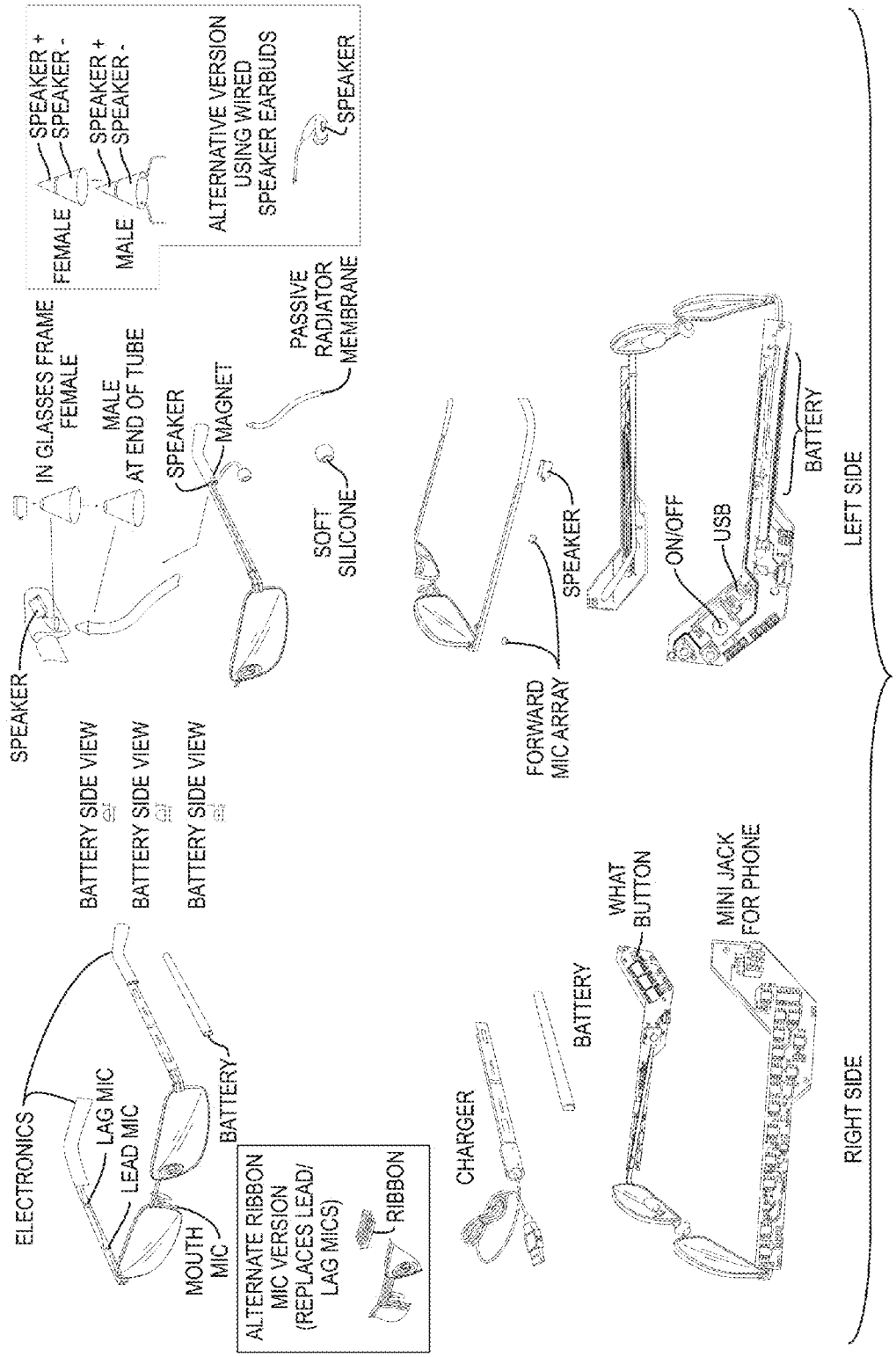
Figures 1, 2L:
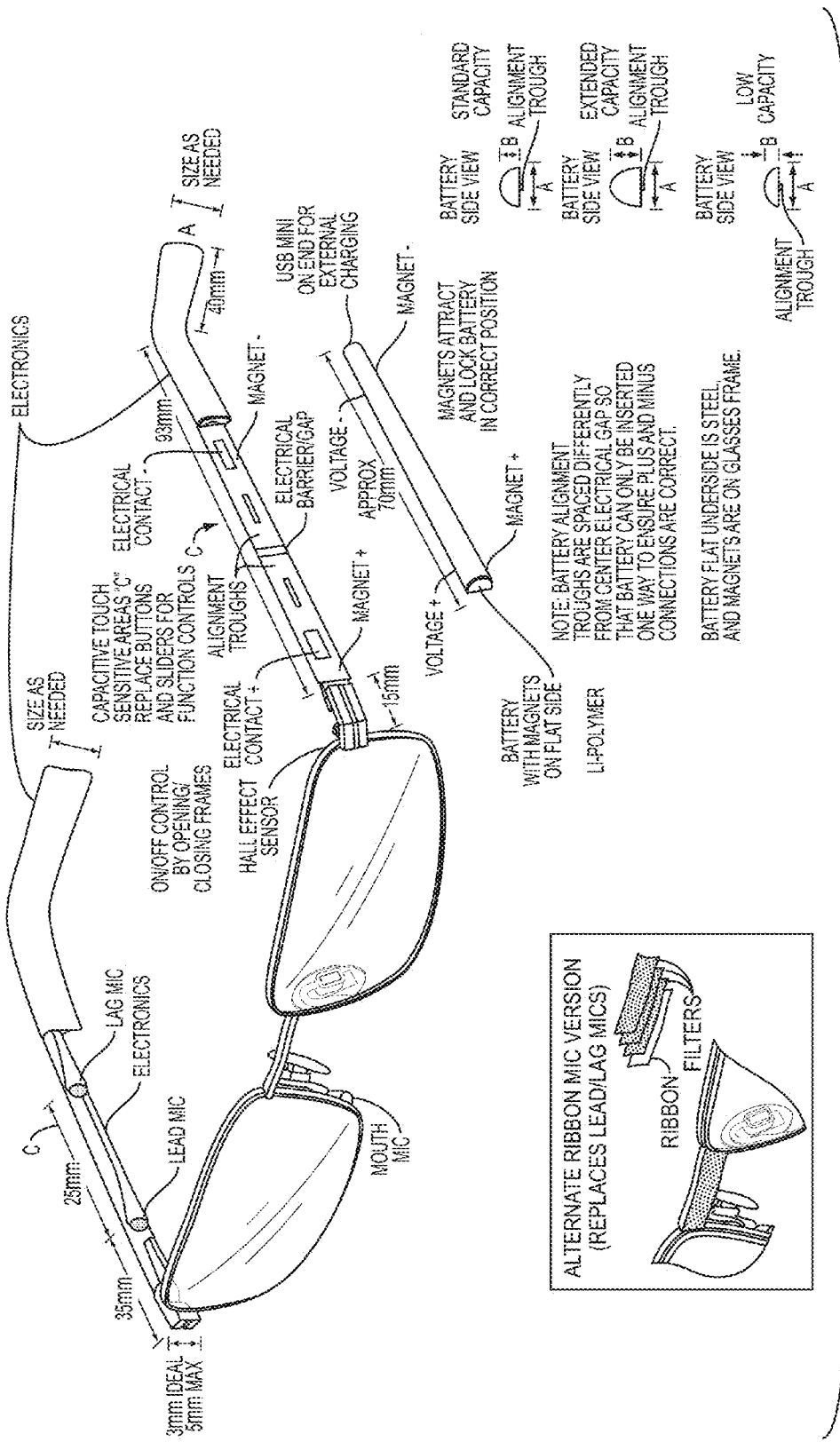

FIGS. 2H, 2I, 2J, and 2K show example mockup images prototype boards and how the prototype boards may be mounted on the glasses. FIG. 2H shows how a circuit board may be positioned on the right side of the frames to provide features of the hearing assistant device. The circuit board may include microphone components that may be positioned at the front of the frames near the lenses. The circuit board may also include mini jack components to connect phones or other devices that may be positioned at the back of the frames. FIG. 2H also shows the What button position on the left side of the glasses. In some embodiments, sensors for taking physiological and physical measurements may also be present on the arms or bridge of the glasses. FIG. 2I shows how a circuit board may be positioned on the left side of the frames to provide features of the hearing assistant device. The circuit board for the left side may include volume components that may be positioned at the back of the frames. The frame may also have an USB port connected to the circuit board to provide input or output to/from the circuit board, and an on/off switch connected to the circuit board to disable electrical power to the board. A battery may also be positioned on the left side of the frame, connected to the circuit, to provide electrical power to the board. FIGs. provide examples of how the circuit components may be positioned on the prototype boards to provide the features of the hearing assistant device. In FIG. 2L, composite sketches for an embodiment invention are provided. FIGS. 2L-1 through 2L-6 are enlarged illustrations of the composite sketches in FIG. 2L. In one embodiment, the height of the printed circuit boards may be reduced towards a goal of 10 mm or less along the length of the glasses arms, while creating the 3D mechanical files needed to print a pair of glasses to house the circuit boards for the revision 2 prototypes. The size goal and battery design are all geared towards the goal of hiding the electronics in plain sight, so the glasses have an appearance of regular glasses. The switches shown may be optionally replaced with capacitive touch sensitive areas on the glasses frame. Preferably, the appearance is a smooth surface on the glasses, but if touched on certain areas they are effectively control buttons to adjust functions such as volume up/down, hearing mode, phone call connect, what button, sensors for taking physiological and physical measurements, etc.

Figures 2, 2L:
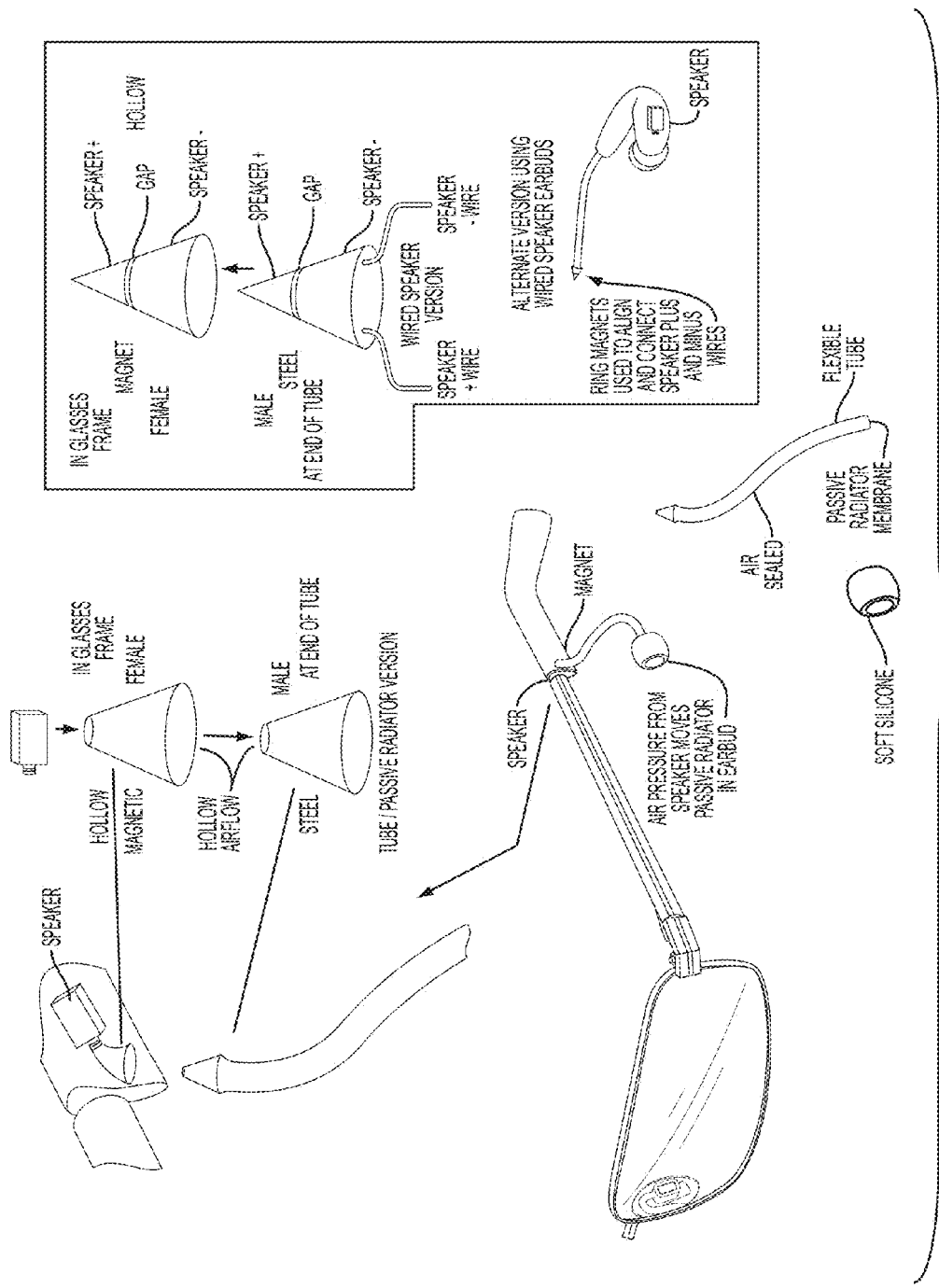
Figures 2, 2L, 3:
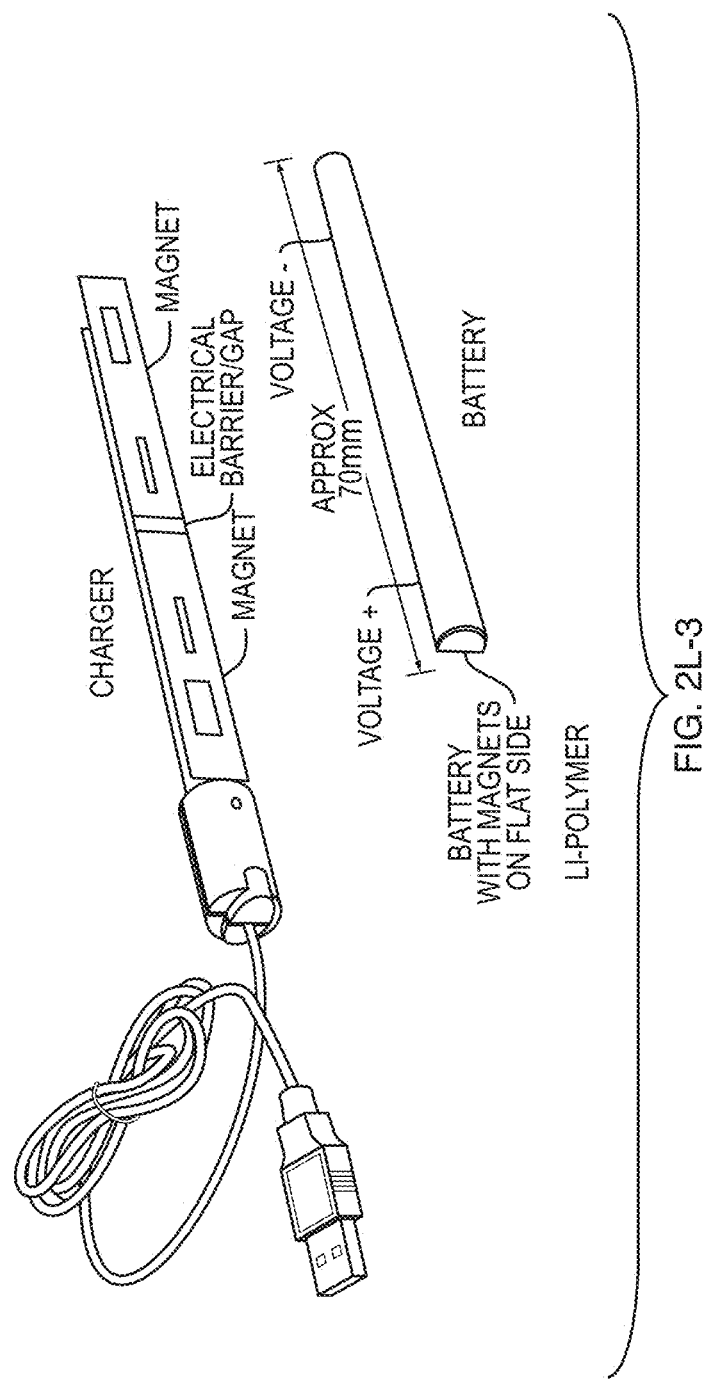
Figures 2, 2L, 3, 4, 5:
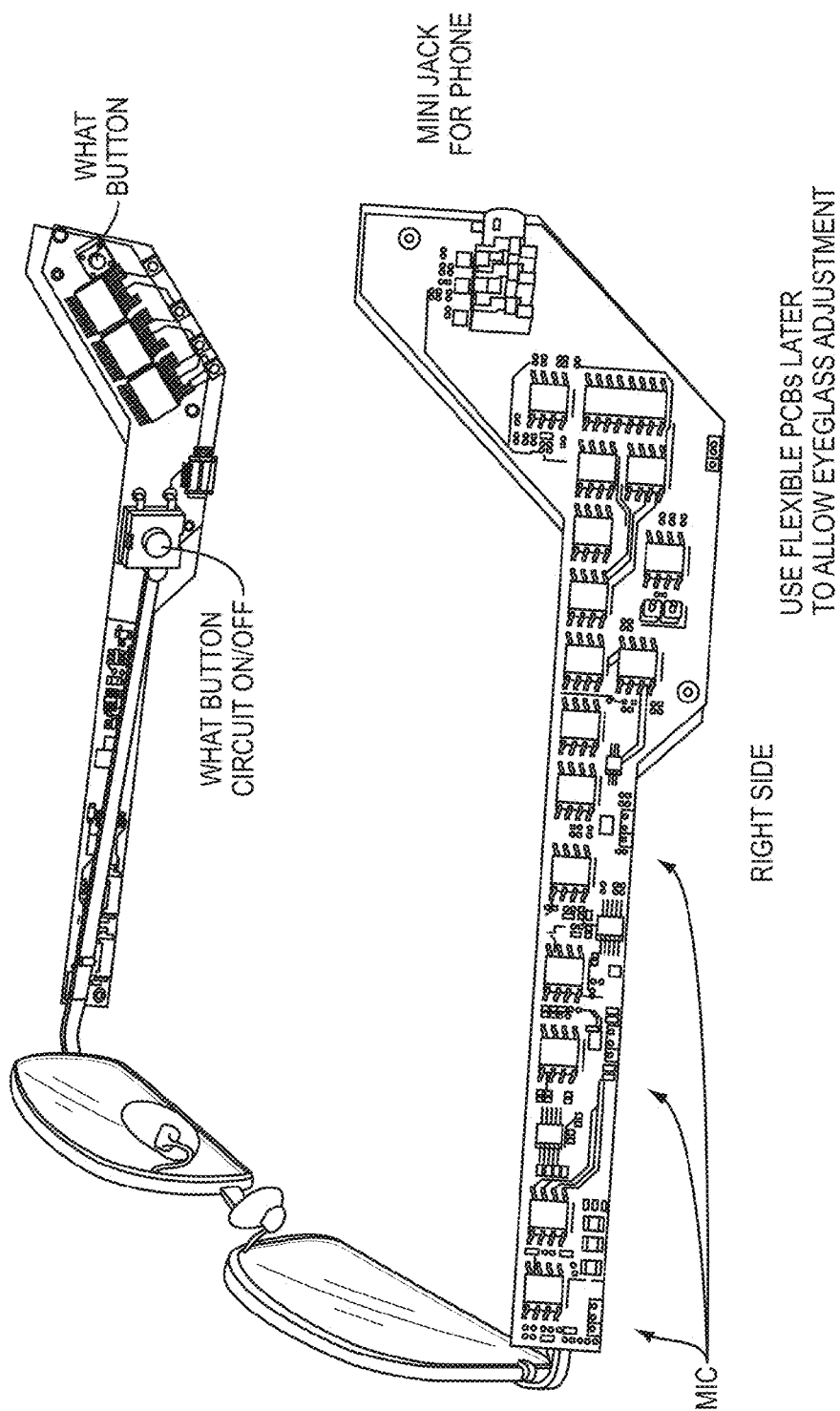
Figures 1, 2M:
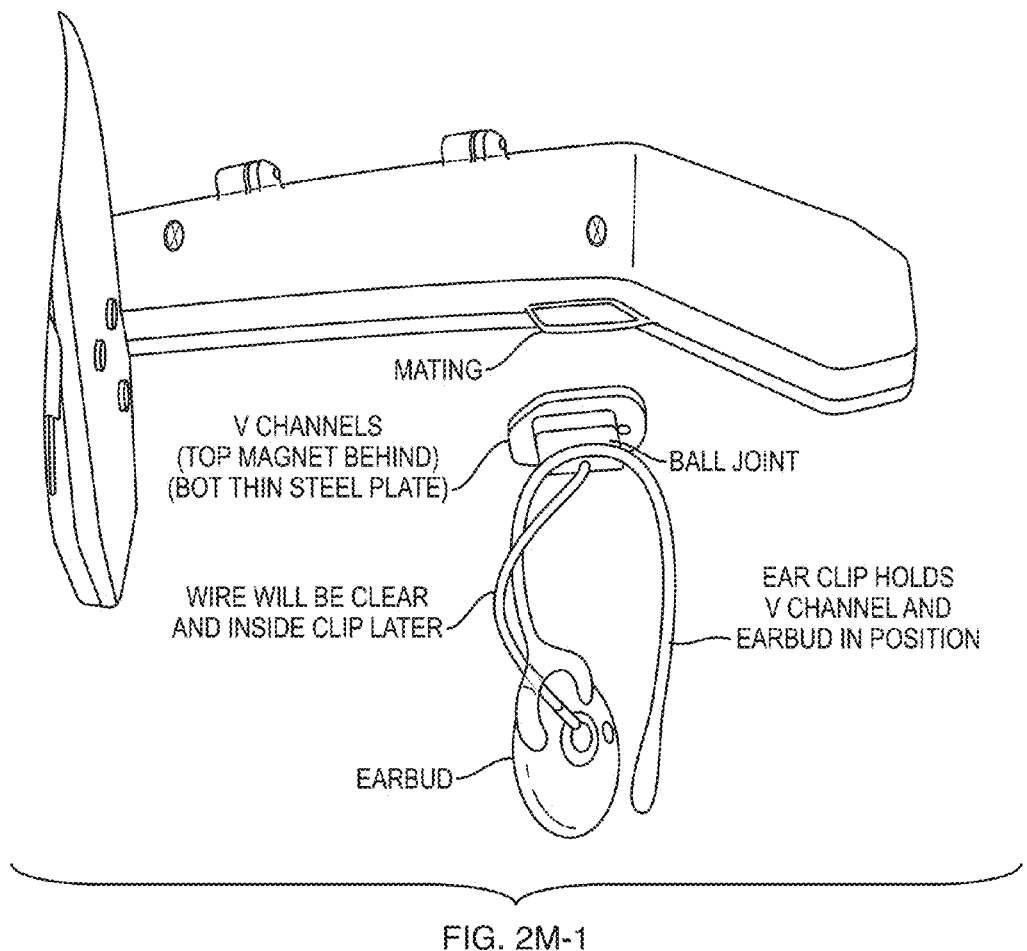
Figures 2, 2M:
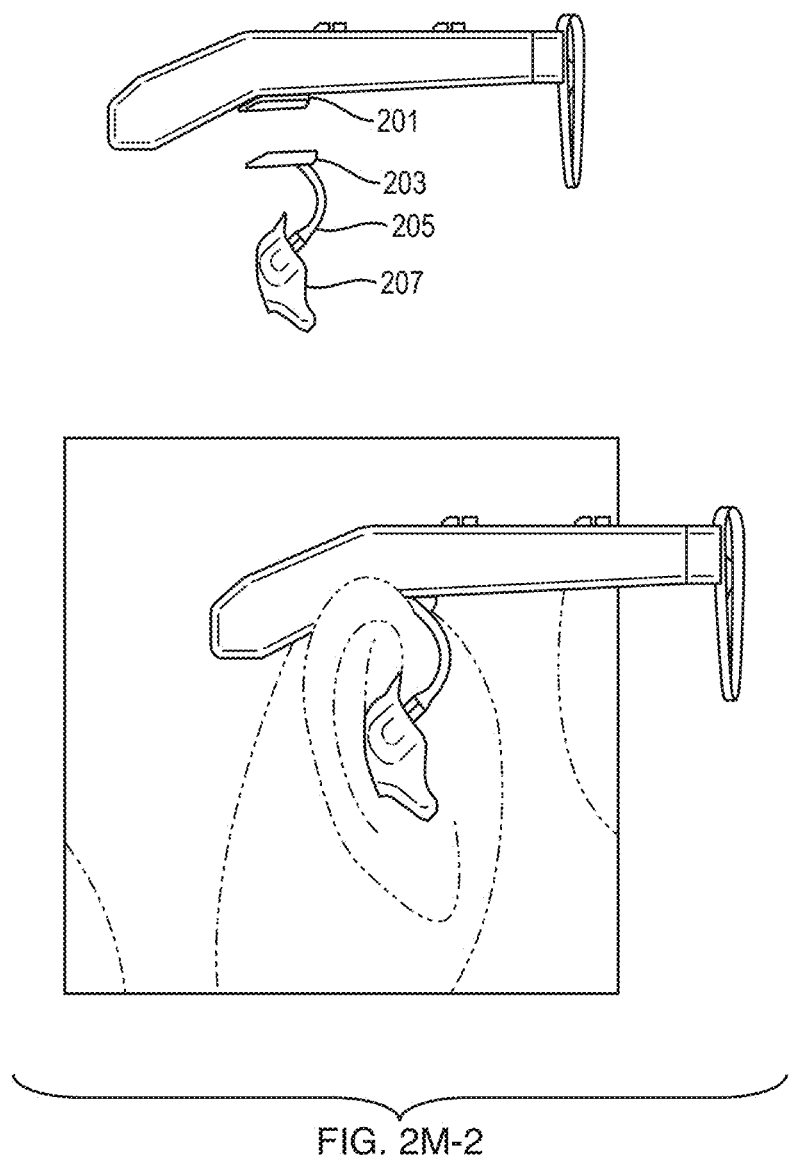
Figures 2, 2M, 3:
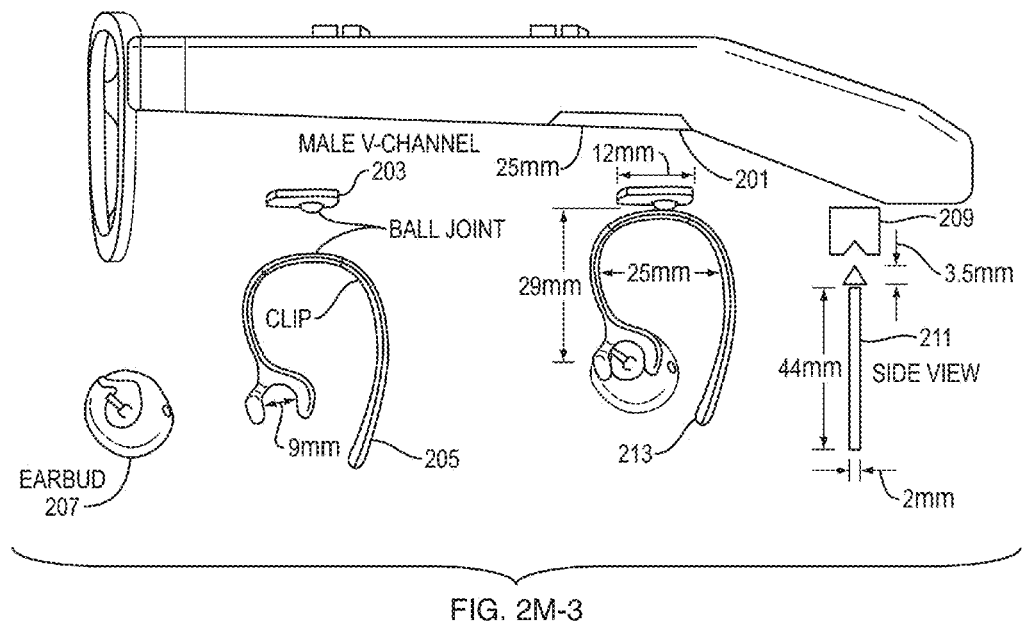
Figures 2, 2M, 3, 4:
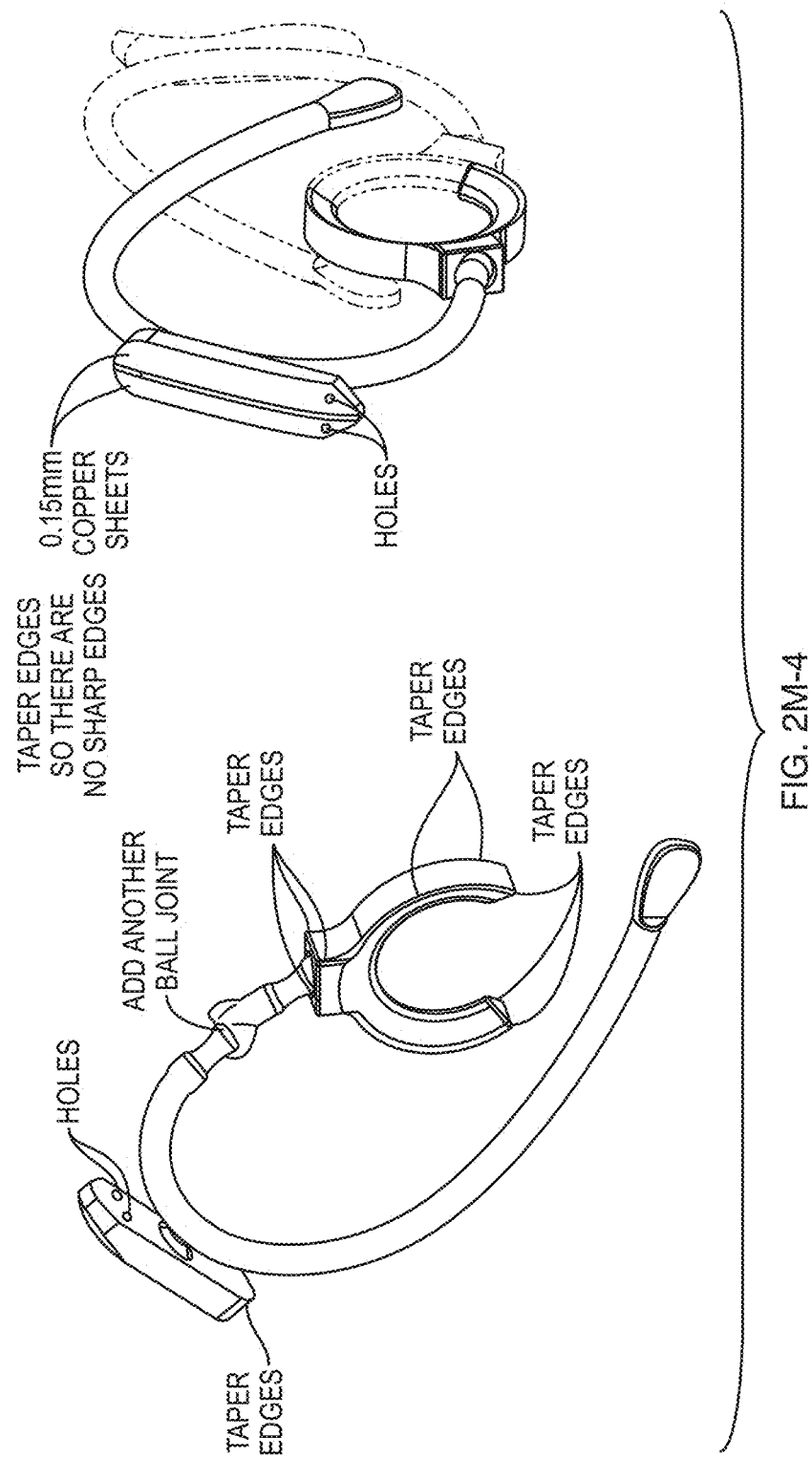
Figures 2, 2M, 3, 4, 5:
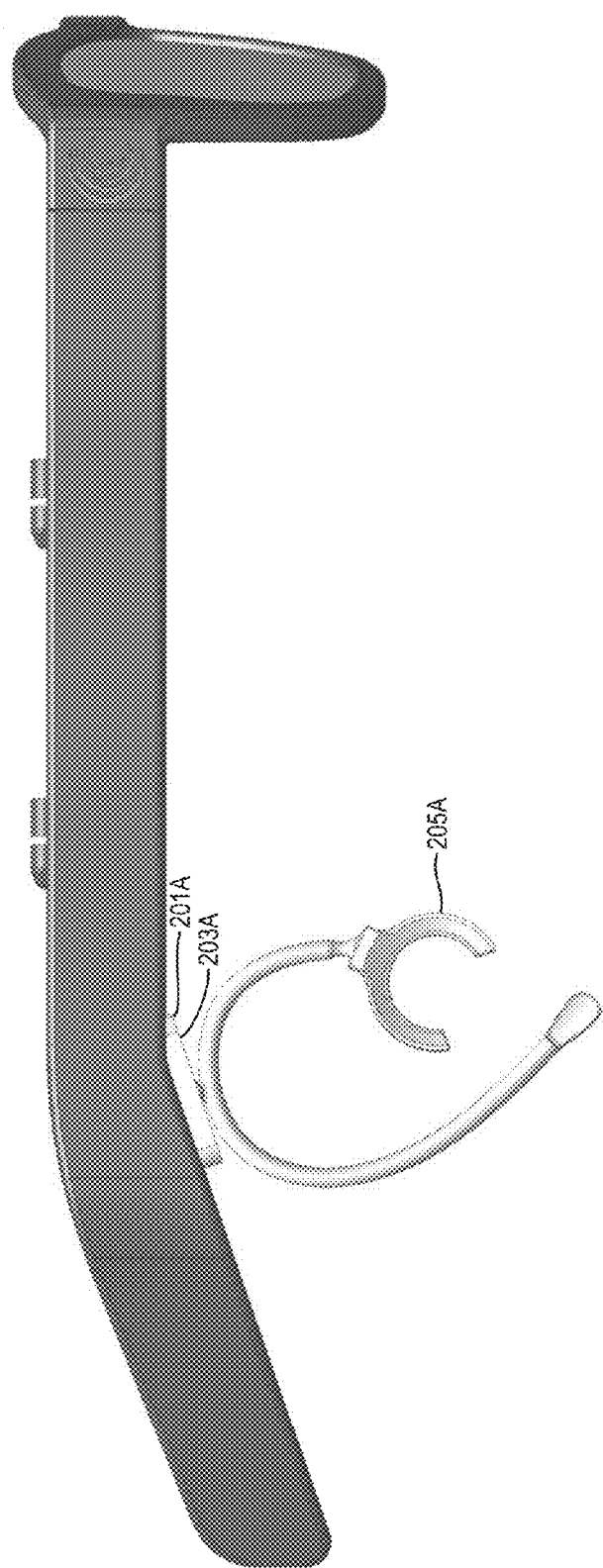
Figures 2, 2M, 3, 4, 5, 6, 7, 8, 9, 10:
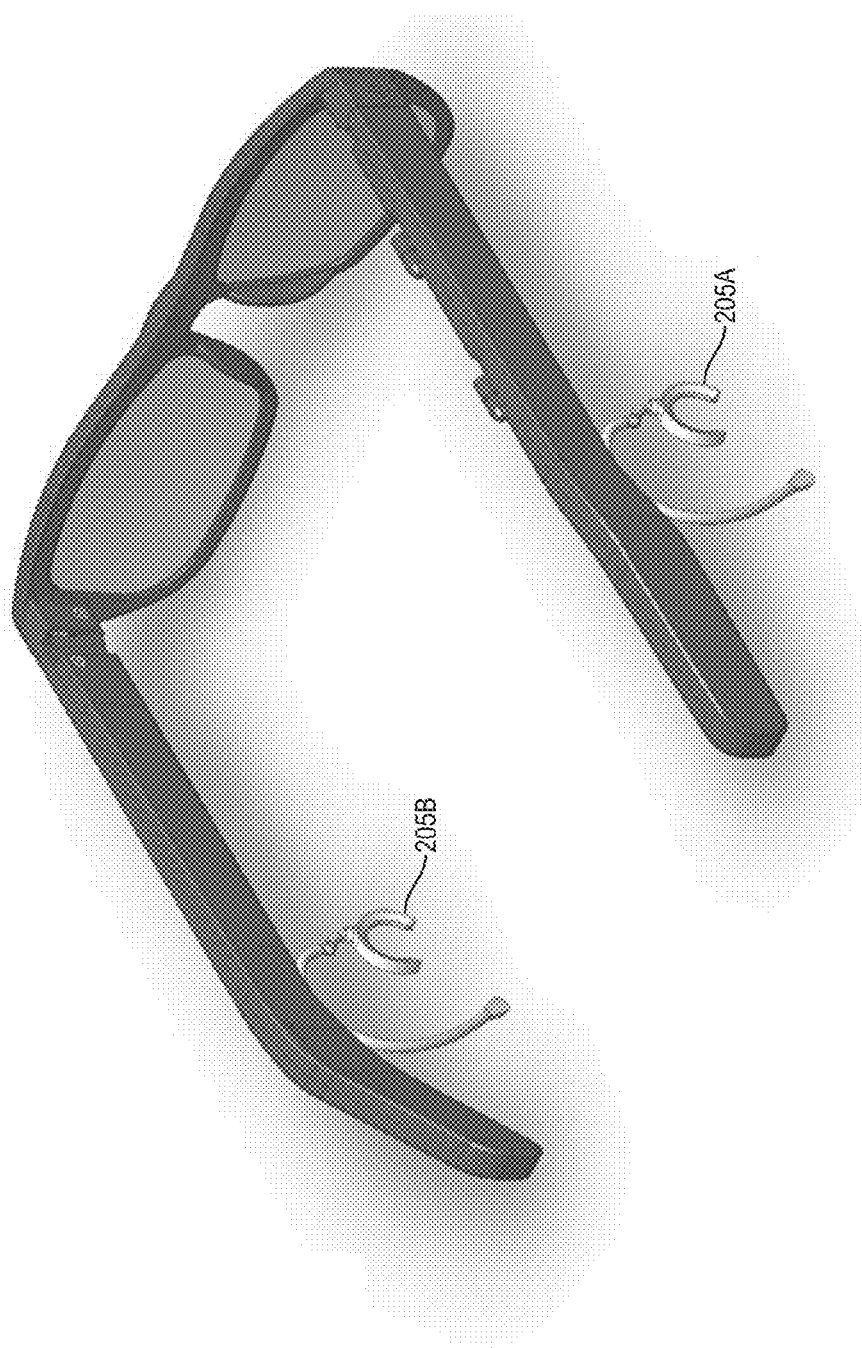
Figures 2, 2N:
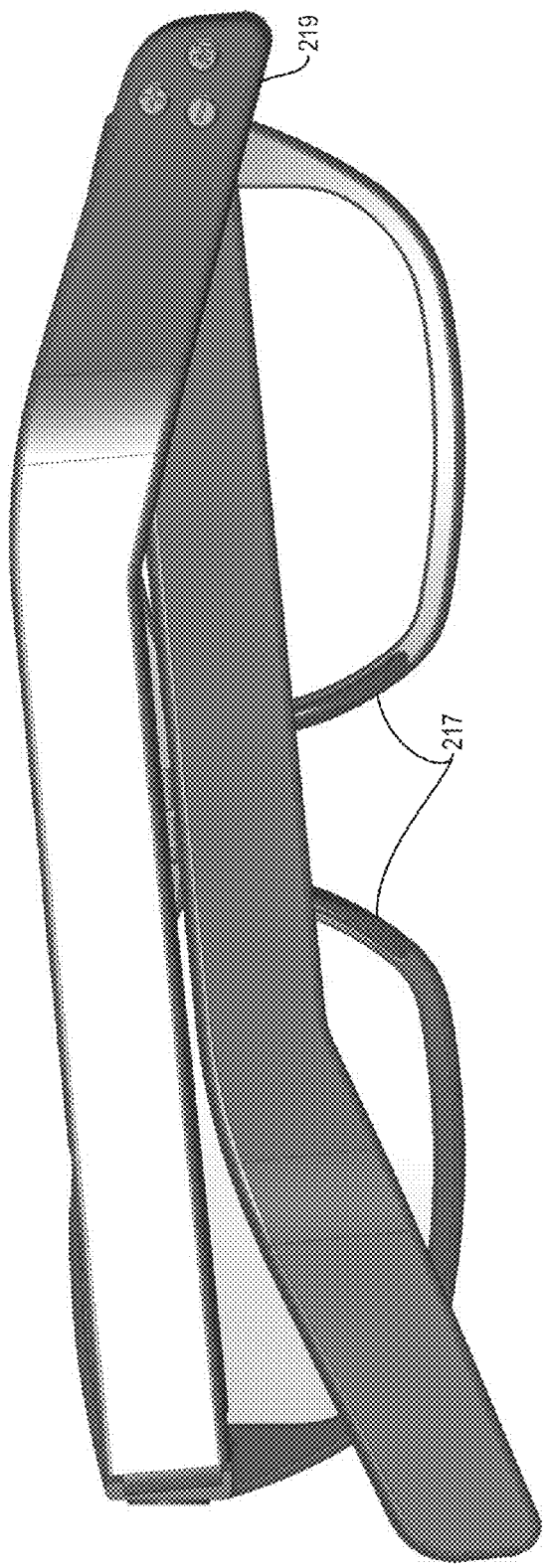
Figures 2, 2N, 3:
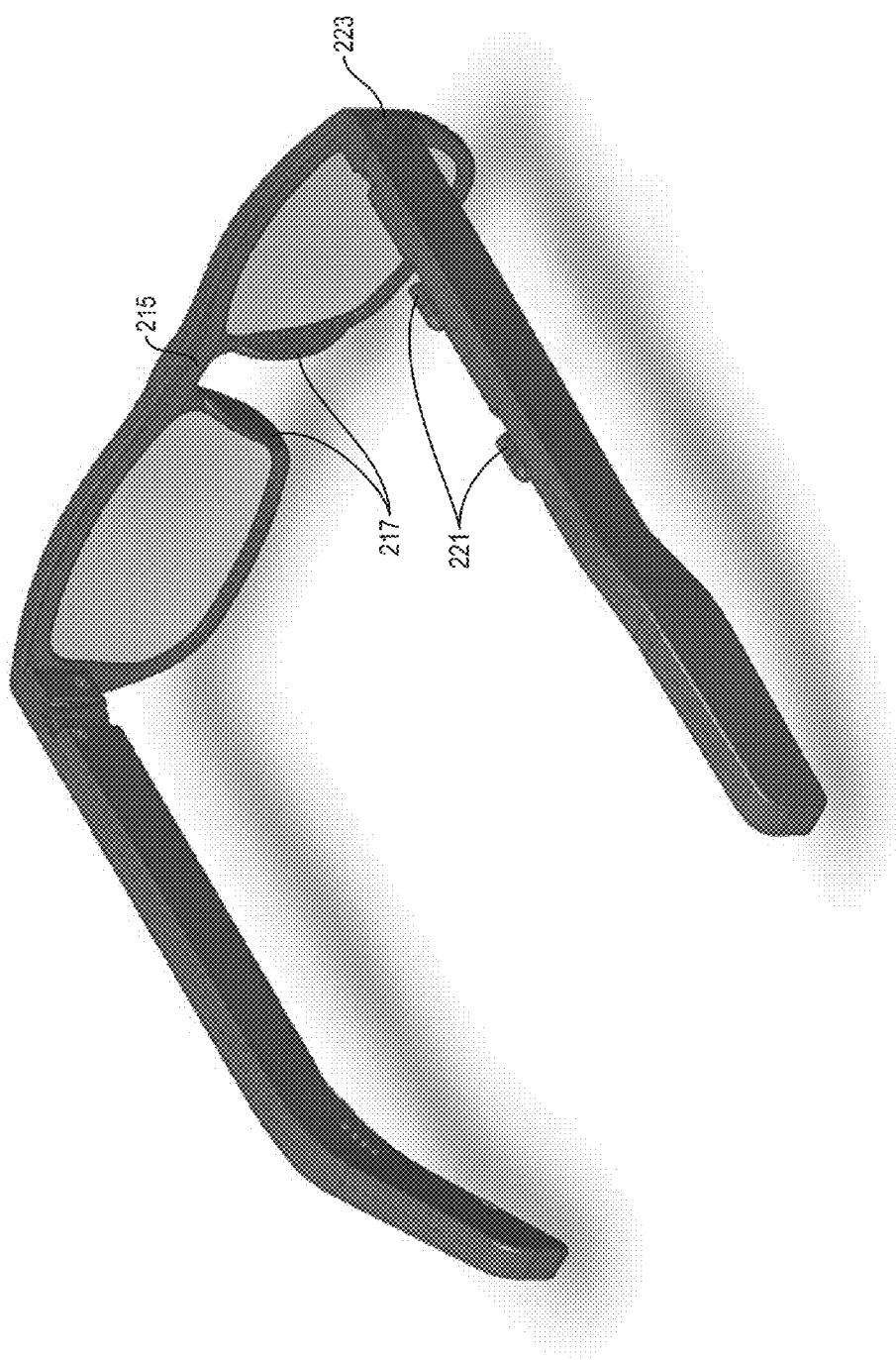
Figures 2, 2N, 3, 4, 5, 6:
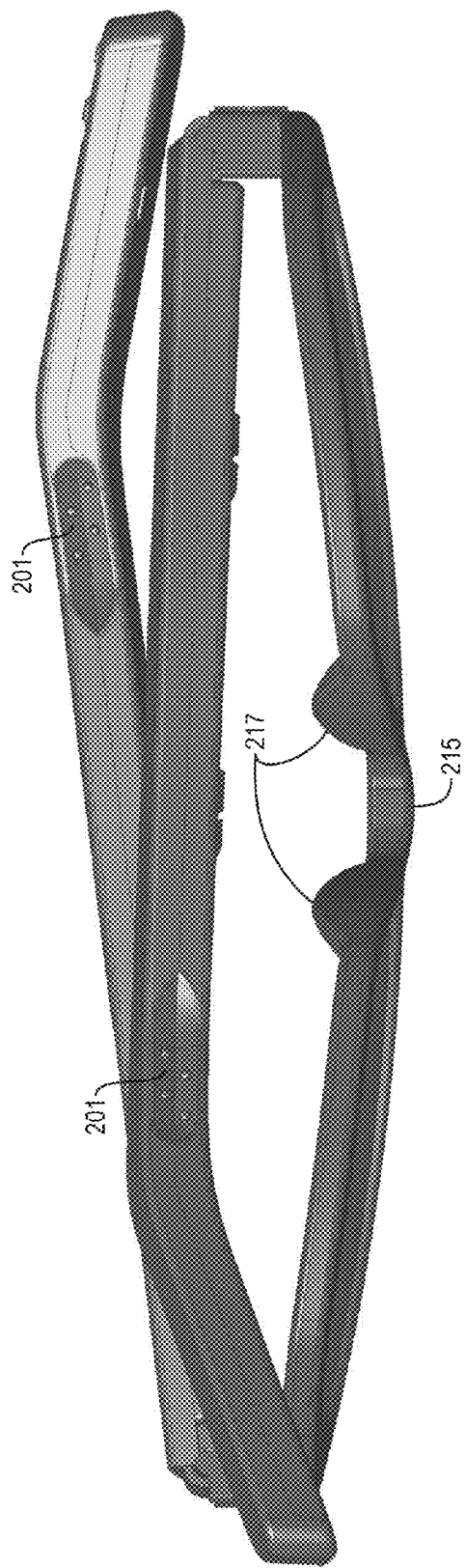
Figures 2, 2N, 3, 4, 5, 6, 7:
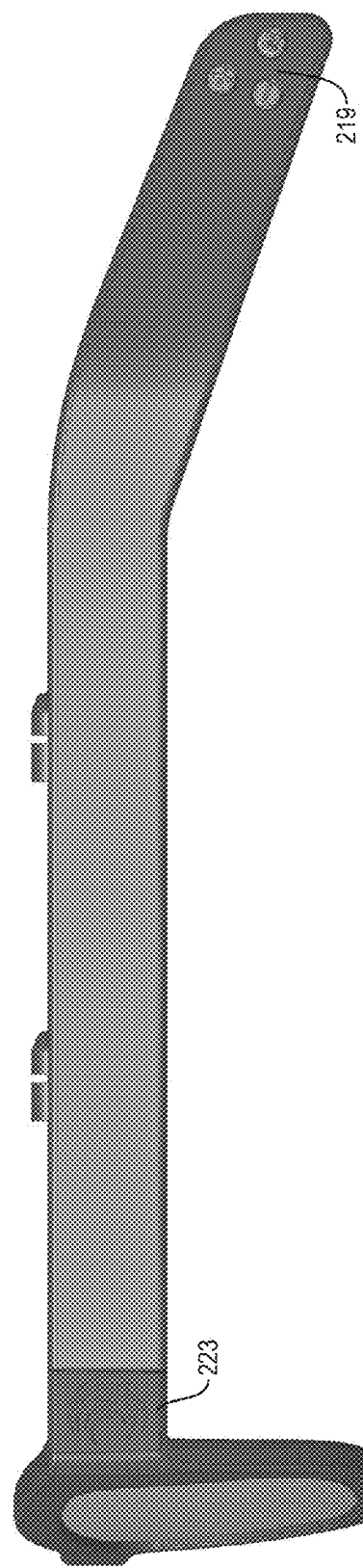
Figures 2, 2N, 3, 4, 5, 6, 7, 8, 9:
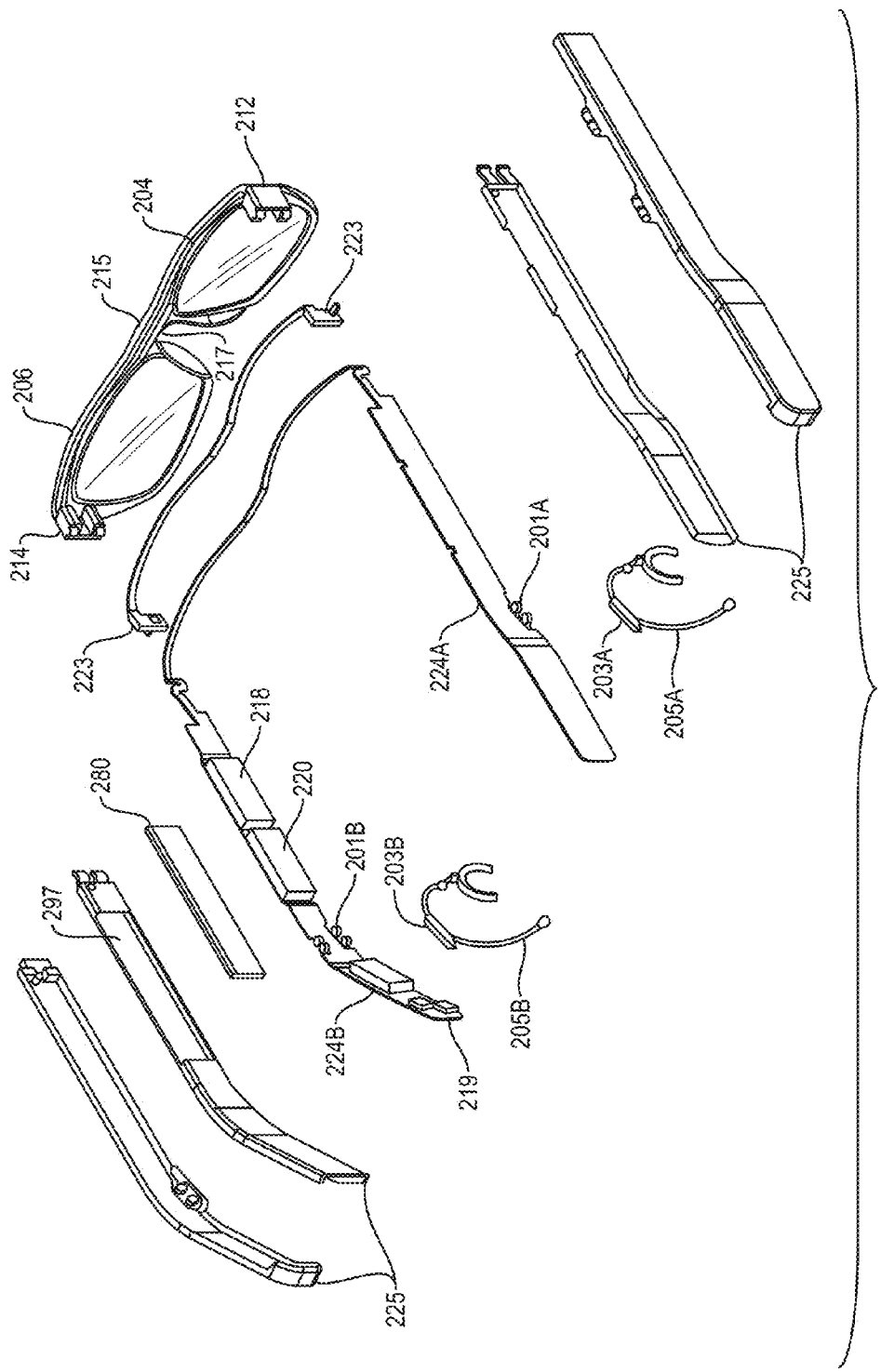
Figure 3:
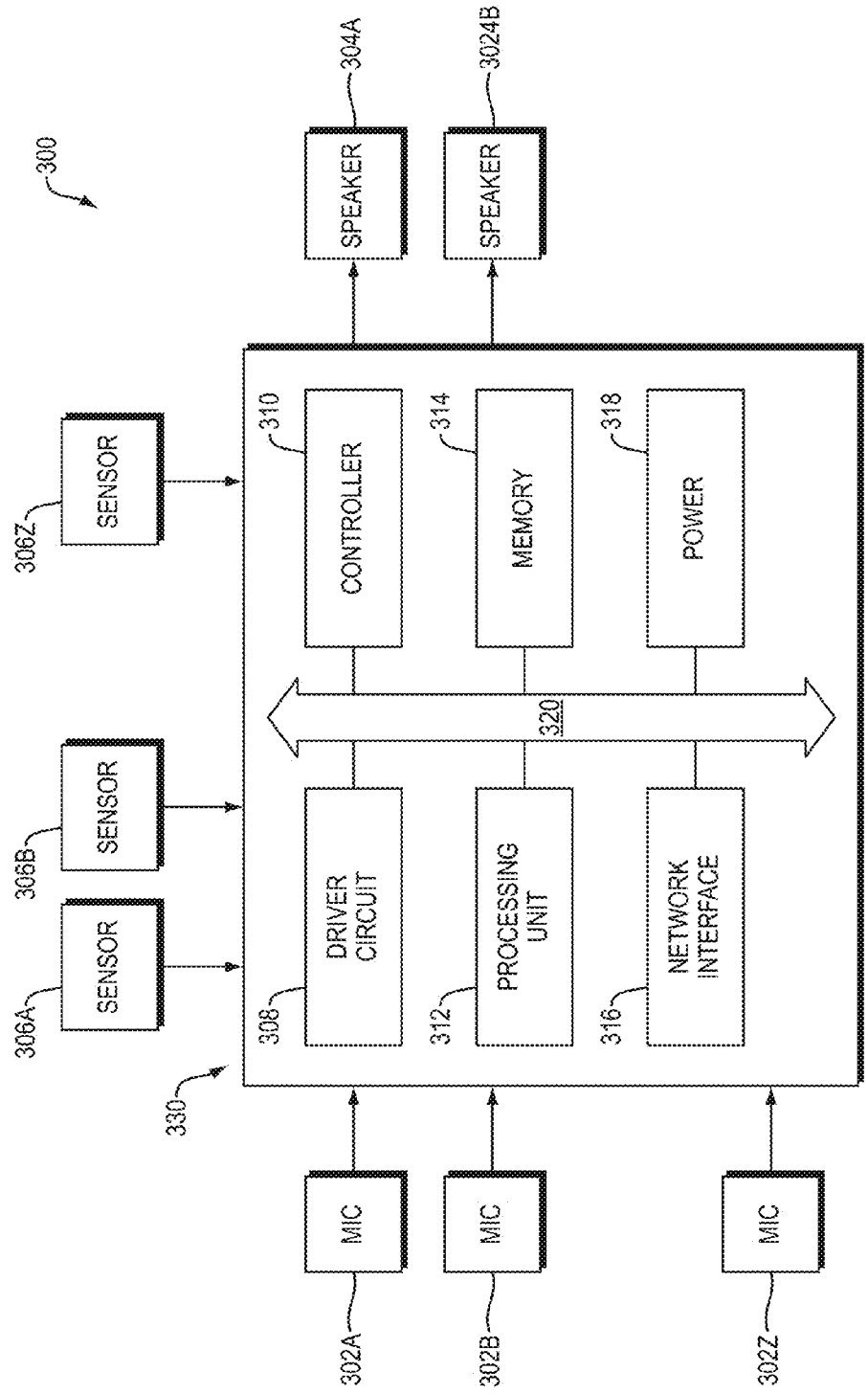

FIGS. 2N-1 through 2N-8 show 3D mechanical drawings of the hearing assistance device glasses according to embodiments of the disclosure. FIG. 2N-1 shows a front view of the glasses to be worn on the head of a user in some embodiments of the invention. This view of the glasses shows a nose bridge 215 and nose guard 217 configured to be supported on the nose of the user. A microphone, such as a ribbon microphone, may be positioned near or on the nose bridge. FIG. 2N-2 shows a back view of the glasses in some embodiments of the invention. This view of the glasses shows volume control buttons 219 that may be positioned on the left arm of the glasses. On the left side of the glasses, near the volume control buttons 219, may also be positioned power control (on/off) buttons. FIG. 2N-3 shows an isometric view of the glasses in some embodiments of the invention. This view of the glasses shows a mini jack connection positioned on the back right arm of the glasses to connect phones or other devices that may be positioned at the back of the glasses. In some embodiments, the mini jack connection may be a Bluetooth™ connection, a WiFi connection, or other such communication link. Some embodiments may also include a USB port positioned on the left arm of the glasses for connecting to peripheral devices such as flash memory sticks, DVD/CD players, and printers.

FIG. 2N-4 shows a top view of the glasses to be worn on the head of a user in some embodiments of the invention. This view of the glasses shows cone shaped interlocks 221 which may be used by some wearers of the glasses for direct earbud attachment. FIG. 2N-5 shows a bottom view of the glasses. This view of the glasses shows V-shaped interlocks 201 which may also be used by some wearers of the glasses for earclip with attached earbuds attachment. FIG. 2N-6 shows another bottom view of the glasses in some embodiments of the invention. This view of the glasses shows a closer view of V-shaped interlocks, including a closer view of the magnets used to secure V-shaped connectors to the V-shaped interlocks. FIG. 2N-7 shows a left view of the glasses in some embodiments of the invention. The view of the glasses shows the capacitive touch sensitive area referred to as the "what" button 223 that is present on both the right and left arm of the glasses. The "what" button 223 may be used to control functions of the glasses, such as recording or playing an audio clip in memory on the glasses. In some embodiments, sensors for taking physiological and physical measurements may also be present on the arms or bridge of the glasses. FIG. 2N-8 shows a right view of the glasses in some embodiments of the invention. This view of the glasses shows a closer view of the "what button," volume controls, and V-shaped interlocks positioned on the glasses.

FIG. 2N-9 shows an exploded view of the glasses to be worn on the head of a user in some embodiments of the invention. This view of the glasses shows the frames that may include rims 204, 206, arm coverings 225, hinges 212, 214 for connecting arms to rims 204, 206, and a bridge 215 for connecting rims 204, 206, and nose guard 217 configured to be supported on the nose of the user. The rims 204, 206 may hold lenses so that the glasses may function as a visual correction apparatus. The electronics for the glasses may be contained inside the arm coverings 225 of the glasses. The electronics may be configured to control lead microphone 218, lag microphone 220, and speaker 224B shown in the left arm of the glasses, and may be further configured to control a ribbon microphone that may be positioned near or on the nose bridge in some embodiments. The electronics may also be configured to provide volume control buttons 219 and power control (on/off) buttons positioned on the left arm of the glasses, and "what buttons" 223 positioned on the front of the glasses on both arms near the hinges 212, 214. In some embodiments, sensors for taking physiological and physical measurements may also be present on the arms or bridge of the glasses. The electronics may be powered by a battery 280 that fits into alignment troughs 297 on the left arm covering 225. This view of the glasses shows interlock strip 201A positioned on the right arm of the glasses interfacing with speaker 224A, and interlock strip 201B positioned on the left arm of the glasses with interfacing with speaker 224B. The earclips 205A, 205B may be attached to the glasses by means of connectors 203A, 203B respectively positioned on earclips 205A, 205B. This view of the device shows the earclip embodiment from FIG. 2M-4 (with tapered edges and a ball joint attaching the earbud connector to the earclip).

In another embodiment, a single flexible printed circuit board may be used in order to remove connectors and wires to save space and allow for higher reliability, and to allow the glasses arms to be bent for fitting to the persons head.

Example System Diagram

FIG. 3 illustrates a system diagram of the hearing assistance device according to an embodiment of the disclosure.

Referring to FIG. 3, a hearing assistance system 300 may include microphones 302.A-302.Z (such as microphones 218, 220, 222 as shown in FIG. 2A and microphone 260 as shown in FIG. 2D), speakers 304.A, 304.B (such as speaker 224 as shown in FIG. 2A), and control input sensors 306.A-306.Z (such as touch sensors 234, 236 as shown in FIG. 2A). Hearing assistance system 300 may further include processing device 330 for processing sound signals received from microphones 302.A-302.Z, and output the processed sound signals to speakers 304.A-304.B.

In one embodiment, processing device 330 may include a driver circuit 308, a controller 310, a processing unit 312, a memory 314 (e.g., read-only memory (ROM), flash memory, dynamic random access memory (DRAM) such as synchronous DRAM (SDRAM), etc.), a network interface 316, and power circuit 318, all of which may be interconnected through a bus 320. Driver circuit 308 may be coupled to microphones 302.A-302.Z to pre-amplify sound signals received from these microphones. Driver circuit 308 may also be coupled to speaker 304.A, 304.B to drive the speakers. Controller 310 may be a microcontroller unit (MCU) that is to receive control inputs 306.A-306.Z to control a number of gain multipliers. Processing unit 312 may enhance the received sound signal to be suitable for the user to listen to. For example, processing unit 312 may suppress noise and enhance the speech component from a certain direction. In one embodiment, processing unit 312 may enhance certain frequency range of the received sound signal in view of the user's hearing deficiencies. Memory 314 may be a storage device to continuously record audio clips that may be replayed at user's instruction. For example, user may instruct the hearing assistance system through one of sensors 306.A-306.Z to repeat last sentence heard. Audio contents stored in memory 314 may be selected, retrieved and played at this instruction. Network interface 316 may include wired and wireless connections to other devices. In one embodiment, network interface 314 may include a UBS interface through which external devices may communicate with hearing assistance system 300. In another embodiment, network interface 316 may include a wireless connection such as a Bluetooth® connection. For example, in one embodiment, speakers 304.A, 304.B may be Bluetooth® speakers. Power circuit 318 may include a battery and circuitry to supply electrical power to the hearing assistance system 300.

In operation, microphones 302.A-302.Z may receive sound signals (such as speech). Hearing assistance system 300 may use the time delay between sound or audio signals reaching a first and a second microphone to form a directional microphone. For example, a lead microphone may amplify positive analog electronic signals, for example, of 1.0 while a lag microphone may amplify negative analog electronic signals, for example, of −0.6 leaving a signal of 0.4. A directional microphone may provide sound signals with improved sound quality and less distortion. For example, sound signals received from the side of the hearing assistance system may cancel or zero out while sound received from the front of the hearing assistance system may be selectively amplified. Signal processing on electronic analog signals may be at the speed of light.

In operation, microphones 302.A-302.Z may receive sound signals (such as speech) and convert the sound signals into electronic signals. Driver circuit 308 may perform pre-processing on the electronic signals. In one embodiment, the preprocessing may include pre-amplification and gain adjustment. In another embodiment, the driver circuit may include analog-to-digital converters (ADCs) to convert analog electronic signals into digital signals. Processing unit 312 may perform signal processing on the electronic signals. In one embodiment, processing unit 312 may include hardware components to perform noise filtering, mono to stereo conversion, and signal normalization. In another embodiment, processing unit 312 may include a digital signal processor (DSP) that is configured to perform noise filtering, mono to stereo conversion, and signal normalization in the digitized sound signals. DSP conversion may lose or distort time delay for directionality of analog signals. The DSP may also be configured to perform other functions including sentence boundary detection and speech spectrum forming based on user's hearing profile. The processing unit 312 may also include an accelerometer which may detect noise vibrations, such as the user's own voice or banging of the frames, and may further enhance frequency range of the received sound signal by mixing the sounds signals with the signals from the accelerometer to reduce the volume of the noise vibrations in the sound signals. The processing unit 312 may also receive instructions and signals from other devices, such as mobile devices with an electronic interface for controlling and monitoring the system, such as configuring gain adjustments. Driver circuit 308 may further include amplifiers and/or digital-to-analog converters (DACs) to play the processed electronic signals on speakers 304.A, 304.B either as mono or stereo audio. An earphone may be connected through respective channels to enable the user to hear the amplified representation of the audio signal in stereo.

The user of hearing assistance system 300 may issue commands to the system through sensors 306.A-306.Z. In one embodiment, the user may press a touch button sensor to request a replay of last-heard sentence. In response to the request, controller 310 may retrieve from a buffer in memory 314 the audio clip labeled as the last heard sentence and play the retrieved audio clip. In another embodiment, the user may slide a finger on a strip of sensor to request an adjustment of volume. In response to the request, controller 310 may change gains to the sound and thus adjust volume at speakers 304.A, 304.B.

Example Schematic

Figure 4A:
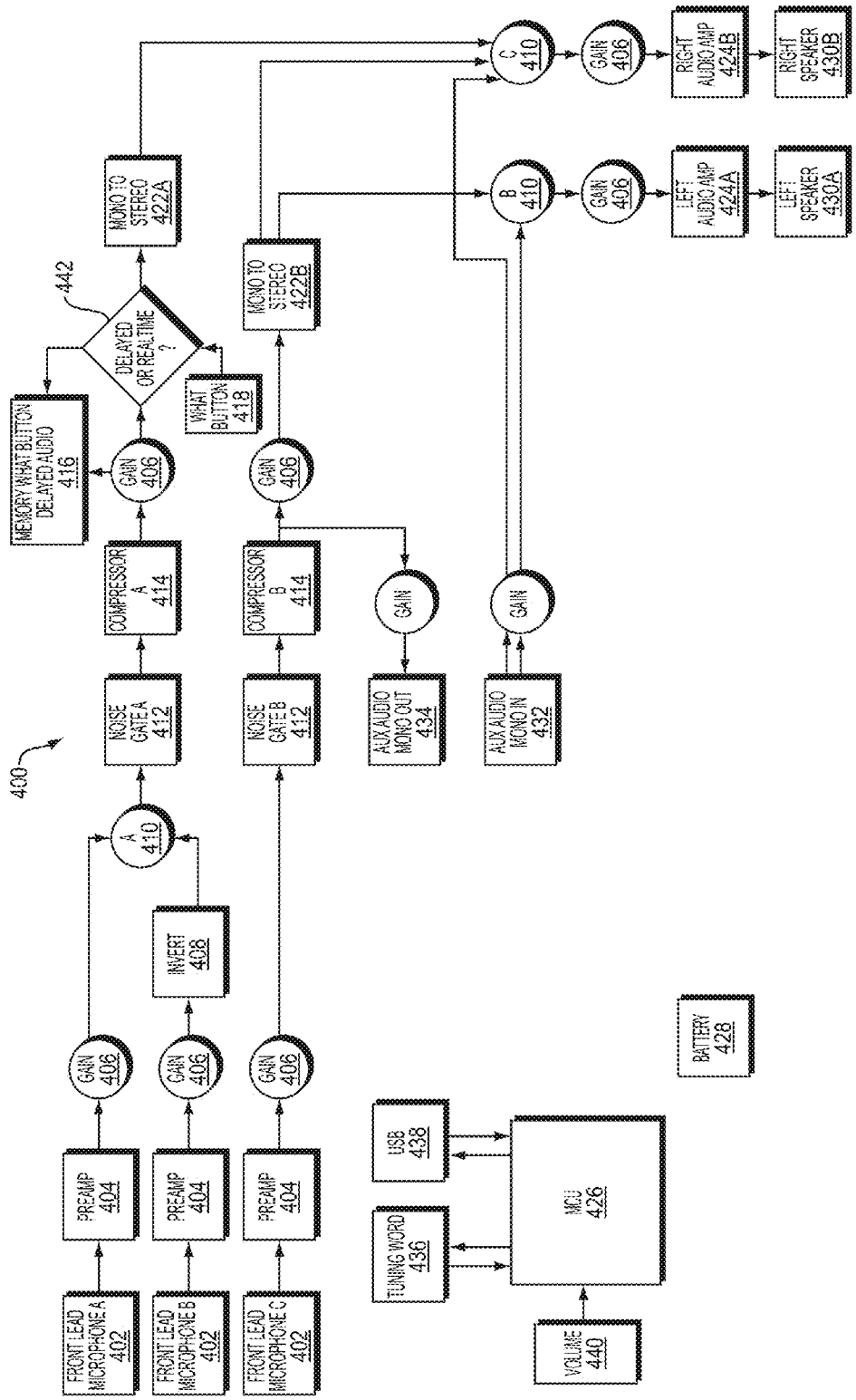
FIG. 4A shows a detailed schematic of the hearing assistance device 400 according to an embodiment of the disclosure.

FIG. 4A illustrates a detailed schematic of the hearing assistance device embodiment 400. Referring to FIG. 4A, hearing assistance device 400 may include lead microphone 402.A, lag microphone 402.B, and mouth microphone 402.C. Each of the microphones may convert received sound into electronic signals. For example, microphones 402.A, 402.B may convert speech from others into electronic signals, and mouth microphone 402.C may convert the user's speech into electronic signals. Each of microphones 402.A-402.C may be coupled to a respective pre-amplifier 404 to amply the electronic signals to an appropriate level. Additionally, each of the preamplifiers 404 may be coupled to a respective gain adjuster 406 that may variably adjust a gain to the electronic signals under the control of a microcontroller (MCU) 426. The electronic signals from lag microphone 402.B may be inverted at inverter 408 (i.e., signal values are inverted) and is then mixed with electronic signals from lead microphone 402.A at signal mixer 410.A. Signal mixer 410.A may enhance speech signal from the direction that the user faces and reduce incidental sounds from other directions.

A noise gate 412.A may further filter out noise (such as background noise) from the enhanced signal, and then a compressor 414.A may track the filter signals and create a track voltage for voltage controlled amplifier (VCA) which is part of the compressor 414.A. Compressor 414.A may allow the hearing assistance device 400 to apply a high gain in the earlier stages (such as 404, 406) for optimal directional selection and noise reduction, and then normalize before being played to the user.

The normalized audio signal may be again through a gain adjuster 406 whose gain is controlled by MCU 426 and then the audio signal may be recorded in storage 416 for replay. Further, the normalized audio signal may be converted from mono to stereo at converter 422.A and placed onto mixers 410.B, 410.C. Electronic signals from mouth microphone 402.C may undergo similar processing through preamplifier 404, gain adjuster 406, noise gate 412.B, compressor 414.B, mono to stereo converter 422.B, and mixers 410.B, 410.C. The mixed audio signals may undergo further gain adjustment at gain adjuster 406, and left and right audio amplifications 424.A, 424.B before being played out at speakers 430.A, 430.B.

In one embodiment, hearing assistance device 400 may include a touch button 418 through which the user may issue a replay command. For example, the user may be unsure about what he just heard. Instead of asking for repeating from the speaker, the user may touch button 418 (referred to as "What" or "what" button). Logic gate 480 may retrieve and play content stored in storage 416 in response to the activation of the "What" button. In some embodiments, the device further comprises a "what" button 418, wherein the "what" button 418 allows a user to retrieve and play the audio signal, e.g., repeat audio signal. The audio signal may be stored in storage 416, which is an audio pipeline constantly being filled like how a shift register handles bits. For example, the pipeline acts as a buffer and provides delayed audio signal as output when the pipeline is accessed with the "what" button. The "what" button may copy the output of the pipeline (delayed audio) into FLASH whenever the user listens or accesses the pipeline audio signal.

In one embodiment, hearing assistance device 400 may further include auxiliary audio input 432 and auxiliary audio output 434. In one embodiment, auxiliary audio input 432 and auxiliary audio output 434 may be wired so that other devices may be plugged in. In another embodiment, auxiliary audio input 432 and auxiliary audio output 434 may be wireless (such as Bluetooth® connections) so that other devices may communicate with hearing assistance device according to a wireless standard. In some embodiments, the Bluetooth® interface allows a streaming audio or phone connection to the hearing assistance device 400. In some embodiments, the wireless standard uses a Wireless Fidelity (WiFi) interface to network between the hearing assistance device and other devices. For example, a WiFi interface can be used for audio, video, and data connections, peer to peer, peer to group, remote microphones, remote audiologist evaluation, etc. In some embodiments, the Bluetooth® or WiFi connections require most of the processing power of the hearing assistance device, and the user may not be able to receive audio signal while using these functionalities. In one embodiment, auxiliary audio output 434 may output audio signals from mouth microphone 402.C to an external device such as a cell phone. In one embodiment, an external device such as a cell phone may input audio to the hearing assistance device 400 through auxiliary input 432. The audio input may be stereo signals that may be placed at mixers 410.B, 410.C and played out at speakers 430.A, 430.B. In this way, the hearing assistance device 400 may be interfaced with a cell phone.

Another Example Schematic

Figure 4B:
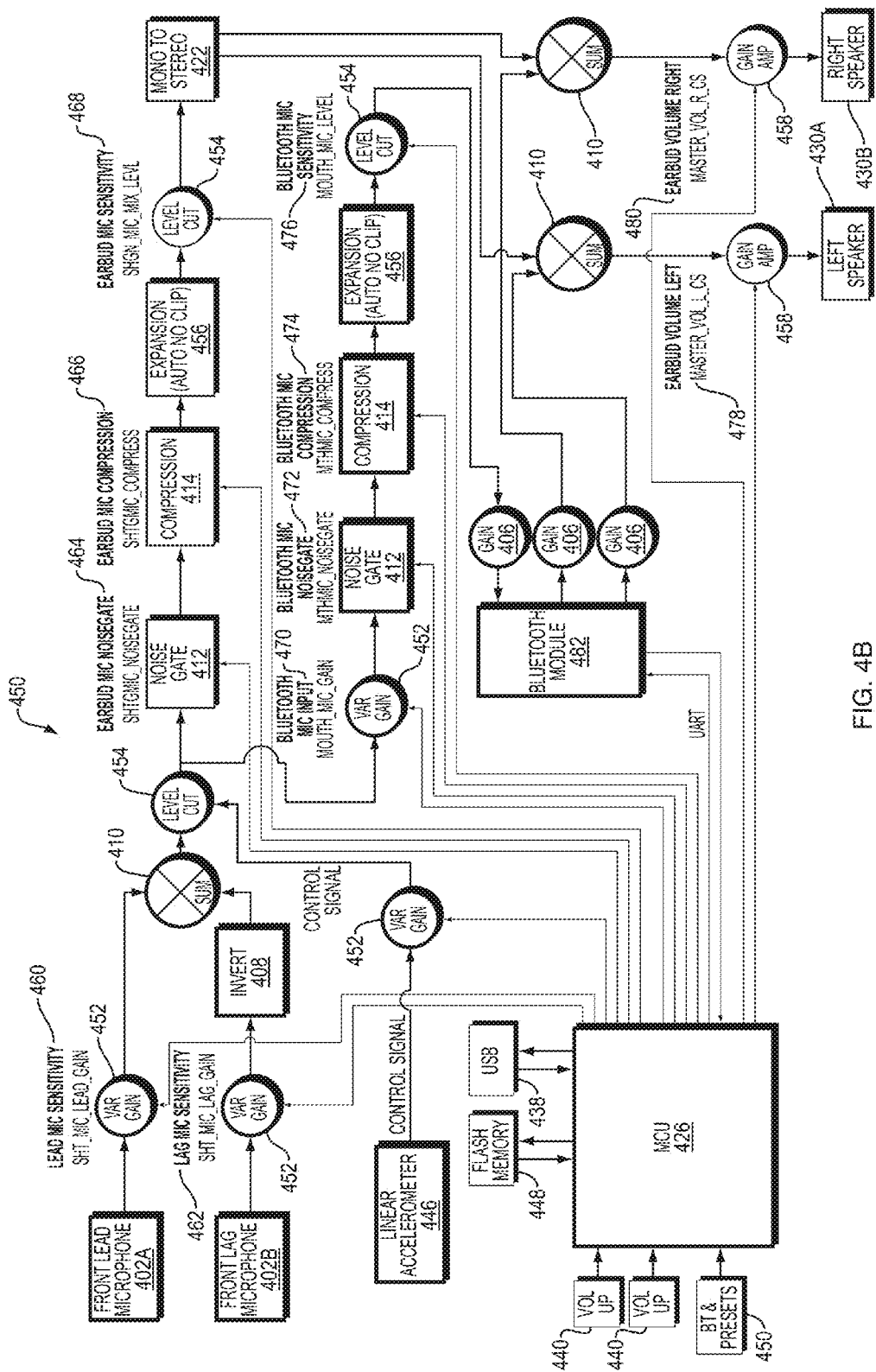
FIG. 4B shows another detailed schematic of the hearing assistance device 450 according to a different embodiment of the disclosure.
Figure 4C:
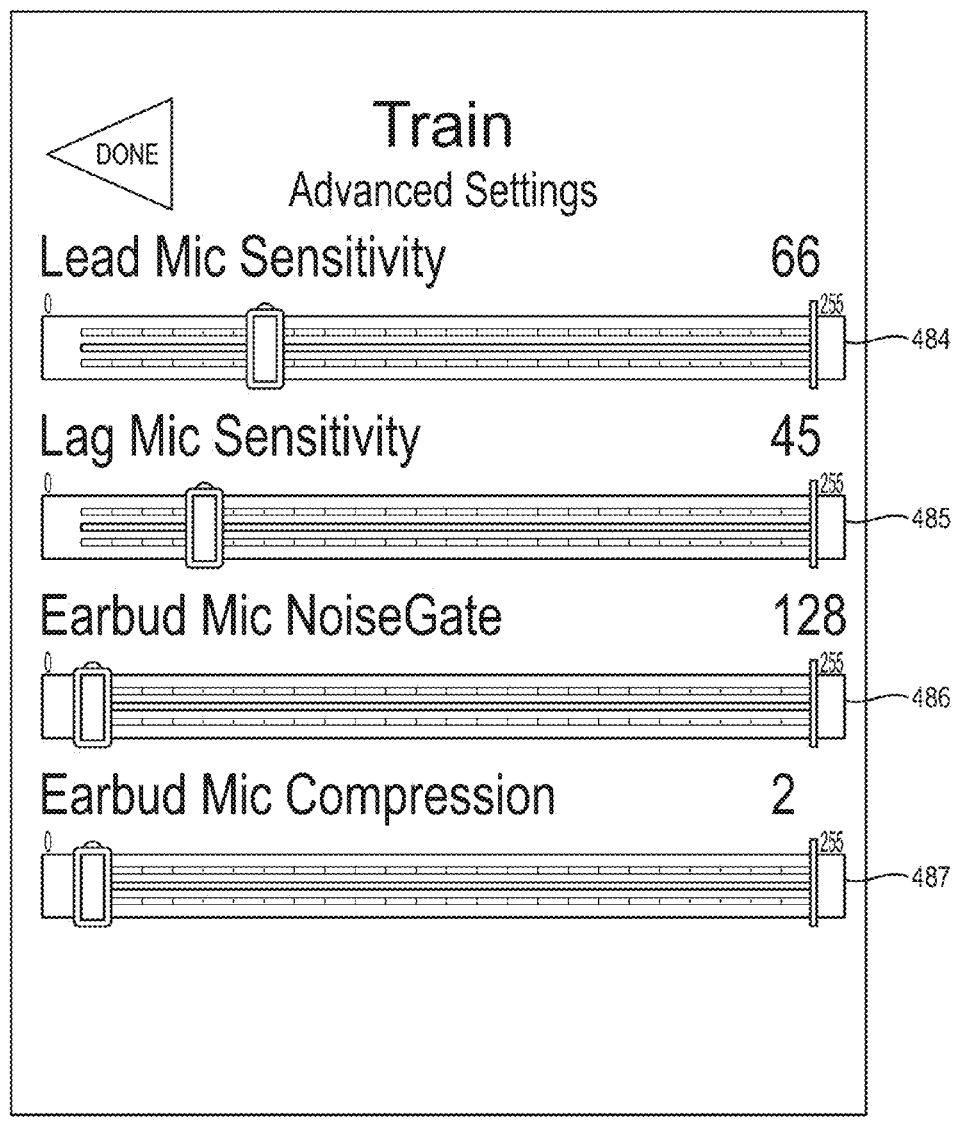
FIG. 4C shows a user interface for tuning the hearing assistance device 450 according to an embodiment of the disclosure.

FIG. 4B illustrates a detailed schematic of the hearing assistance device embodiment 450. Referring to FIG. 4B, hearing assistance device embodiment 450 may include lead microphone 402A and lag microphone 402B. The embodiment may also include a mouth microphone, which is not shown in FIG. 4B. Each of the microphones may convert received sound into audio signals. For example, microphones 402A, 402B may convert speech from others into audio signals, and the mouth microphone may convert the user's speech into audio signals. Microphones 402A and 402B may be coupled to variable gain adjusters 452 to increase or decrease the amplitude of the audio signals from the microphones under the control of a microcontroller (MCU) 426. The sensitivity of microphones 402A and 402B may be controlled by tuning the variable gain adjusters by means of signal SHT_MIC_LEAD_GAIN 460 for lead microphone 402A and by means of signal SHT_MIC_LAG_GAIN 462 for the lag microphone 402B. As shown in FIG. 4C, the user may be provided an electronic interface, such as on a mobile phone, with a Lead Mic Sensitivity 484 option (e.g. slider) for controlling the SHT_MIC_LEAD_GAIN 460 signal and a Lag Mic Sensitivity 485 option (e.g. slider) for controlling the SHT_MIC_LAG_GAIN 462 signal. Once, adjusted for variable gains, the audio signals from the lag microphone 402B may be inverted at inverter 408 (i.e. signal values are inverted) and then summed with the audio signals from lead microphone 402 at SUM signal mixer 410.

The hearing assistance device embodiment 450 may also include an accelerometer 446 to detect and reduce vibration noise. As the amplitude gains of the audio signals are increased, the hearing assistance device may be more sensitive to vibrations from various sources, including the user's own voice or banging of the device glasses. The accelerometer 446 may be placed at a location on the device, such as on the frames, the microphones, the earbuds, or the headset, and may generate electronic signals based on the linear output from detected vibrations. The electronic signals from the accelerometer may be used as control signals, which may first be adjusted for variable gain 452 and then mixed with the summed audio signals at the Level Cut mixer to squelch the vibrations from the summed electronic signals. By mixing the accelerometer signals after summing the microphone signals, the device in this embodiment preserves the pure audio from the microphones, instead of artificially adjusting the audio, as would result from directly mixing the accelerometer signals with the output signals from the inverter 408, or cancelling the sound completely. Using this embodiment, the accelerometer signal acts to fluctuate the volume (e.g. lower the volume) of only the source of the vibration. For example, if the vibration is caused by the user's own voice, only the sound of the user's is lower, and the sound of other voices would not be affected. In other embodiments, the accelerometer may be placed in another location on the schematic to instead be used for cancellation of the audio from the vibration. In some embodiments, the user may be able to control the sensitivity of the accelerometer and the reduction in volume due to a detected vibration through an electronic interface.

A noise gate 412 may further filter out noise (such as background noise) from the enhanced signal, and then a compressor 414 may track the filter signals and create a track voltage for voltage controlled amplifier (VCA) which is part of the compressor. In this embodiment, a separate noise gate 412 may be used for the earbud microphone and the Bluetooth microphone input. The Bluetooth microphone input may first be adjusted for variable gain 452 prior to being filtered at the noise gate 412. The sensitivity of the noise filtering for the earbud microphone input may be controlled by means of signal SHTGMIC_NOISEGATE 464, and the sensitivity of the noise filtering for the Bluetooth microphone input may be controlled by means of signal MTHMIC_NOISEGATE 472. As shown in FIG. 4C, the user may be provided an electronic interface, for controlling the SHTGMIC_NOISEGATE 464 and MTHMIC_NOISEGATE 470 signals. For example, as in FIG. 4C, the user may be provided with an Earbud Mic Noisegate option (e.g. slider) 486 for controlling the SHTG-MIC_NOISEGATE 464 signal. A similar option may be provided to control the MTHMIC_NOISEGATE 470 signal.

Compressor 414 may allow the hearing assistance device 400 to apply a high gain in the earlier stages (such as 452) for optimal directional selection and noise reduction, and then normalize through Expansion 456 before being played to the user. The sensitivity of the compression for the earbud microphone input may be controlled by means of signal SHTG-MIC_COMPRESS 466, and the sensitivity of the compression for the Bluetooth microphone input may be controlled by means of signal MTHMIC_COMPRESS 474. As shown in FIG. 4C, the user may be provided an electronic interface, for controlling the SHTGMIC_COMPRESS 466 and MTHMIC_COMPRESS 474 signals. For example, as in FIG. 4C, the user may be provided with an Earbud Mic Noisegate option (e.g. slider) 487 for controlling the SHTGMIC_COMPRESS 464 signal. A similar option may be provided to control the MTHMIC_COMPRESS 474 signal.

Figure 4D:
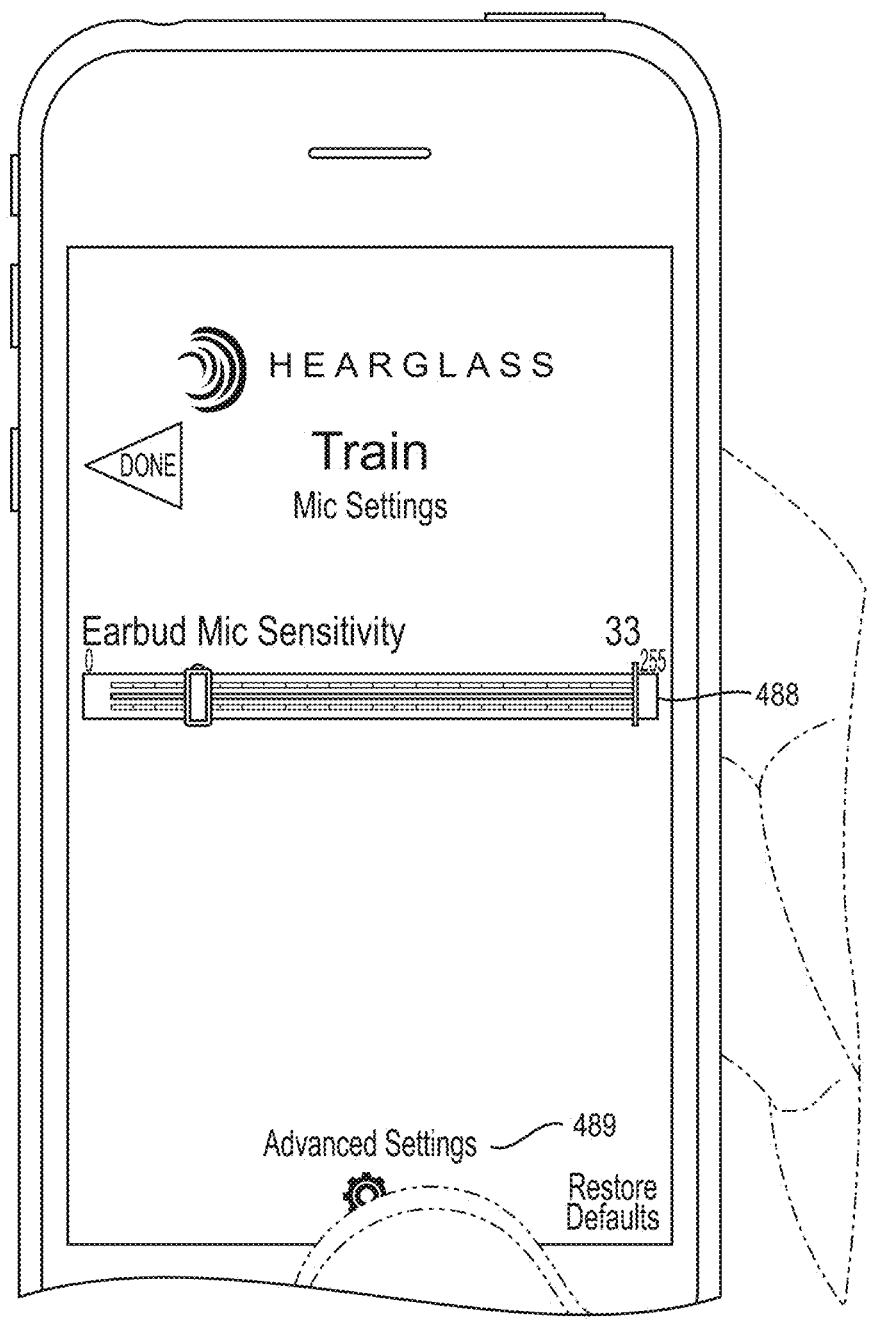
FIG. 4D shows a second user interface for tuning the hearing assistance device 450 according to an embodiment of the disclosure.

Once normalized, in this embodiment, noise may be further reduced from the microphone signals at the Level Cut adjuster based on the earbud or Bluetooth sensitivity. The earbud microphone sensitivity may be controlled by means of the signal SHGN_MIC_MIX_LEVL 468, and the configured Bluetooth microphone sensitivity by means of the signal MOUTH_MIC_LEVEL 476. As shown in FIG. 4C, the user may be provided an electronic interface, for controlling the SHGN_MIC_MIX_LEVL 468 and MOUTH_MIC_LEVEL 476 signals. For example, as in FIG. 4D, the user may be provided with an Earbud Mic Sensitivity option (e.g. slider) 488 for controlling the SHGN_MIC_MIX_LEVL 468 signal. A similar option may be provided to control the MOUTH_MIC_LEVEL 476 signal. Further, the normalized audio signals may be converted from mono to stereo at converter 422 and placed onto SUM signal mixers 410. In the case of Bluetooth input, the signals are first processed through a Bluetooth module and gain adjusters, prior to being placed onto SUM signal mixers.

Figure 4E:
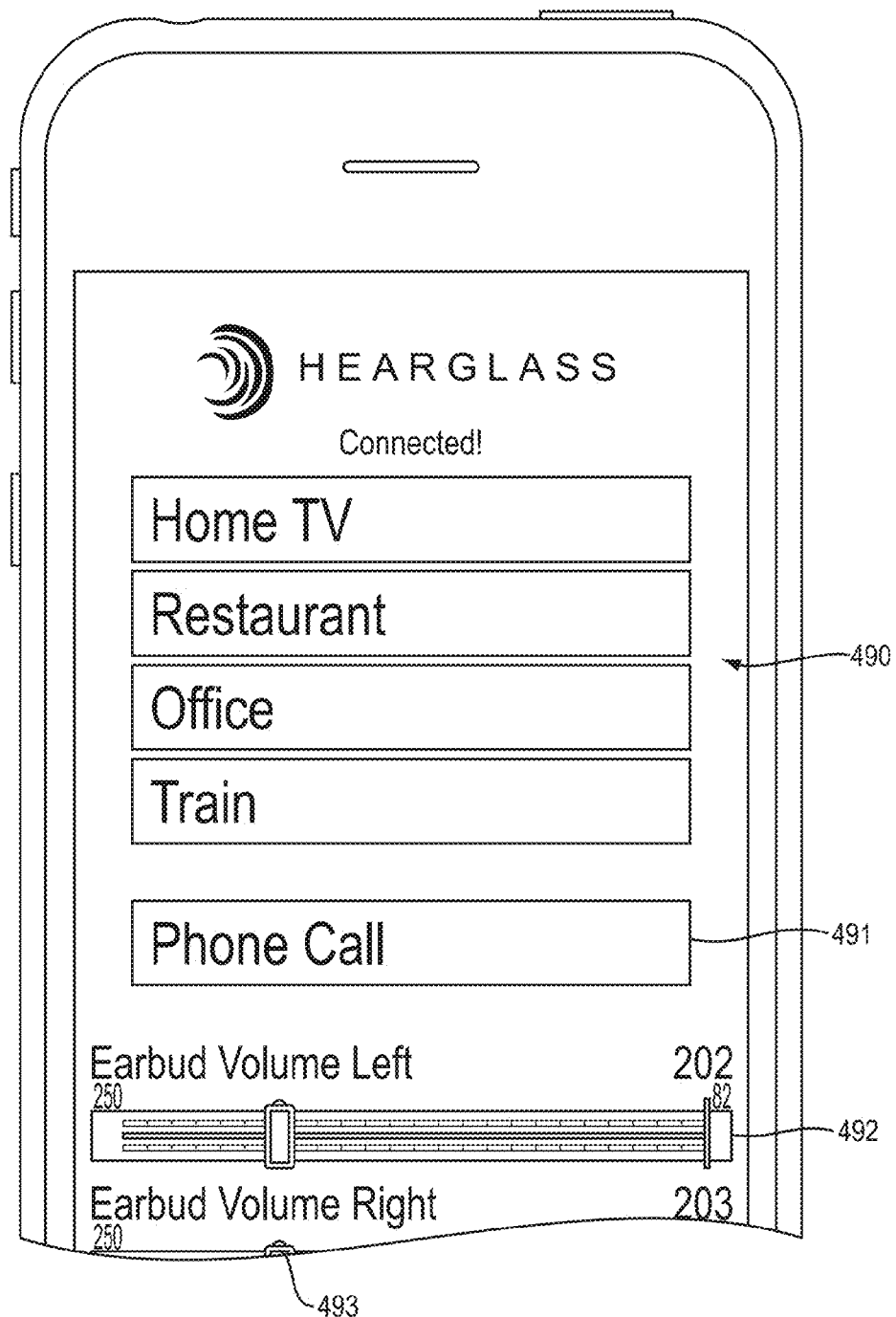
FIG. 4E shows a third user interface for tuning the hearing assistance device 450 according to an embodiment of the disclosure.

The mixed audio signals may undergo further gain adjustment at gain AMP adjusters 458 before being played out at speakers 430A, 430B. The left earbud volume may be controlled at the gain AMP by means of the signal MASTER_VOL_L_CS 478, and the right earbud volume may be controlled at the gain AMP by means of the signal MASTER_VOL_R_CS 480. As shown in FIG. 4E, the user may be provided an electronic interface, for controlling the MASTER_VOL_L_CS 478 and MASTER_VOL_R_CS 480 signals. As in FIG. 4E, the user may be provided with an Earbud Volume Left option (e.g. slider) 492 for controlling the MASTER_VOL_L_CS 478 signal. As further in FIG. 4E, the user may be provided with an Earbud Volume Right option (e.g. slider) 493 for controlling the MASTER_VOL_R_CS 480 signal. After making one or more adjustments using the provided signals, whether not or not by means of the electronic interface, the user may use the electronic device to save the settings. The settings may be saved to be used during a pre-determined activity, such as Home TV, Restaurant, Office, Train 490, or Phone Call 491. Other advanced option may also be available for tuning or configuring settings for the device 489.

The signals provides in this schematic, such as SHT_MIC_LEAD_GAIN 460, MTHMIC_NOISEGATE 470, MASTER_VOL_L_CS 478, and other such signals displayed and not displayed on the schematic used to tune, control, or monitor the device, may be provided as part of an application programming interface (API). This allows application developers, such as developers of mobile device apps, and other software or hardware developers to create custom functions for tuning, controlling, or monitoring the device, which may or may not be related to assisting hearing. The functions may be implemented using any program language and on any hardware or software platform or operating system. For example, an app developer may use the API to implement an app to monitor the accelerometer signals to gather vibration data for purposes unrelated to assisted hearing, such as using the data as part of a jogging app to record the number of miles ran.

Example Functions and Features

In some embodiments, the hearing assistance device may include a transceiver that can support singly or in combination any number of wireless access technologies including Bluetooth®, WiFi, or other short or long range communication protocols. For example, wireless access for networking, allows the hearing assistance device to make connections for audio, video, and data input, peer to peer communications, peer to group communications, remote microphones, and remote audiologist evaluation. Using these connections, the hearing assistance device acts as its own platform that may interact broadly with software applications or programs on communication device, such as smartphones, tablets, conventional telephones, personal computers, Bluetooth devices, WiFi devices, or any other device that supports internet access. For example, a smartphone app, such as Siri, may be controlled directly from the hearing assistance device. Further, the hearing assistance device may support its own electronic interface that may be configured as a software application on a communication device (e.g., smartphone or tablet) that allow tuning, controlling, or monitoring the hearing assistance device. The device also includes an application programming interface (API) such that application developers, such as developers of mobile device apps, and other software or hardware developers may create custom functions for tuning, controlling, or monitoring the device, which may or may not be related to assisting hearing.

Furthermore, the hearing assistance device may include an intercom mode which allows two or more users of the device to communicate with each other using Bluetooth®, WiFi, or other short or long range communication protocols. In intercom mode, the devices may be used similar to a walkie-talkie, such that the first user of a first device may initiate a conversation with the second user of a second device, wherein the first device may be set to Bluetooth® source mode to transmit the first user's voice to the second device. The second device in Bluetooth® sync mode may receive the first user's voice communication in the same manner that the device would receive communications from any other Bluetooth® paired device. The second user may then respond to the first user, wherein now the second device may be set to Bluetooth® source mode to transmit the second user's voice to the second device which will receive the voice communication in Bluetooth® sync mode.

In one embodiment, hearing assistance device 400 may include a battery 428 that supplies power to the device. MCU 426 may be coupled to a USB port 438 for connecting to peripheral devices such as flash memory sticks, DVD/CD players, and printers. MCU 426 may include FLASH Memory 448 to continuously record audio clips that may be replayed at user's instruction. MCU 426 may also be coupled to a tuning word 436 which may determine a state under which hearing assistance device 400 operates. For example, MCU 426 may read tuning word 436 and set gains in the hearing assistance device 400 embodiment according to it. For another example, MCU 426 may read tuning words (i.e. signal) SHT_MIC_LEAD_GAIN to set gains in Lead Mic Sensitivity 460, SHT_MIC_LAG_GAIN to set gains in Lag Mic Sensitivity 462, or other such tuning words to set gains accordingly in the hearing assistance device 450 embodiment. Hearing assistance device 400 may operate under different presets such as "in home," "telephone conversation," "outdoor," "concert hall," "sporting arena," etc., as shown in FIG. 4E, 490. Each of these presents may be encoded in a particular tuning word that may cause MCU 426 to set the gains of gain adjusters 406 to be optimal for that scenario. The MCU 426 may include sensors to control these presets 426. In one embodiment, tuning words may be stored as static RAM or FLASH Memory 448 selectable by the user using touch sensors (such as those 306.A-306.Z as shown in FIG. 3). Moreover, hearing assistance device 400 may include sensors 440 to control volume. In response to user's request to change volume, MCU 426 may gains at gain adjusters 406 to adjust volume at speakers 430.A, 430.B. In some embodiments, the hearing assistance device may include a piece or a component for bone conduction of sound or audio signal. For example, the hearing assistance device may include a check bone area connection, which can be useful for users with outer or middle ear issues.

In some embodiments, sound signals or audio signal received by a transducer is converted to physical vibrations or as vibrations experienced by the user through sense of touch. For example, the physical vibrations may be experienced by the user on a temple or ear area. In embodiments, conversion of audio signal by the transducer to vibrations occurs in a range "felt" or experienced by a deaf user through sense of touch so that a deaf user could sense sound. In some embodiments, a pitch shift of the sound frequencies of the audio signal to lower frequencies and a compression of the frequency range allows a user to sense sound through vibrations.

In some embodiments, sounds or signals may be displayed as a 3D spectrogram of audio to devices in communication with the hearing assistance device, such as a mobile phone or personal computer. The user may then be able to see the shape of sounds, and may be able to recognize particular words and sounds based on the shape. In addition, the hearing assistance device may use these shapes to determine the particular pitch and frequencies of the speech at any given interval (e.g. based on the displayed peaks and valleys on the spectrogram) prior to the user hearing the speech. Then, the device may automatically enhance the particular pitch and frequencies at each interval according to the user's deficiencies or in other manners that enhance the brain's ability to process the speech using equipment such a multi-band variable parametric EQ. The speech is then transmitted to the user in the enhanced format in real-time or with minimal delay.

In some embodiments, the hearing assistance device may also include vision assistance features. An ultrasound device may be mounted to the frames of the glasses to send a signal to measure the distance to objects in front or around the user. The hearing assistance device may then use the measurements reported from the ultrasound to generate a tone based on the distance from the objects. The user may hear the tone in his/her headphones or earbud and know how close he/she is from the objects. For example, the ultrasound device may measure a boulder twenty feet in front of the user, so the hearing assistance device may generate a low tone, but as the ultrasound device measures that the user moves closer to the boulder, the hearing assistance device may generate an incrementally louder tone.

In some embodiments, the hearing assistance device includes a component using a method to pitch shift an audio signal such that the original pitch of an audio signal is raised or lowered. In some embodiments, a transducer uses a method to pitch shift an audio signal. In example embodiments, the pitch shifting method allows a user to hear sounds (emitted and optionally amplified audio signals) normally outside of the detectable frequency range of the inner ear by shifting the input audio spectrum or signal. In other embodiments, the pitch shifting method allows a user to hear sounds (emitted and optionally amplified audio signals) normally outside of the detectable frequency range of human hearing by shifting the input audio spectrum or signal. For example, a user could listen to audio signal in the 50 kHz frequency range when a pitch shifting method of shifting audio signal down by one-tenth such that an audio signal of 5 kHz is emitted allowing for detection of bearing problems in a jet engine.

In some embodiments, a transducer of the hearing assistance device applies a method to allow a user to perceive frequencies or an audio signal via psychoacoustics. Psychoacoustics refers to the study of the perception of sound.

In some embodiments, the hearing assistance device may include a piece or a component to monitor vital signs. For example, vital signs include heartbeat, skin resistance, blood oxygen saturation, and blood pressure. In embodiments, the hearing assistance device may include a temple area connection to monitor vital signs. In some embodiments, monitoring vital signs is a result of the user touching a capacitive touch sensitive area on the frames. In some embodiments, this function can be controlled by gestures. In some embodiments, monitoring vital signs may trigger communication through, for example, Bluetooth™ or WiFi with the user. For example, a user may be exercising, e.g., running, while the system monitors heart rate and temperature. In some embodiments, the monitoring of vital signs is activated based on a shock or vibration detection by the device, for example, as a result of the user falling.

In embodiments, the hearing assistance device may include a piece or a component to provide an audio hearing range testing. In some embodiments, the results of the audio hearing range testing allows for adjustment. In some embodiments, the audio hearing range testing is of the user of the hearing assistance device. In some embodiments, the audio hearing range testing with optional adjustment is provided by a tuning board or an application on a device such as a mobile phone, tablet, or computer. In some embodiments, the hearing assistance device further comprises an external tuning board with buttons. In example embodiments, the tuning board is small, for example a 1.5 inch by 3 inch board with buttons. For example, see FIGS. 5B, 5C, and 5D.

In some embodiments, the device may use speech recognition to enhance the speech. In such embodiments, a microphone receives an audio signal of speech by an individual in proximity to the user or source. The microphone is connected to a converter or a transducer that converts the first audio signal to a first digital representation of the first audio signal. The digital representation may be enhanced by converting in a manner to remove all noise besides the individual's speech. Then a controller may be configured to perform speech recognition of the first digital representation of the audio signal, in which the first digital representation is translated to text and all remaining noise not recognized as the individual's speech is removed during the translation. The controller may be configured to also convert the text to a second digital representation and convert the second digital representation to a second audio signal in a different pitch and frequency than the first audio signal (i.e. new speech), which is output to the user through the headset or ear bud. The new generated speech may be output to the user as a different human voice or modulated voice that is easier for the user to hear than the original speech. In some embodiments, the controller may completely remove non-speech noise from the speech heard by the user. In the same or different embodiments, the controller may be configured to amplify the audio signal at a low volume, and then increase the amplification when certain words or phrases are detected, which may aid in the user's ability to filter speech in various situations (e.g. noisy or chaotic situations).

In some embodiments, the hearing assistance device may include a component to provide language translation. In an embodiment, a microphone receives an audio signal of speech of a first language spoken by an individual in proximity to the user or source. The microphone is connected to a converter or a transducer that converts the audio signal to a digital representation of the audio signal. In some embodiments, the audio signal may be converted from the digital representation to textual representation, as described above. If not converted to text, the digital representation may be otherwise enhanced by converting it in a manner to remove or reduce all noise besides the words of the speaker, such as background noise, or this noise may be filtered out after the conversion. The digital representation may also be enhanced according to the users/listeners deficiencies, such as adjusting the pitch or frequency during the conversion or filtering process. The background noise may also have been similarly enhanced earlier in the process from the audio signal before the conversion.

A controller processes and compares the digital or textual representation of the audio signal to a language table stored in memory or storage to convert the digital or textual representation to a second digital or textual representation. This second digital or textual representation of the audio signal is a translation of the first language into a second language. The controller converts the second digital or textual representation of the audio signal (or may first convert the textual representation to the digital representation) to a voice modulated audio signal of the second language. The controller controls as speaker (an ear bud in some examples) which outputs or emits the voice modulated audio signal of the second language to the wearer so the wearer can understand the speech of the first language and hear the translation in a voice modulated manner. In embodiments where the speech was enhanced (e.g. removed background noise, improve pitch, improve frequency), the translation may now not only provide the translation for the user, but the translation is presented to the user as new generated speech (using a different human voice or modulated voice) that is easier for the user to hear than the original speech. For example, German is spoken by an individual in proximity to the hearing assistance device and is the audio signal of speech of a first language. Then, for example, the user wearing the hearing assistance device hears the emitted audio signal in English, the second language, and as new speech more audible than the original spoken words. In some embodiments, two or more users, conversing in two or more different languages, may each hear the speech from the other users in that respective user's own native or chosen language, and may communicate back to the other users in that respective user's own native or chosen language.

As part of this process, the device may utilize speech recognition, dictation, or language translation software (e.g. Dragon) installed on the device frames or on another device that communicates with the device, such as a mobile phone, to perform some or all of the speech conversion. In embodiments where the audio is converted to textual representation, the text may also be visually displayed to the user or others, on other devices communicating with the hearing assistance device, such as a mobile phone or laptop, or on the lens of the glasses.

A device that may include at least one first transducer for receiving sound signals, at least one second transducer for emitting sound signals, and at least one extension tube coupled to the at least one second transducer, in which the at least one extension tube may include a hollowed core from a first end to a second end of the at least one tube.

Example Circuit Boards

Figure 5A:
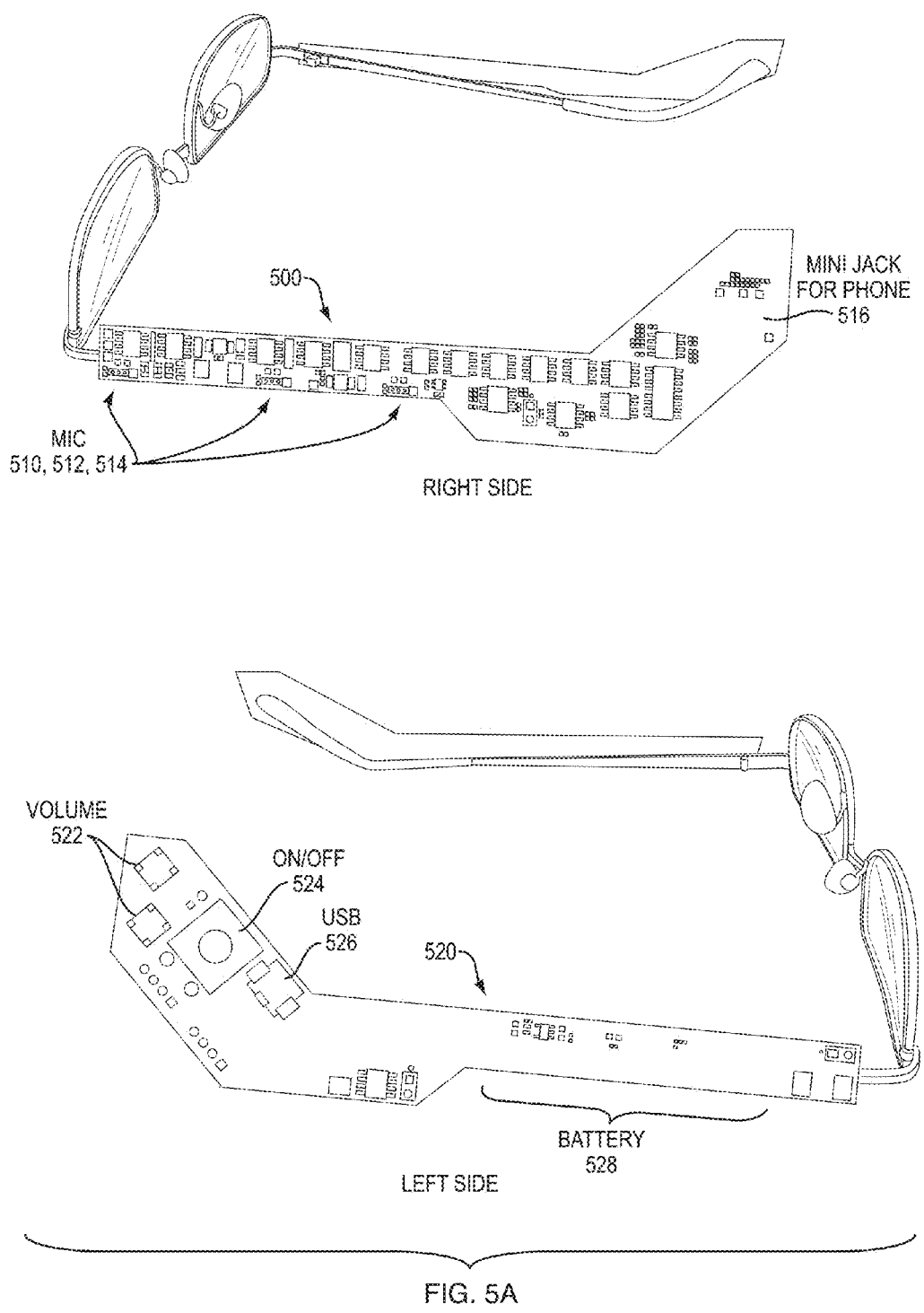
FIG. 5A shows a hearing assistance device according to another embodiment of the disclosure highlighting embodiments of the circuit board.

FIG. 5A illustrates an example embodiment of circuit boards 500 and 520 (not to scale) for the hearing assistance device. The circuit board 500 may represent the circuit board of the right side of the glasses frame. For example, circuit board 500 may provide circuitry connections including microphone connections 510, 512, 514 to microphones 218, 220, 222 and a mini jack connection 516 to a device such as a phone. The circuit board 520 may represent the circuit board of the left side of the glasses frame. For example, circuit board 520 may provide circuitry connections including volume controls 522, power control 524 (on/off), USB connection 526, and battery 528. In some embodiments, the microcontroller unit (MCU) and battery circuits, which convert the battery to needed voltages for components, may be located on one side of the glasses frame while microphones may be located on the other side or arm of the glasses frame. In embodiments, the components are placed such that noisy components such as the MCU and the battery circuits do not interfere or create background noise that is picked up by the microphones. In some embodiments, the actual scale of the circuit board will fit within the frame or glasses frame of the hearing assistance device.

Figure 5B:
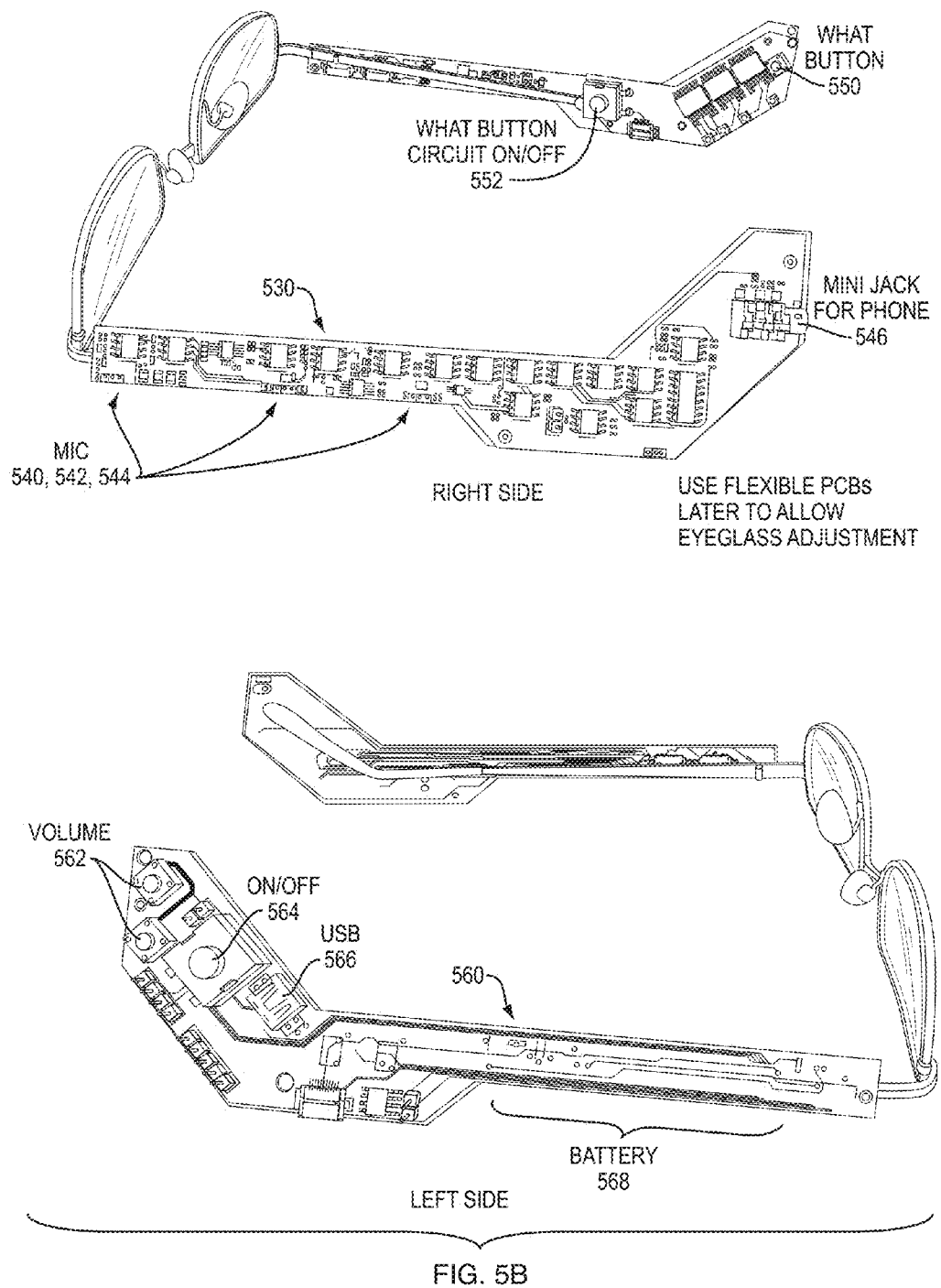
FIG. 5B shows a hearing assistance device according to a different embodiment of the disclosure highlighting embodiments of the circuit board.

In some embodiments, the circuit board uses standard components including, but not limited to, 9-pin connectors, 10-pin connectors, push buttons, 0.5 mm pitch cables, and 0.3 mm cables. For example, FIG. 5B illustrates an example embodiment of circuit boards 530 and 540 (not to scale) for the hearing assistance device. The circuit board 530 may represent the circuit board of the right side of the glasses frame. For example, circuit board 530 may provide circuitry connections including microphone connections 540, 542, 544 to microphones 218, 220, 222 and a mini jack connection 546 to a device such as a phone. In some embodiments, the communication connection may be a mini jack connection, a Bluetooth™ connection, a WiFi connection, or other communication link. The circuit board 530 may represent the circuit board of the left side of the glasses frame. In some embodiments, the hearing assistance device may also include a "what" button circuit board 550 with a "what" button circuit power switch 552 (on/off). For example, circuit board 560 may provide circuitry connections including volume controls 562, power control 564 (on/off), USB connection 566, and battery 568. In some embodiments, a connection including a USB connection, a Bluetooth™ connection, or a Wi-Fi connection may be integrated into the circuit board to connect to a device such as a phone or a computer, for example, to upgrade or update software. In some embodiments, sensors for taking physiological and physical measurements may also be present on the arms or bridge of the glasses. In some embodiments, the actual scale of the circuit board will fit within the frame or glasses frame of the hearing assistance device.

Figure 5C:
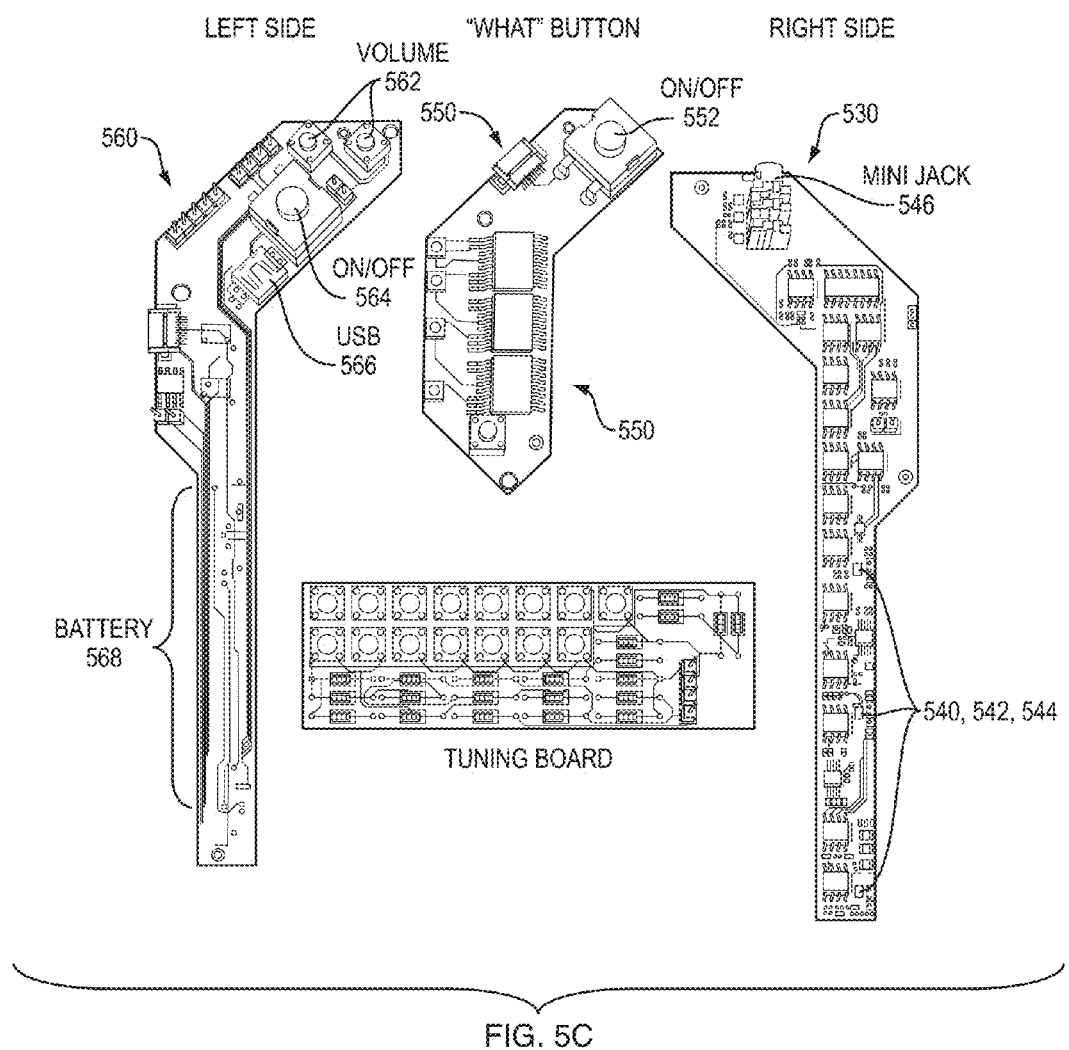
FIG. 5C shows embodiments of the front sides circuit boards for the hearing assistance device

FIG. 5C shows embodiments of the front side of circuit boards for the hearing assistance device and accessories using standard components. For example, left side circuit board 560 showing volume controls 562, power control 564 (on/off), USB connection 566, and battery 568, "what" button circuit board 550 with power switch 552, and right side circuit board 530 showing microphone connections 540, 542, 544 to microphones 218, 220, 222 and a mini jack connection 546 to a device such as a phone as depicted in FIG. 5B. FIG. 5C also shows an embodiment of an external tuning board to adjust and calibrate the settings of the hearing assistance device. The tuning board may be a physical external component or device or an application, for example, on a mobile phone, laptop or computer. The tuning board may allow a user to fine tune microphones, levels, preset modes such as "Restaurant," "Car," and "Theater." In some embodiments, a mobile phone or other device may let the hearing assistance device know the user's location, for example, detecting the user has walked into a theater, a restaurant, or a sports arena, or action, for example, answering a phone call, and may automatically change the hearing assistance device to an appropriate preset mode. In other embodiments, the hearing assistance device may detect the location or action directly, without the use of another device, and may automatically change to an appropriate preset mode.

Figure 5D:
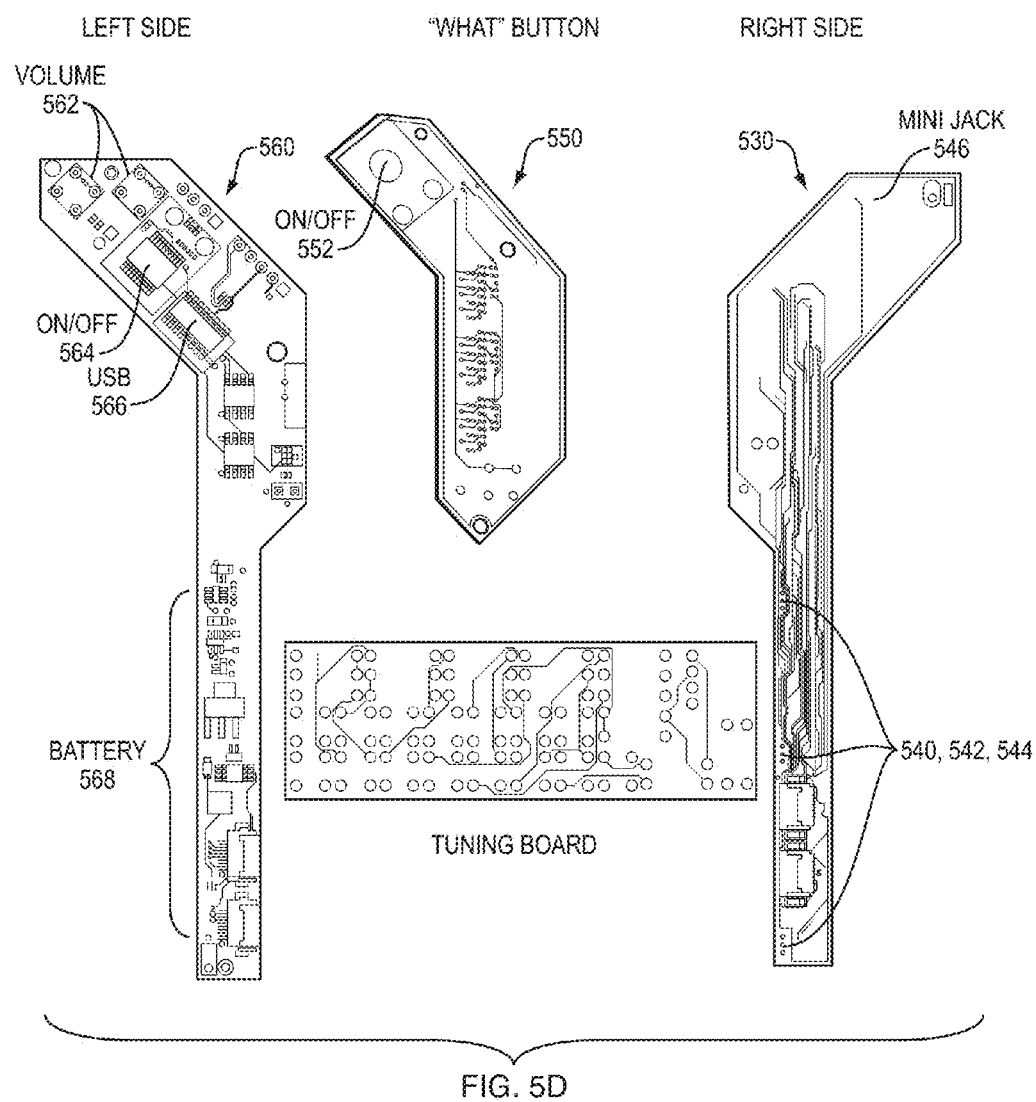
FIG. 5D shows embodiments of the back sides circuit boards for the hearing assistance device.

FIG. 5D shows embodiments of the back sides circuit boards for the hearing assistance device using standard components as depicted in FIG. 5B. For example, left side circuit board 560 showing volume controls 562, power control 564 (on/off), USB connection 566, and battery 568, "what" button circuit board 550 with power switch 552, and right side circuit board 530 showing microphone connections 540, 542, 544 to microphones 218, 220, 222 and a mini jack connection 546 to a device such as a phone as depicted in FIG. 5B. FIG. 5C also shows an embodiment of an external tuning board to adjust and calibrate the settings of the hearing assistance device.

In some embodiments, the circuit board may be printed. For example, the printed circuit board may have a height of 10 mm or less with a length compatible with the glasses arms. In some embodiments, the circuit board will be free of standard components such as connectors and wires to reduce bulk and to provide higher reliability. In some embodiments, the printed circuit boards of the glasses arms may be bent to fit and adjust to a user's head. In some embodiments, three dimensional mechanical files may be used to print a pair of glasses to house the circuit boards of the hearing assistance device. In some embodiments, the printed circuit board will be a single flexible printed circuit board. In embodiments, the electronics are hidden in plain sight, and the hearing assistance device has the appearance of regular glasses.

In embodiments, the circuit board allows the hearing assistance device to perform multiple functions including, but not limited to, converting sound signals into electronic signals; transmitting the electronic signals to electronic circuit block; connecting or switching microphones, e.g., lead microphone 218, lag microphone 220, and mouth microphone 222, to electronic circuit block; transmitting electronic signals for a functioning "what" button to repeat audio signal; adjusting volume; changing hearing mode; and transmitting electronic signals to allow monitoring of vital signs.

In some embodiments, the switches and buttons shown may be replaced with capacitive touch sensitive areas on the glasses frame. The hearing assistance device will have the appearance of glasses frames without buttons, for example, smooth or designs such as stripes that allow the hearing assistance device to perform multiple functions. The hearing assistance device if touched on certain areas may effectively correspond to control buttons to adjust functions including, but not limited to, volume adjustment, hearing mode, phone call connect, "what" button, switch between microphones, and monitor vital signs. One of skill in the art appreciates that as technology for transmitting electronic signals improves and changes, embodiments of the hearing assistance device may incorporate new technology.

Example Components

Example 1 is a device that may include at least one first transducer for receiving sound signals, at least one second transducer for emitting sound signals, and at least one extension tube coupled to the at least one second transducer, in which the at least one extension tube may include a hollowed core from a first end to a second end of the at least one tube.

In Example 2, the subject matter of Example 1 can optionally provide that the first end of the at least one extension tube is sealed with a first membrane, and the second end of the at least one extension tube is sealed with a second membrane.

In Examiner 3, the subject matter of Example 1 can optionally provide that the hollowed core of the at least one extension tube contains inert gases including air, noble gases, and nitrogen.

In Example 4, the subject matter of Example 1 can optionally provide that the device may be wearable by a human subject.

In Example 5, the subject matter of Example 4 can optionally provide that the device may be mounted on human head in the form of a glass frame, in which the glass frame may include two rims to hold glasses, two sides each coupled to one rims, and a bridge that connects the two rims.

In Example 6, the subject matter of Example 5 can optionally provide that the at least one first transducer may include a lead microphone and a lag microphone where the lead microphone is arranged to be situated at a front portion of one side of the glass frame and the lag is arranged to be situated at a rear portion of the side.

In Example 7, the subject matter of Example 6 can optionally provide that lead microphone and the lag microphone may be directional microphones that are oriented toward front to receive sound input from a particular direction.

In Example 8, the subject matter of Example 7 can optionally provide that the at least one first transducer may include a third microphone that may be arranged to be situated on one rim of the glass frame below the bridge and that may be oriented toward below for capturing sound from the mouth of the human subject.

In Example 9, the subject matter of Example 8 can optionally provide that the at least one second transducer may include a speaker that may be arranged to be situated toward the tip of the side of the glass frame, and that speaker may include a tongue on which the first end of the extension tube is coupled to.

In Example 10, the subject matter of Example 9 can optionally provide that when coupled to the tongue, the first membrane at the first end of the extension tube may be pressed against the tongue, and that the second end of the extension tube may be inserted into the inner ear of the human subject to receive sound from the speaker.

In Example 11, the subject matter of Example 10 can further include an electronic circuit coupled to the microphones and the speaker, in which the electronic circuit may convert sound signals received at the microphones into electronic signals, suppress noise, selectively amplify useful sound signals, and output the cleaned and amplified sound to the speaker, and in which the electronic circuit may be embedded in one side of the glass frame.

In Example 12, the subject matter of Example 11 can further include a battery to supply powers to the electronic circuit, in which a shape of the battery is a tube that may constitute part of the side of the glass frame, and in which the electronic circuit and the battery is on a first side of the glass frame, and the front microphone, lag microphone, and the speaker is on a second side of the glass frame.

In Example 13, the subject matter of Example 12 can further include a number of touch sensors on the sides of the glass frame to receive instructions from the user. The touch sensors may be coupled to the electronic circuit which is to perform the functions of the instruction, in which the device may include a touch button which, when activated by pushing the button, is to cause an audio clip to be replayed.

In Example 14, a hearing assistance device comprises a frame configured to be worn on the head of a user, the frame including a bridge configured to be supported on the nose of the user; a first transducer with two microphones on the right side of the frame and a third microphone near the nose bridge and a second transducer for emitting amplified audio signals including a wired speaker, such as an ear bud, which is connected to the frame.

In Example 15, a hearing assistance device comprises a frame configured to be worn on the head of a user, the frame including a bridge configured to be supported on the nose of the user; a first transducer with two microphones on the right side of the frame and a third microphone near the nose bridge and a second transducer for emitting amplified audio signals including a speaker using a flexible tube, such as an ear bud, which is connected to the frame.

In Example 16, a hearing assistance device comprises a frame configured to be worn on the head of a user, the frame including a bridge configured to be supported on the nose of the user; a first transducer with one ribbon microphone on the nose bridge and a second microphone near the nose bridge and a second transducer for emitting amplified audio signals including a wired speaker, such as an ear bud, which is connected to the frame.

In Example 17, a hearing assistance device comprises a frame configured to be worn on the head of a user, the frame including a bridge configured to be supported on the nose of the user; a first transducer with one ribbon microphone on the (nose) bridge of the frame and a second microphone near the nose bridge and a second transducer for emitting amplified audio signals including a speaker using a flexible tube, such as an ear bud, which is connected to the frame.

Digital Processing Environment

Figure 6A:
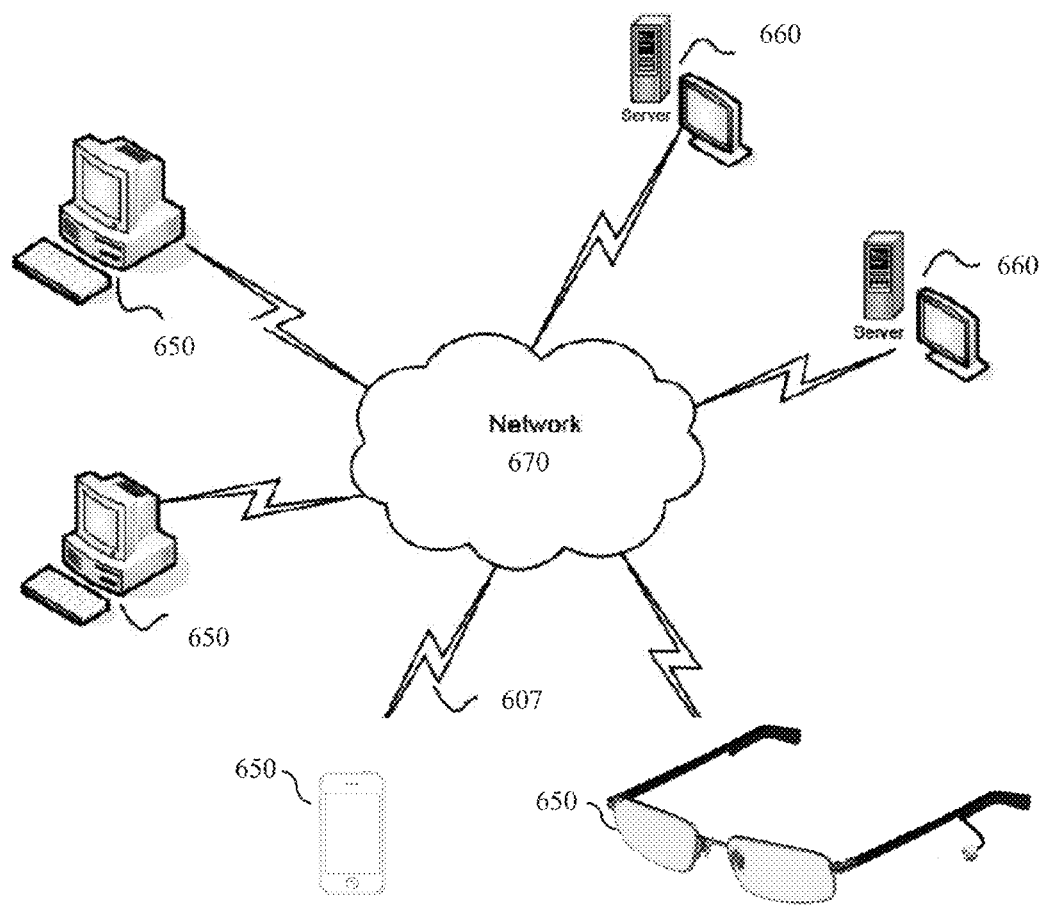
FIG. 6A is a schematic diagram of a computer network environment in which embodiments are deployed.

Example implementations of the present invention may be implemented in a software, firmware, or hardware environment. FIG. 6A illustrates one such environment. Client computer(s)/devices 650 (e.g., mobile phone or hearing assistance device) and a cloud 660 (or server computer or cluster thereof) provide processing, storage, and input/output devices executing application programs and the like.

Client computer(s)/devices 650 can also be linked through communications network 670 to other computing devices, including other client devices/processes 650 and server computer(s) 660. Communications network 670 can be part of a remote access network, a global network (e.g., the Internet), a worldwide collection of computers, Local area or Wide area networks, and gateways that currently use respective protocols (TCP/IP, Bluetooth®, etc.) to communicate with one another. Other electronic device/computer network architectures are suitable.

Figure 6B:
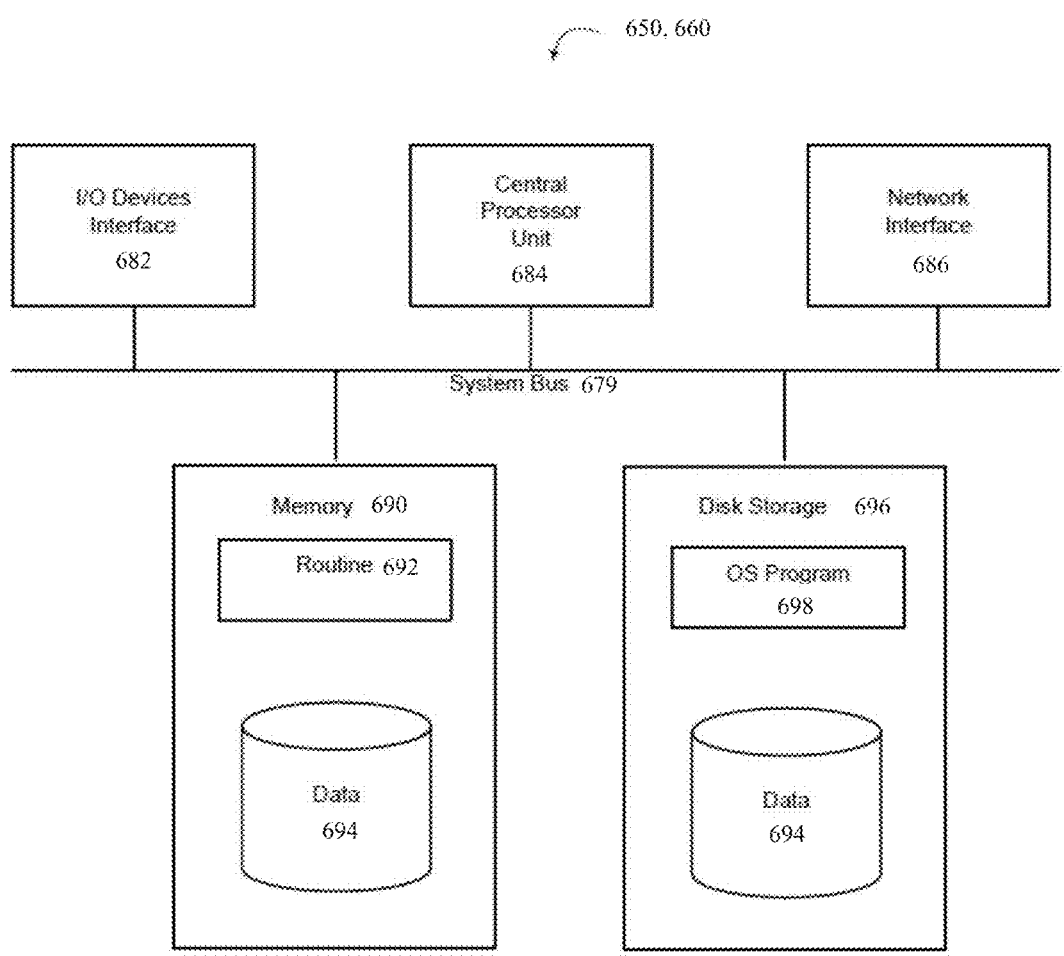
FIG. 6B is a block diagram of the computer nodes in the network of FIG. 6A.

Embodiments of the invention may include means for displaying audio, video, or data signal information. FIG. 6B is a diagram of the internal structure of a computer/computing node (e.g., client processor/device/mobile phone device/tablet 650 or server computers 660) in the processing environment of FIG. 6A, which may be used to facilitate displaying such audio, video, or data signal information. Each computer 650, 660 contains a system bus 679, where a bus is a set of actual or virtual hardware lines used for data transfer among the components of a computer or processing system. Bus 679 is essentially a shared conduit that connects different elements of a computer system (e.g., processor, disk storage, memory, input/output ports, etc.) that enables the transfer of data between the elements. Attached to system bus 679 is I/O device interface 682 for connecting various input and output devices (e.g., keyboard, mouse, displays, printers, speakers, etc.) to the computer 650, 660. Network interface 686 allows the computer to connect to various other devices attached to a network (for example the network illustrated at 670 of FIG. 6A). Memory 690 provides volatile storage for computer software instructions 692 and data 694 used to implement a software implementation of the present invention (e.g. hearing assistance system). If implemented in software, computing components (e.g. mobile computing components) that interface with the hearing assistance device described herein may be configured using any known programming language, such as any high-level, object-oriented programming language. In one example, a software implementation for OS X and iOS operating systems and their respective APIs, Cocoa and Cocoa Touch maybe implemented using Objective-C or any other high-level programming language that adds Smalltalk-style messaging to the C programming language.

Disk storage 696 provides non-volatile storage for computer software instructions 698 (equivalently "OS program") and data 694 used to implement and data 695 stored by embodiments of the hearing assistance system of the present invention. Central processor unit 684 is also attached to system bus 679 and provides for the execution of computer instructions. Note that throughout the present text, "computer software instructions" and "OS program" are equivalent.

In one example, a computing device may be configured with computer readable instructions 694 to provide a tuning application to enable volume and equalization optimization to the earphones, which provide hearing assistance, using the inventive frames of the invention hearing assistance system.

In another example, a mobile device may interface with the inventive frames of the invention hearing assistance system using a spiral timeline interface to display and control data (e.g. audio or video data) recorded and/or processed by the computing components embodied in the frames of the present invention hearing assistance system. Such an spiral timeline interface, preferably, displays new audio, video, or data, without compressing the visual of the timeline (or portions thereof), and includes the features of the spiral timeline interface disclosed in U.S. application Ser. No. 14/152,671, "Multimedia Spiral Timeline" by Wayne D. Boyle and Peter J. Sprague, filed on Jan. 10, 2014, the entire teachings of which are incorporated herein by reference.

Aspects of the invention hearing assistance system may be implemented using any device or system (computer/device 650, 660) capable of recording or processing an audio, video, or data input file. Optionally, a retroactive recording system using features disclosed in U.S. Pat. No. 6,072,645, "Method and apparatus for retroactive recording using memory of past information in a data storage buffer," filed Jan. 26, 1998, the entire teachings of which are incorporated herein by reference, for example, may be implemented using the spiral timeline. In an example mobile implementation, if a retroactive recording application is executed, the system may be configured to using a loop recorder implementation in which, upon execution, it automatically starts recording audio, video, or data content and stores the incoming input stream to a temporary storage location (cache). If the application is exited from or shut down, the input stream may be discarded. If the user executes the application again, it would automatically begin a new recording. If a user indicates that segment(s) of the input stream should be permanently recorded, then those segment(s) may be stored to a permanent storage location shown on the spiral timeline in a different color shade or using a transparency overlay on the respective portion of the spiral timeline (or shown in any other way capable of differentiating the recorded portions stored to temporary memory from those portions stored in permanent memory). In this way, the spiral timeline can be used to help easily distinguish portions of an input signal that are stored in temporary storage verses those portions that are stored in permanent storage.

In one embodiment, the processor routines 692 and data 694 are a computer program product, display engine (generally referenced 692), including a computer readable medium capable of being stored on a storage device 696, which provides at least a portion of the software instructions for the spiral timeline invention system.

In other embodiments, the processor may be configured with a real-time translation, dictation, or speech recognition computer program product 692. In one embodiment, as the microphone in the glasses records speech spoken in another language, real-time translation software may be provided so that the speech is translated and transmitted to the user/listener's earphone in the language of the user/listener. In another embodiment, as the microphone in glasses record speech, real-time dictation software may be provided to convert the speech to text for display or further communication. The processor using a same or different computer program may convert the text to new speech (e.g. different human voice or modulated voice) that is easier for the user to hear than the original speech). The new speech may be enhanced according to the deficit of the user, such that the pitch, frequency, or other such characteristic is more suitable to the particular user.

The computer program product 692 can be installed by any suitable software installation procedure, as is well known in the art. In another embodiment, at least a portion of the spiral timeline software instructions may also be downloaded over a cable, communication and/or wireless connection. In other embodiments, the invention hearing assistance system software is a computer program propagated signal product 607 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present spiral timeline invention routines/program 692.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 692 is a propagation medium that the computer system 650 may receive and read, such as by receiving the propagation medium and identifying a propagated signal embodied in the propagation medium, as described above for computer program propagated signal product.

While this invention has been particularly shown and described with references to example embodiments thereof, it will be understood by those skilled in the art that various changes in form and details may be made therein without departing from the scope of the invention encompassed by the appended claims.

What is claimed is:

1. A hearing system that protects from damaging noise, the hearing system comprising:
    a frame configured to be worn on the head of a user;
    a first transducer coupled to the frame, the first transducer including at least two microphones configured to receive an audio signal;
    a converter configured to convert and to amplify the audio signal to an amplified representation of the audio signal, wherein the converter is configured to adjust the audio signal to an audio level non-damaging to hearing functions of the user by adjusting amplitude of at least one audio parameter of the audio signal detected by the converter to be at a damaging level;
    an electronic interface communicatively coupled to the converter to tune and equalize sound playback, the electronic interface configured for the user to select a preferred non-damaging audio level for adjusting the amplitude of the at least one audio parameter of the audio signal; and
    a second transducer for emitting the amplified representation of the audio signal to a pair of earbuds coupled to ears of the user and removably coupled to at least a portion of the frame, wherein the earbuds are configured to block environmental noise from reaching the ears of the user.

2. The hearing system as in claim 1, wherein the earbuds are made of soft rubber that creates a seal with each respective ear to block environmental noise from reaching the ears of the user.

3. The hearing system as in claim 1, wherein the earbuds include passive noise-canceling padding and high-density foam to block environmental noise from reaching the ears of the user.

4. The hearing system as in claim 1, wherein the earbuds include active noise-canceling to mask low-frequency sound waves of ambient noise to cancel unwanted sound.

5. The hearing system as in claim 1, wherein the at least one audio parameter of the audio signal includes volume, frequency, and pitch.

6. The hearing system as in claim 1, wherein the adjusted amplitude is stored as a preset, the user selecting the preset to set the adjusted amplitude when in an environment with damaging noise.

7. The hearing system as in claim 1, wherein the frame is configured with at least one sensor for measuring at least one of physiological functions of the user and physical surroundings of the user.

8. The hearing system as in claim 7, wherein the at least one sensor includes at least one of a temple area sensor for measuring the physiological functions and a capacitive touch sensitive area that the user touches with a body part for measuring the physiological functions.

9. The hearing system as in claim 7, wherein the at least one sensor measures the at least one of physiological functions and physical surrounds by use of at least one of electronic signals, sound pulses, light pulses, x-rays, odor detectors, accelerometer, and radiation.

10. The hearing system as in claim 1, wherein the converter is further configured to pitch shift the audio signal such that the user at least one of detects and hears sounds outside a detectable frequency range of hearing of the user.

11. The hearing system as in claim 1, further comprising an accelerometer coupled to the converter to reduce vibration noise detected by the hearing system to enhance clarity of the audio signal.

12. The hearing system as in claim 1, further comprising a transceiver coupled to one or more computer processors embedded in the frame, the transceiver configured to connect with communication devices, and together with the one or more processors, further configured to function as a mobile computing device.

13. A method of protecting from damaging noise, the method comprising:
   processing an audio signal by a first transducer coupled to a frame configured to be worn on the head of a user, the first transducer further coupled to at least two microphones situated on the frame and configured to receive the audio signal;
   converting and amplifying the audio signal to an amplified representation of the audio signal by a converter, wherein the converting adjusts the audio signal to an audio level non-damaging to hearing functions of the user by adjusting amplitude of at least one audio parameter of the audio signal detected by the converter to be at a damaging level, the at least one audio parameter adjusted to a preferred non-damaging audio level selected by the user using an electronic interface to tune and equalize sound playback; and
   emitting the amplified representation of the audio signal, using a second transducer, to a pair of earbuds coupled to ears of the user and removably coupled to at least a portion of the frame, wherein the earbuds are configured to block environmental noise from reaching the ears of the user.

14. The method of claim 13, wherein the earbuds are made of soft rubber that creates a seal with each respective ear to block environmental noise from reaching the ears of the user.

15. The method of claim 13, wherein the earbuds include passive noise-canceling padding and high-density foam to block environmental noise from reaching the ears of the user.

16. The method of claim 13, wherein the earbuds include active noise-canceling to mask low-frequency sound waves of ambient noise to cancel unwanted sound.

17. The method of claim 13, wherein the at least one audio parameter of the audio signal includes volume, frequency, and pitch.

18. The method of claim 13, wherein the adjusted amplitude is stored as a preset, the user selecting the preset to set the adjusted amplitude when in an environment with damaging noise.

19. The method of claim 13, wherein the frame is configured with at least one sensor for measuring at least one of physiological functions of the user and physical surroundings of the user.

20. The method of claim 19, wherein the at least one sensor includes at least one of a temple area sensor for measuring the physiological functions and a capacitive touch sensitive area that the user touches with a body part for measuring the physiological functions.

21. The method of claim 19, wherein the at least one sensor measures the at least one of physiological functions and physical surrounds by use of at least one of electronic signals, sound pulses, light pulses, x-rays, odor detectors, accelerometer, and radiation.

22. The method of claim 13, further comprising pitch shifting the audio signal such that the user at least one of detects and hears sounds outside a detectable frequency range of hearing of the user.

23. The method of claim 13, further comprising reducing vibration noise detected by the an accelerometer coupled to the converter, wherein the reducing of the vibration noise enhances clarity of the audio signal.

24. The method of claim 13, further comprising, connecting with communication devices using a transceiver coupled to one or more computer processors embedded in the frame, and together with the one or more processors, functioning as a mobile computing device.

\* \* \* \* \*